(12) United States Patent
Nam et al.

(10) Patent No.: US 12,256,183 B2
(45) Date of Patent: *Mar. 18, 2025

(54) DISPLAY APPARATUS AND VEHICLE INCLUDING THE SAME

(71) Applicant: LG Display Co., Ltd., Seoul (KR)

(72) Inventors: SeulKi Nam, Paju-si (KR); Taehyung Kim, Paju-si (KR); Jeonggoo Kang, Paju-si (KR); SunBok Song, Paju-si (KR); Seunghyeon Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,539

(22) Filed: Oct. 23, 2023

(65) Prior Publication Data

US 2024/0056712 A1    Feb. 15, 2024

Related U.S. Application Data

(63) Continuation of application No. 17/536,982, filed on Nov. 29, 2021, now Pat. No. 11,871,169.

(30) Foreign Application Priority Data

Dec. 8, 2020    (KR) .................. 10-2020-0170236

(51) Int. Cl.
*H04R 1/02*    (2006.01)
*B60K 35/60*    (2024.01)
(Continued)

(52) U.S. Cl.
CPC .............. *H04R 1/02* (2013.01); *B60K 35/60* (2024.01); *B60K 35/22* (2024.01); *B60K 35/25* (2024.01);
(Continued)

(58) Field of Classification Search
CPC .. H04R 1/02; H04R 2400/03; H04R 2499/13; H04R 2499/15; H04R 2499/11; H04R 7/04; H04R 7/06
See application file for complete search history.

(56) References Cited

U.S. PATENT DOCUMENTS 10,911,852 B2    2/2021  You et al.
11,019,430 B2    5/2021  Ham et al.
(Continued)

FOREIGN PATENT DOCUMENTS

CN    111625084 A    9/2020
JP    2018-110369 A    7/2018
(Continued)

OTHER PUBLICATIONS

Office Action issued Nov. 14, 2023 for corresponding Japanese Patent Application 2023-051946.
(Continued)

*Primary Examiner* — Jason R Kurr
(74) *Attorney, Agent, or Firm* — Morgan, Lewis & Bockius LLP

(57) ABSTRACT

A display apparatus and a vehicle including the same are provided. A display apparatus includes: a display panel configured to display an image, a driving circuit including: a flexible circuit film connected to the display panel, and a printed circuit board connected to the flexible circuit film, a first supporting member at a rear surface of the display panel, the first supporting member having a hole therein, and a vibration apparatus supported by the first supporting member, the vibration apparatus including a first vibration apparatus disposed at the rear surface of the display panel, wherein the flexible circuit film extends through the hole, and wherein the printed circuit board is disposed at a rear surface of the first supporting member.

48 Claims, 26 Drawing Sheets

(51) Int. Cl.
    *B60K 35/22* (2024.01)
    *B60K 35/25* (2024.01)
    *B60K 35/26* (2024.01)

(52) U.S. Cl.
    CPC .......... *B60K 35/26* (2024.01); *B60K 2360/42* (2024.01); *H04R 2400/03* (2013.01); *H04R 2499/13* (2013.01); *H04R 2499/15* (2013.01)

(56) References Cited

U.S. PATENT DOCUMENTS

| | | | |
|---|---|---|---|
| 11,785,393 B2 * | 10/2023 | Lee | H04R 17/00 |
| | | | 361/749 |
| 2004/0237111 A1 | 11/2004 | Iraclianos et al. | |
| 2006/0210099 A1 | 9/2006 | Takahata et al. | |
| 2014/0160040 A1 | 6/2014 | Kang et al. | |
| 2016/0050472 A1 | 2/2016 | Lee et al. | |
| 2017/0276764 A1 | 9/2017 | Vilermo et al. | |
| 2018/0079284 A1 | 3/2018 | Choi et al. | |
| 2018/0332376 A1 | 11/2018 | Lee | |
| 2020/0177980 A1 | 6/2020 | Shin et al. | |
| 2020/0209674 A1 | 7/2020 | Won et al. | |
| 2020/0209973 A1 | 7/2020 | Kim et al. | |
| 2020/0213699 A1 | 7/2020 | You et al. | |
| 2020/0278750 A1 | 9/2020 | Yeon et al. | |
| 2020/0296496 A1 | 9/2020 | Im et al. | |
| 2020/0379709 A1 * | 12/2020 | Kim | H04R 7/04 |

FOREIGN PATENT DOCUMENTS

| | | |
|---|---|---|
| JP | 2020-48194 A | 3/2020 |
| JP | 2020-109933 A | 7/2020 |
| JP | 2020-150534 A | 9/2020 |
| KR | 10-1383702 B1 | 4/2014 |
| KR | 10-2018-0124442 A | 11/2018 |
| KR | 10-2019-0018784 A | 2/2019 |
| WO | 2004/098231 A1 | 11/2004 |

OTHER PUBLICATIONS

Office Action dated Mar. 18, 2024 issued in corresponding Chinese Patent Application No. 202111470308.9.
Japanese Office Action dated Aug. 4, 2022, issued in corresponding Japanese Patent Application No. 2021-196720.
Office Action dated Jan. 17, 2025 issued in corresponding Korean Patent Application No. 10-2020-0170236.

* cited by examiner

DISPLAY APPARATUS AND VEHICLE INCLUDING THE SAME

CROSS-REFERENCE TO RELATED APPLICATION(S)

This application is a continuation of co-pending U.S. patent application Ser. No. 17/536,982, filed on Nov. 29, 2021, which claims the benefit of and priority to Korean Patent Application No. 10-2020-0170236, filed on Dec. 8, 2020. The entirety of each of the above prior U.S. and Korean patent applications is hereby incorporated by reference.

BACKGROUND

1. Technical Field

The present disclosure relates to a display apparatus and a vehicle including the same.

2. Discussion of the Related Art

Display apparatuses are equipped in home appliances and electronic apparatuses, such as televisions (TVs), monitors, notebook computers, smartphones, tablet computers, electronic organizers, electronic pads, wearable apparatuses, watch phones, portable information apparatuses, navigation apparatuses, and automotive control display apparatuses. Display apparatuses are used as a screen for displaying an image.

Display apparatuses may include a display panel for displaying an image and a sound device for outputting sound associated with the image. However, in general display apparatuses, because sound output from a sound device may travel rearward or in a downward direction of the display apparatus, sound quality may be degraded due to interference between sounds reflected from a wall and the ground. As such, it may be difficult to transfer an accurate sound, and an immersion experience of a viewer is reduced.

SUMMARY

Accordingly, the present disclosure is directed to a display apparatus and a vehicle including the same that substantially obviate one or more of the issues due to limitations and disadvantages of the related art.

The inventors of the present disclosure have recognized problems of general display apparatuses, and have performed various experiments so that, when a user, in front of a display panel, is watching an image, a traveling direction of sound is toward a front surface of the display panel. Thus, sound quality may be enhanced. As such, through the various experiments, the inventors have invented a display apparatus that may generate sound traveling to a forward region in front of the display panel, thereby enhancing sound quality.

An aspect of the present disclosure is to provide a display apparatus and a vehicle including the same that output sound toward a forward region in front of a display panel.

Another aspect of the present disclosure is to provide a display apparatus and a vehicle including the same that improve sound quality and increase an immersion experience of a viewer or listener.

Another aspect of the present disclosure is to provide a display apparatus for reducing, preventing, or minimizing damage of a driving circuit caused by a vibration of a display panel and a vehicle including the same.

Another aspect of the present disclosure is to provide a display apparatus, in which the degree of freedom in arrangement of a vibration apparatus is enhanced, and a vehicle including the display apparatus.

Another aspect of the present disclosure is to provide a display apparatus, including a vibration apparatus for enhancing sound performance and efficiency of a vibration transferred to a display panel, and a vehicle including the display apparatus.

Another aspect of the present disclosure is to provide a display apparatus that may simultaneously generate sound and a haptic feedback, and a vehicle including the display apparatus.

Another aspect of the present disclosure is to provide a display apparatus that may simultaneously generate sound and a haptic feedback, and may generate sound having an enhanced sound pressure level characteristic, and a vehicle including the display apparatus.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, there is provided a display apparatus, including: a display panel configured to display an image, a driving circuit including: a flexible circuit film connected to the display panel, and a printed circuit board connected to the flexible circuit film, a first supporting member at a rear surface of the display panel, the first supporting member having a hole therein, and a vibration apparatus supported by the first supporting member, the vibration apparatus including a first vibration apparatus disposed at the rear surface of the display panel, wherein the flexible circuit film extends through the hole, and wherein the printed circuit board is disposed at a rear surface of the first supporting member.

In another aspect, there is provided a display apparatus, including: a display panel configured to display an image, a driving circuit including: a flexible circuit film connected to the display panel, and a printed circuit board connected to the flexible circuit film, a supporting member at a rear surface of the display panel, the supporting member including an open region, and a vibration apparatus supported by the first supporting member, the vibration apparatus including a first vibration apparatus at the rear surface of the display panel, wherein the flexible circuit film extends through the open region, and wherein the printed circuit board is disposed at a rear surface of the supporting member.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages may be discussed below in conjunction with embodiments of the disclosure. It is to be understood that both the foregoing general description and the following detailed description of the present disclosure may be examples and explanatory, and may be intended to provide further explanation of the disclosure as claimed.

BRIEF DESCRIPTION OF THE DRAWINGS

The accompanying drawings, that may be included to provide a further understanding of the disclosure and may be incorporated in and constitute a part of this disclosure, illustrate embodiments of the disclosure and together with the description serve to explain various principles of the disclosure.

Figure 1:
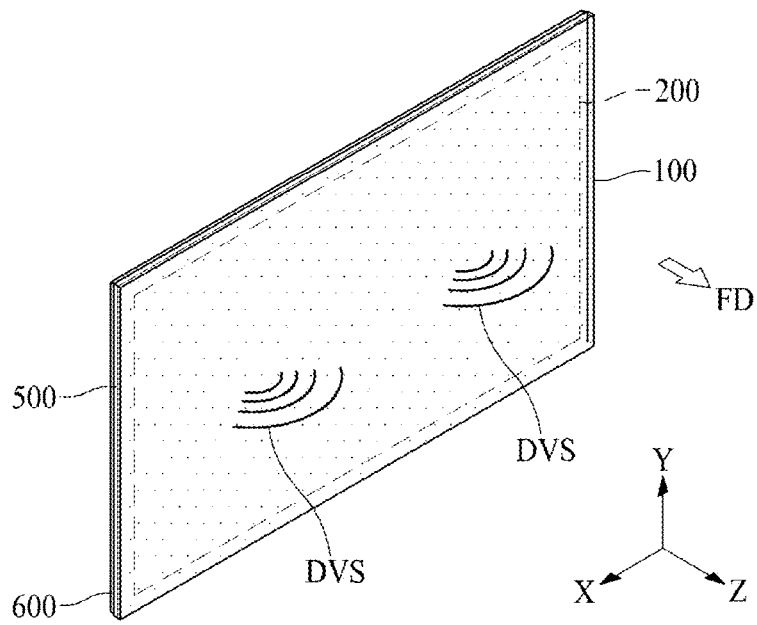
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations may be selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments may be provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure may be merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. When terms "comprise," "have," and "include" described in the present disclosure may be used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used. In describing a time relationship, when the temporal order is described as, for example, "after," "subsequent," "next," or "before," a case that is not continuous may be included, unless a more limiting term, such as "just," "immediate(ly)," or "direct(ly)," is used.

It will be understood that, although the terms "first," "second," etc., may be used herein to describe various elements, these elements should not be limited by these terms. These terms may be only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms may be merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings may be given merely for the convenience of description, and embodiments of the present disclosure may not be limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Hereinafter, example embodiments of the present disclosure will be described in detail with reference to the accompanying drawings.

When a driving circuit of a display apparatus is directly disposed on a rear surface of a display panel, the inventors have recognized a problem in which a desired sound is not transferred to the display panel due to the driving circuit in a case that transfers a vibration of a vibration generating module to the display panel. Also, when the vibration generating module is applied to an automotive display apparatus having a relatively small size, the inventors have recognized a problem in which the driving circuit is damaged by a vibration of the vibration generating module. Therefore, the inventors have performed various experiments for decreasing to damage to the driving circuit caused by the vibration generating module. Through the various experiments, the inventors of the present disclosure have invented a display apparatus having a new structure, which reduces or prevents the driving circuit from being damaged by the vibration generating module, decreases a contact between the driving circuit and the display panel to reduce a vibration caused by the driving circuit, and enhances sound of the vibration generating module.

FIG. 1 illustrates a display apparatus according to an embodiment of the present disclosure.

With reference to the example of FIG. 1, the display apparatus according to an embodiment of the present disclosure may output sound DVS (e.g., display vibration sound) according to a vibration of a display panel 200 configured to display an image. Therefore, the display apparatus according to an embodiment of the present disclosure may output the sound DVS using the display panel 200 as a vibration plate. Thus, the display apparatus may output the sound DVS to a forward region FD in front of a screen of the display panel 200, thereby transferring an accurate sound, improving sound quality, and increasing an immersion experience of a viewer or a listener.

Figure 2:
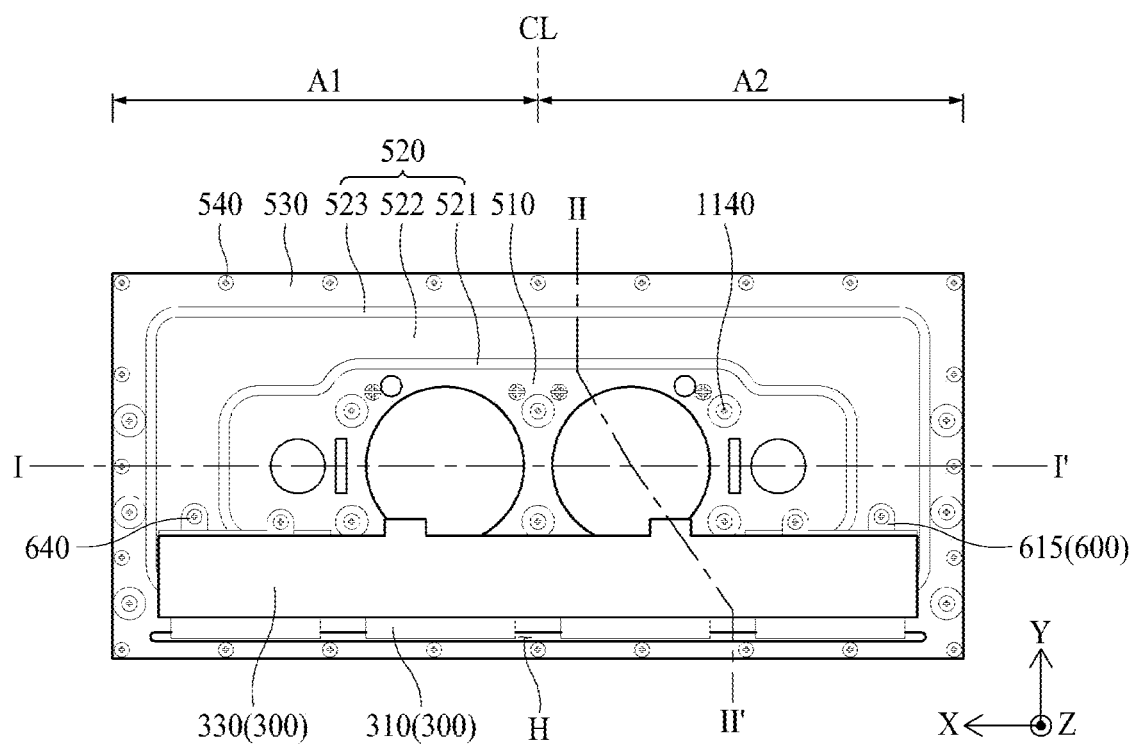
FIG. 2 illustrates a rear surface of a display apparatus illustrated in FIG. 1.
Figure 3:
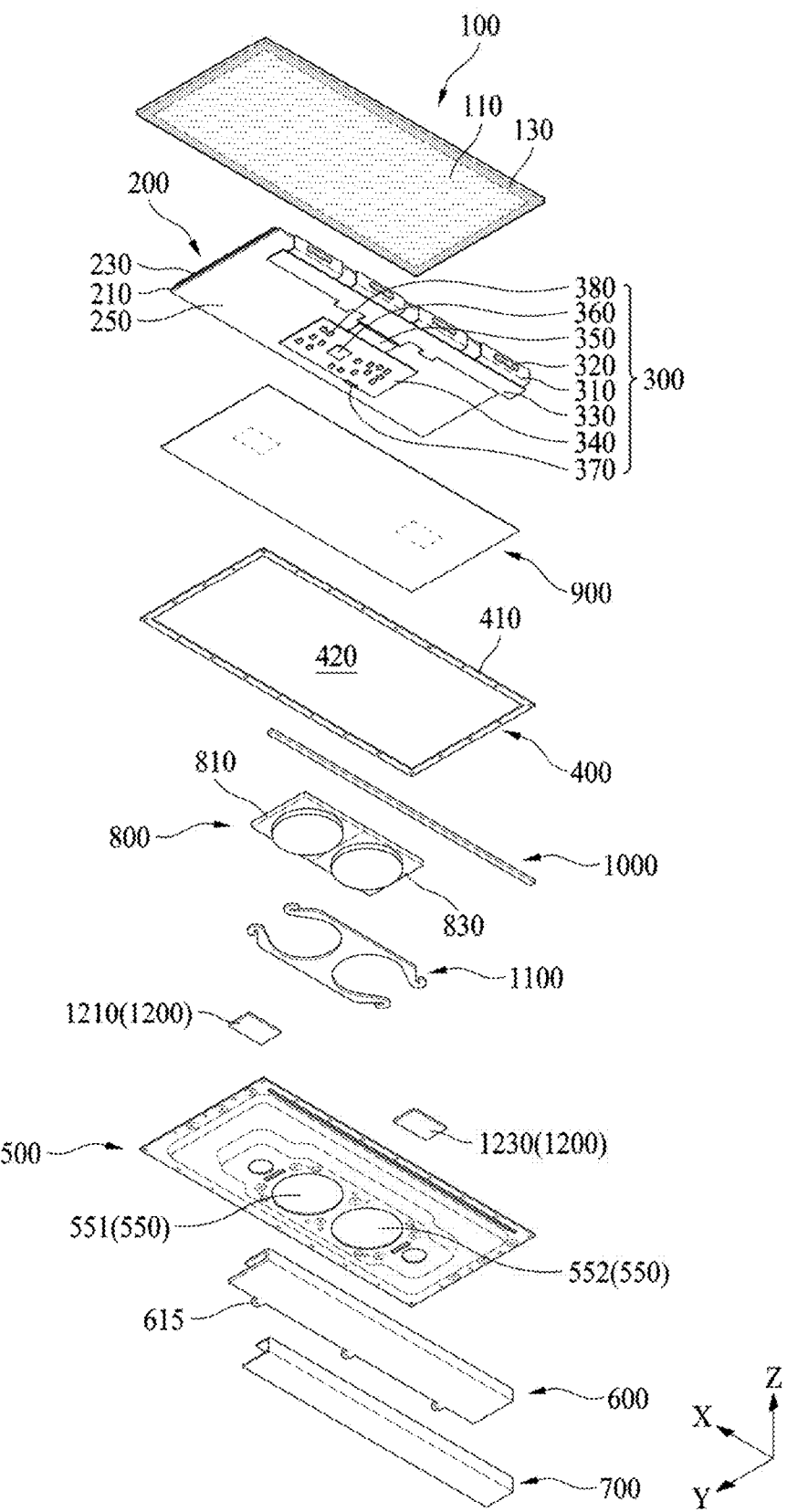
FIG. 3 is an exploded perspective view of the display apparatus illustrated in FIGS. 1 and 2.
Figure 4:
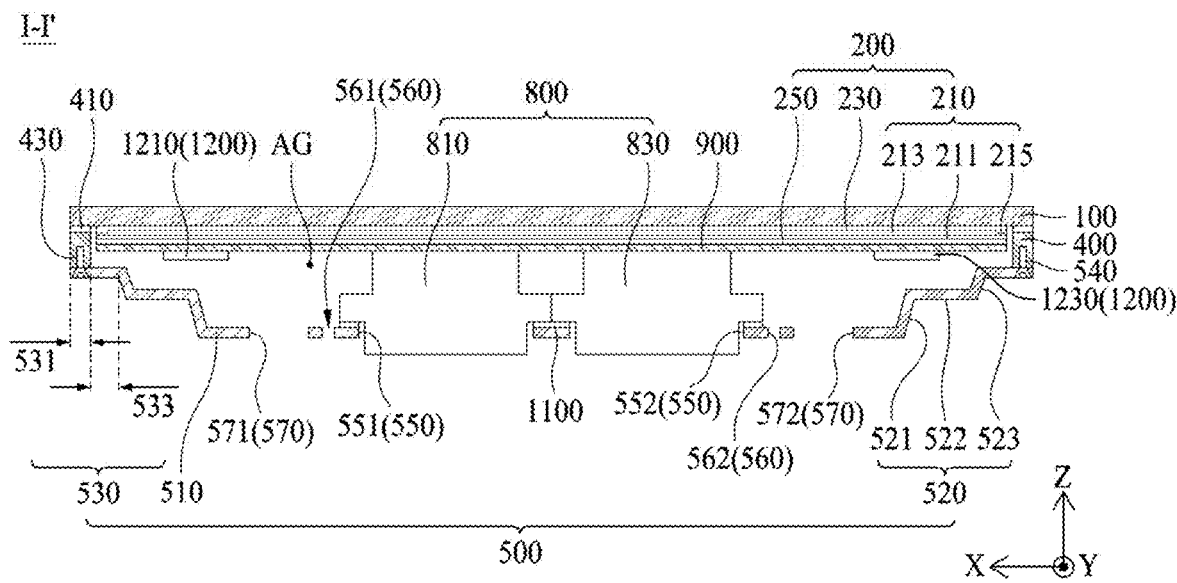
FIG. 4 is a cross-sectional view taken along line I-I' illustrated in FIG. 2.
Figure 5:
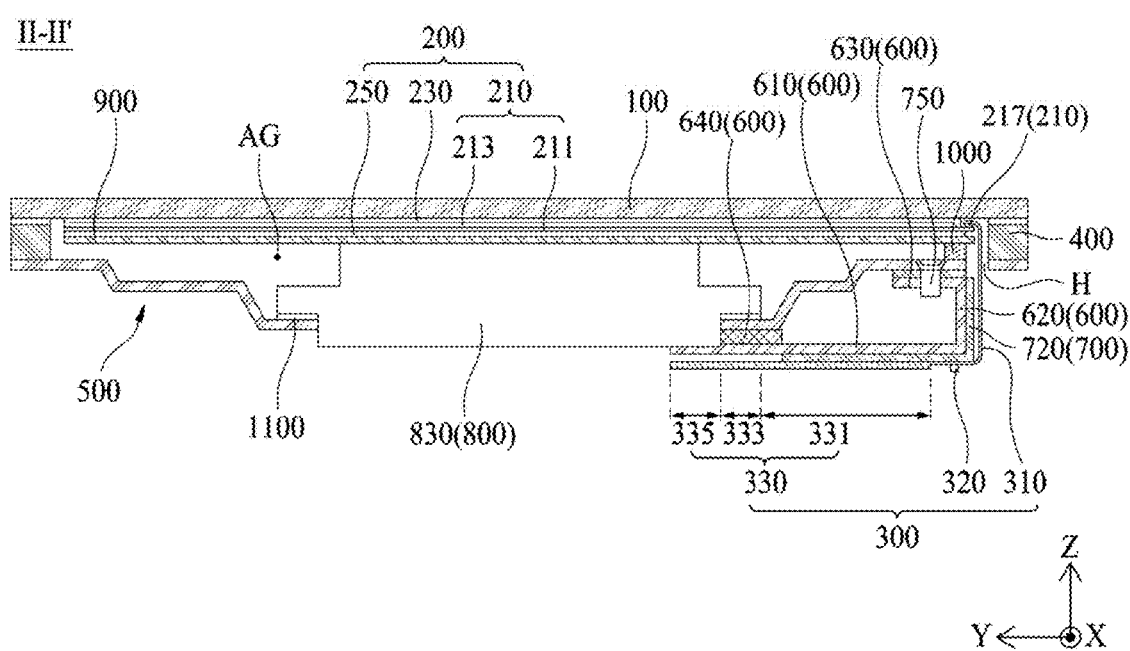
FIG. 5 is a cross-sectional view taken along line II-II' illustrated in FIG. 2.

FIG. 2 illustrates a rear surface of a display apparatus illustrated in FIG. 1. FIG. 3 is an exploded perspective view of the display apparatus illustrated in FIGS. 1 and 2. FIG. 4 is a cross-sectional view taken along line I-I' illustrated in FIG. 2. FIG. 5 is a cross-sectional view taken along line II-II' illustrated in FIG. 2.

With reference to the examples of FIGS. 2 to 5, a display apparatus according to an embodiment of the present disclosure may include a front member 100, a display panel 200, a driving circuit 300, a supporting frame 400, a first supporting member 500, a second supporting member 600, a third supporting member 700, and a vibration apparatus (or a first vibration apparatus) 800. However, embodiments of the present disclosure are not limited thereto.

The front member 100 may configure a foremost structure of the display apparatus, and may protect a screen of the display panel 200. The front member 100 may be disposed at a front surface of the display panel 200. For example, the front member 100 may cover the front surface of the display panel 200 to protect the display panel 200 from an external impact. Also, the front member 100 may vibrate along with the vibration of the display panel 200 to generate sound DVS.

The front member 100, according to an embodiment of the present disclosure, may include one or more of: a transparent plastic material, a glass material, or a tempered glass material, but embodiments of the present disclosure are not limited thereto. For example, in an embodiment of the present disclosure, the front member 100 may include one of sapphire glass and GORILLA® glass, or a stacked structure thereof. As another example embodiment of the present disclosure, the front member 100 may include a transparent plastic material, such as polyethylene terephthalate (PET) or the like. The front member 100 may include tempered glass, which may be selected based on a scratch resistance and transparency. For example, the front member 100 may be a front structure, a front window, a cover window, a glass window, a cover screen, a screen cover, a window glass, or the like, but embodiments of the present disclosure are not limited thereto.

With reference to the example of FIG. 3, the front member 100 may cover a non-display area, other than a display area of the display panel 200. The front member 100, according to an embodiment of the present disclosure, may include a transparent area 110 overlapping the display area of the display panel 200, and a light blocking area 130 overlapping the non-display area of the display panel 200. The light blocking area 130 may cover, not only the non-display area of the display panel 200, but also the non-display area where an image is not displayed on the display apparatus. The front member 100, according to an embodiment of the present disclosure, may have a polygonal shape, including a rectangular shape or a square shape, or may have a non-polygonal shape including at least one side having a curved shape.

The display panel 200 may be disposed at a rear surface (e.g., a backside surface) of the front member 100, and may display an image. The display panel 200 may act as a touch sensor that senses a user touch applied to the front member 100. The display panel 200 may output the sound DVS according to a vibration of the vibration apparatus 800, or may generate a haptic feedback (e.g., a haptic vibration) responding to the user touch.

The display panel 200 may be disposed at the rear surface of the front member 100 by a bonding process using a panel connection member (e.g., a transparent adhesive member). The panel connection member may include a pressure sensitive adhesive (PSA), an optically cleared adhesive (OCA), or an optically cleared resin (OCR), but embodiments of the present disclosure are not limited thereto.

The display panel 200 may include a self-emitting display panel or a curved type self-emitting display panel. For example, the display panel 200 may include a light-emitting display panel, a micro light-emitting diode display panel, a flexible light-emitting display panel, or a flexible micro light-emitting diode display panel, but embodiments of the present disclosure are not limited thereto.

The display panel 200, according to an embodiment of the present disclosure, may have a polygonal shape, including a rectangular shape or a square shape, or may have a non-polygonal shape including at least one side having a curved shape. The display panel 200 may have a shape that is the same as or different from the front member 100. As an example embodiment of the present disclosure, the front member 100 may have a rectangular shape, and the display panel 200 may have a rectangular shape having a size that is smaller than the front member 100. As another example embodiment of the present disclosure, the front member 100 may have a non-polygonal shape, and the display panel 200 may have a non-polygonal shape or a rectangular shape having a size that is smaller than the front member 100.

With reference to the example of FIG. 4, the display panel 200, according to an embodiment of the present disclosure, may include a pixel array substrate 210, including a pixel array layer 213 having a plurality of pixels, and an encapsulation layer 230 covering the pixel array layer 213.

The pixel array substrate 210, according to an embodiment of the present disclosure, may include a base substrate 211 and a pixel array layer 213 disposed at the base substrate 211. For example, the base substrate 211 may include a plastic material or a glass material, but embodiments of the present disclosure are not limited thereto. The pixel array layer 213 may include a pixel array including the plurality of pixels provided at the display area on the base substrate 211.

Each of the plurality of pixels may be provided in a plurality of pixel areas formed by a plurality of pixel driving lines including a plurality of gate lines and a plurality of data lines. Each of the plurality of pixels according to an embodiment of the present disclosure may include a pixel circuit, the pixel circuit including at least two or more thin-film transistors (TFTs) and at least one or more capacitor, and a light-emitting device layer that emits light with a current supplied from the pixel circuit.

The light-emitting device layer disposed at each of the plurality of pixels may include a first electrode connected to a corresponding pixel circuit, a light-emitting device disposed on the first electrode, and a second electrode disposed on the light-emitting device. As an example embodiment of the present disclosure, the light-emitting device may include an organic light-emitting layer or a quantum dot light-emitting layer. As another example embodiment of the present disclosure, the light-emitting device may include a micro light-emitting diode.

The light-emitting device layer, according to an embodiment of the present disclosure, may have a top-emission structure or a front-emission structure in which light emitted from the light-emitting device may pass through the encapsulation layer 230, and may be outputted toward the front member 100. For example, in the light-emitting device layer based on the top-emission structure (or the front-emission structure), the first electrode may be a reflective electrode, and the second electrode may be a transparent electrode. For example, the first electrode may include a light-reflecting material, and the second electrode may include a light-transmitting material.

According to another embodiment of the present disclosure, the light-emitting device layer may have a bottom-emission structure or a rear-emission structure in which light emitted from the light-emitting device may pass through the pixel array substrate 210, and may be outputted toward the front member 100. For example, in the light-emitting device layer based on the bottom-emission structure (or the rear emission structure), the first electrode may be a transparent electrode, and the second electrode may be a reflective electrode. The first electrode may include a light-transmitting material, and the second electrode may include a light-reflecting material. However, embodiments of the present disclosure are not limited thereto. For example, the light-emitting device layer may have a dual-emission structure.

The pixel array substrate 210 may further include a gate driving circuit 215 disposed at the non-display area of the base substrate 211. The gate driving circuit 215 may be disposed at the non-display area of the base substrate 211 to be connected to the plurality of gate lines in a one-to-one relationship. The gate driving circuit 215 may be disposed at one or more of a left non-display area and a right non-display area of the base substrate 211. For example, the gate driving circuit 215 may be implemented with a shift register, including a plurality of transistors in the non-display area, together with a process of forming a thin-film transistor (TFT) in pixel area.

The encapsulation layer 230 may be disposed on the pixel array substrate 210 to surround the pixel array layer 213, and thus, may reduce, prevent, or block penetration of oxygen and/or water into the light-emitting device of the pixel array layer 213. The encapsulation layer 230 according to an embodiment of the present disclosure may be a multi-layer structure in which an organic material layer and an inorganic material layer are alternately stacked, but embodiments of the present disclosure are not limited thereto. The inorganic material layer may reduce, prevent, or block penetration of oxygen and/or water into the light-emitting device. Also, the organic material layer may have a thickness that is relatively thicker than the inorganic material layer, e.g., to cover particles occurring in a manufacturing process, but embodiments of the present disclosure are not limited thereto.

The display panel 200, according to an embodiment of the present disclosure, may further include a protection substrate on the encapsulation layer 230. The protection substrate (e.g., an encapsulation substrate) may be disposed on or coupled (or connected) to a front surface of the encapsulation layer 230 by a filler or an adhesive. As an example embodiment of the present disclosure, when the light-emitting device layer has the top-emission structure, the protection substrate may include a transparent material. As another example embodiment of the present disclosure, when the light-emitting device layer has the bottom-emission structure, the protection substrate may include a transparent material, an opaque material, or a metal material. For example, when the light-emitting device layer has the top-emission structure, the protection substrate may be omitted.

The display panel 200, according to an embodiment of the present disclosure, may further include an optical film. The optical film may be a polarizing film that reduces, prevents, or minimizes reflection of external light to enhance the visibility and contrast ratio of the display panel 200. The polarizing film may circularly polarize the external light reflected by the TFT and/or the pixel driving lines at the pixel array substrate 210, thereby reducing, preventing, or minimizing reflection of the external light.

When the light-emitting device layer has the top-emission structure, the optical film according to an embodiment of the present disclosure may be disposed (or attached) on an upper surface of the encapsulation layer 230 by a transparent adhesive member. When the display panel 200 has the optical film, the protection substrate may be omitted. When the light-emitting device layer has the bottom-emission structure, the optical film according to another embodiment of the present disclosure may be disposed (or attached) on a rear surface of the pixel array substrate 210 by a transparent adhesive member.

The display panel 200, according to an embodiment of the present disclosure, may further include a touch electrode layer configured to sense a user touch applied to the front member 100. The touch electrode layer may include a plurality of touch electrodes configured to sense the user touch. Each of the plurality of touch electrodes may act as a touch sensor configured to sense the user touch, based on a mutual-capacitance type or a self-capacitance type.

The touch electrode layer according to an embodiment may be implemented as a touch panel including the plurality of touch electrodes. For example, when the light-emitting device layer has the top-emission structure, an add-on type touch panel may be disposed on or coupled (or connected) to the encapsulation layer 230 or the optical film, and when the light-emitting device layer has the bottom-emission structure, the add-on type touch panel may be disposed on or coupled to the rear surface of the pixel array substrate 210.

The touch electrode layer according to another embodiment of the present disclosure may be directly formed on the encapsulation layer 230 based on an in-cell type. For example, when the light-emitting device layer has the top-emission structure, the touch electrode layer based on an in-cell type may be directly formed on the front surface of the encapsulation layer 230.

The display panel 200, according to an embodiment of the present disclosure, may further include a color filter layer provided on the encapsulation layer 230 to overlap each of the plurality of pixels. The light-emitting device disposed at each of the plurality of pixels may emit white light. As an example embodiment of the present disclosure, when the light-emitting device layer has the top-emission structure, the color filter layer may be formed on the encapsulation layer 230. As another example embodiment of the present disclosure, when the light-emitting device layer has the bottom-emission structure, the color filter layer may be disposed inside the pixel array layer 213.

The display panel 200, according to an embodiment of the present disclosure, may further include a back plate 250. The back plate 250 may be formed to have the same shape as the pixel array substrate 210. As an example embodiment of the present disclosure, when the light-emitting device layer has the top-emission structure, the back plate 250 may be disposed at the rear surface (e.g., a backside surface) of the pixel array substrate 210 by a transparent adhesive member. As another example embodiment of the present disclosure, when the light-emitting device layer has the bottom-emission structure, the back plate 250 may be a protection substrate.

The back plate 250 may increase stiffness of the display panel 200, and may dissipate heat that may occur in the display panel 200. The back plate 250, according to an embodiment of the present disclosure, may include a metal material that is high in thermal conductivity. For example, the back plate 250 may include one or more of: aluminum (Al), copper (Cu), silver (Ag), and magnesium (Mg), or an alloy thereof, or may include a stainless steel material. The back plate 250 may be a heat diffusion sheet, a heat diffusion layer, a heat diffusion plate, a heat sink, a heat dissipation sheet, a heat dissipation layer, a heat dissipation plate, or the like, but embodiments of the present disclosure are not limited thereto.

With reference to the examples of FIGS. 2, 3, and 5, the driving circuit 300 may be disposed at the rear surface of the display panel 200, and may be connected to the display panel 200. For example, the driving circuit 300 may be connected to a pad part 217 provided at the first periphery portion (or one periphery portion) of the display panel 200. The driving circuit 300 may be implemented to display an image at the plurality of pixels disposed on the pixel array substrate 210 of the display panel 200. For example, the driving circuit 300 may display an image at the display area of the display panel 200. For example, the driving circuit 300 may sense a user touch through the plurality of touch electrodes disposed at the touch electrode layer of the display panel 200. The driving circuit 300, according to an embodiment of the present disclosure, may include at least one flexible circuit film 310, at least one data driving integrated circuit (IC) 320, and a printed circuit board (PCB) 330.

Each of the at least one flexible circuit film 310 may be connected to each of a plurality of pad parts 217 provided at a first periphery portion (or one periphery portion) of the pixel array substrate 210 of the display panel 200. The plurality of pad parts 217 may be disposed by certain intervals in the first direction X. Therefore, each of the at least one flexible circuit film 310 may be connected to each of the plurality of pad parts 217 arranged at certain intervals. Thus, each of the at least one flexible circuit film 310 may be disposed by certain intervals in the first direction X. For example, one side of each of the at least one flexible circuit film 310 may be disposed at (e.g., connected to) the pad part 217 provided at the display panel 200 by a film attaching process, e.g., using an anisotropic conductive film.

Each of the at least one flexible circuit film 310 may extend to a rear surface of the first supporting member 500, and may be disposed at the rear surface of the first supporting member 500. For example, each of the at least one flexible circuit film 310 may be bent (or folded) toward the rear surface of the first supporting member 500 from the pad part 217. For example, the other side of each of the at least one flexible circuit film 310 may be disposed at a first rear periphery portion of the first supporting member 500. For example, each of the at least one flexible circuit film 310 may extend toward the first rear periphery portion of the first supporting member 500 through a hole H formed at a first periphery portion (e.g., one periphery portion) of the first supporting member 500, and may be disposed at the first rear periphery portion of the first supporting member 500. For example, the hole H may be a through-hole, but embodiments of the present disclosure are not limited thereto.

The plurality of data driving integrated circuits (ICs) 320 may be respectively mounted on the at least one flexible circuit film 310. Each of the plurality of data driving ICs 320 may be mounted on the flexible circuit film 310 by a chip bonding process or a surface mounting process. Each of the plurality of data driving ICs 320 may convert digital pixel data into an analog data signal based on the digital pixel data and a data control signal supplied from the outside, and may supply the analog data signal to a corresponding pixel.

The printed circuit board (PCB) 330 may be connected to the at least one flexible circuit film 310 in common. For example, the PCB 330 may be connected to the display panel 200 through the at least one flexible circuit film 310. The PCB 330 according to an embodiment of the present disclosure may be electrically connected to the other side of each of the at least one flexible circuit film 310 by a film attachment process, e.g., using an anisotropic conductive film, and may be disposed at the first rear periphery portion of the first supporting member 500 based on bending of each of the at least one flexible circuit film 310. The first rear periphery portion of the first supporting member 500 may be a region of the rear surface of the first supporting member 500 where the at least one flexible circuit film 310 and the PCB 330 are disposed. For example, the first rear periphery portion of the first supporting member 500 may be referred to as a "rear one-side portion" of the first supporting member 500.

According to an embodiment of the present disclosure, the PCB 330 may be disposed at the rear surface of the first supporting member 500 to not overlap the vibration apparatus 800. According to an embodiment of the present disclosure, a portion of the PCB 330 may be disposed at a rear surface of the vibration apparatus 800 to overlap the vibration apparatus 800. According to an embodiment of the present disclosure, a portion of the PCB 330 overlapping the vibration apparatus 800 may overlap or may not overlap the first supporting member 500.

According to an embodiment of the present disclosure, the PCB 330 may include a first substrate region 331 overlapping the first supporting member 500. For example, the PCB 330 may include the first substrate region 331 overlapping the first supporting member 500, and a second substrate region 333 overlapping the first supporting member 500 and the vibration apparatus 800. For example, the PCB 330 may include the first substrate region 331 overlapping the first supporting member 500, the second substrate region 333 overlapping the first supporting member 500 and the vibration apparatus 800, and a third substrate region 335 overlapping the vibration apparatus 800. According to an embodiment of the present disclosure, the PCB 330 may include the first substrate region 331 overlapping the first supporting member 500, and the third substrate region 335 overlapping the vibration apparatus 800.

According to an example embodiment of the present disclosure, when the PCB 330 is disposed to directly contact the rear surface of the display panel 200, because a vibration of the display panel 200 for sound DVS is directly transferred to the PCB 330, the PCB 330 may be damaged or a detachment phenomenon (or a peeling phenomenon) between the PCB 330 and the flexible circuit film 310 may occur due to the vibration or shaking of the PCB 330, and the data driving IC 320 may be damaged by the vibration or shaking of the flexible circuit film 310 caused by the vibration or shaking of the PCB 330. Therefore, in the display apparatus according to an embodiment of the present disclosure, the PCB 330 may be disposed at the rear surface of the first supporting member 500 to not directly contact the rear surface of the display panel 200. Thus, the transfer of a vibration of the display panel 200 to the PCB 330 may be reduced, prevented, or minimized. Accordingly, damage to the PCB 330, caused by a vibration of the display panel 200, may be reduced, prevented, or minimized, and a detachment phenomenon between the flexible circuit film 310 and the PCB 330 and the damage of the data driving IC 320 may be reduced, prevented, or minimized.

Moreover, when the PCB 330 is not disposed between the display panel 200 and the first supporting member 500, the arrangement of the vibration apparatus 800 may not be affected by the PCB 330. Thus, the degree of freedom in arrangement of the vibration apparatus 800 may be secured. Accordingly, based on the arrangement of the vibration apparatus 800, a sound pressure level, sound quality, and reproduction pitched sound band of sound generated based on a vibration of the display panel 200 may increase.

The driving circuit 300, according to an embodiment of the present disclosure, may further include a control board 340, a signal transfer member 350, a timing control circuit 360, a user connector 370, and a vibration driving circuit 380. The control board 340 may be disposed at a rear surface of the first supporting member 500, and may be connected to the PCB 330 through the signal transfer member 350. The control board 340 may be connected to a display host system (e.g., a display driving system) through the user connector 370. The control board 340 may provide the timing control circuit 360 with a timing synchronization signal and video data, each supplied from the display host system, and may provide digital pixel data, output from the timing control circuit 360, to the data driving IC 320 through the signal transfer member 350, the PCB 330, and the flexible circuit film 310. The control board 340 may further include a voltage generating circuit that generates various driving voltages needed for driving of the display apparatus.

The timing control circuit 360 may be mounted on the control board 340, and may receive the timing synchronization signal and the video data each supplied from the display host system through the user connector 370. For example, the timing synchronization signal may include a vertical synchronization signal, a horizontal synchronization signal, a data enable signal, and a main clock signal, or the like.

The timing control circuit 360 may generate a gate control signal for controlling a driving timing of a gate driving circuit, and a data control signal for controlling a driving timing of each of the plurality of data driving ICs 320 based on the timing synchronization signal. For example, the gate control signal may include at least one gate start signal and a plurality of gate shift clocks. The data control signal may include a source start signal, a source shift clock, and a source output enable signal, or the like.

The timing control circuit 360 may be mounted on a front surface of the PCB 330, instead of the control board 340. Also, the voltage generating circuit may be mounted on the front surface of the PCB 330, instead of the control board 340. In this case, the control board 340 may be omitted.

The driving circuit 300, according to an embodiment of the present disclosure, may further include a touch driving circuit connected to the touch electrode layer of the display panel 200. The touch driving circuit may sense a user touch through each of the plurality of touch electrodes disposed in the touch electrode layer to generate touch raw data, and may transmit coordinate information about the user touch to the display host system based on the generated touch raw data. For example, the touch driving circuit may provide an event generation of a user touch and touch coordinate information to the vibration driving circuit.

The display host system may include a main board, various circuits mounted on the main board, various storage mediums, a peripheral device, a keyboard, and a power device, or the like. The various circuits mounted on the main board may include a central control circuit for processing various information, an image processing circuit for processing data according to control by the central control circuit, and a sound processing circuit for processing sound according to control by the central control circuit. The display host system may process various information, may generate the timing synchronization signal and the video data to provide the timing synchronization signal and the video data to the control board 340, and may generate a driving signal including a sound signal or a haptic feedback signal to provide the driving signal to the control board 340. For example, the sound signal may be synchronized with the video data, or may not be synchronized with the video data.

The display host system may execute an application program associated with touch coordinates corresponding to coordinate information about a user touch provided from the touch driving circuit, or may perform a user interface based on touch drawing of a user. Also, the display host system may generate a driving signal including a haptic feedback signal corresponding to the coordinate information about the user touch provided from the touch driving circuit, and may provide the driving signal to the driving circuit 300.

The supporting frame 400 may be disposed at the rear surface of the front member 100. For example, the supporting frame 400 may surround at least one or more side surfaces (e.g., lateral surfaces) of the display panel 200. Also, the supporting frame 400 may surround the vibration apparatus 800. For example, the supporting frame 400 may have the same shape as the front member 100. The supporting frame 400 may be disposed at an outermost side surface of the display apparatus, and may be directly exposed at the outside of the display apparatus. For example, the supporting frame 400 may be an outermost frame, an outermost mold material, an outermost mechanism, a guide frame, a guide panel, an edge frame, a mold frame, or the like, but embodiments of the present disclosure are not limited thereto.

The supporting frame 400 may support the first supporting member 500. The supporting frame 400 may provide an air gap AG between the rear surface of the display panel 200 and the first supporting member 500, or may provide an accommodating space or a storing space of the display panel 200. Moreover, the supporting frame 400 may provide an accommodating space or a storing space of the vibration apparatus 800.

According to an embodiment of the present disclosure, the supporting frame 400 may be disposed at a rear periphery portion of the front member 100 by a first connection member (or a first coupling member) 410. The first connection member 410 may be interposed between the rear periphery portion of the front member 100 and the supporting frame 400. Thus, the supporting frame 400 may be disposed at the rear surface of the front member 100.

The first connection member 410, according to an embodiment of the present disclosure, may include an adhesive resin, a double-sided tape having an adhesive layer, or a double-sided foam pad having an adhesive layer, but embodiments of the present disclosure are not limited thereto. In the first connection member 410 according to an embodiment of the present disclosure, the adhesive resin and the adhesive layer may include an acrylic-based or urethane-based adhesive material, but embodiments of the present disclosure are not limited thereto. For example, in the first connection member 410, the adhesive resin and the adhesive layer may include a urethane-based adhesive material, which has a relatively ductile characteristic, rather than an acrylic-based adhesive material having a characteristic that is relatively high in hardness, for reducing, preventing, or minimizing the transfer of a vibration of the front member 100 by a vibration of the display panel 200 to the supporting frame 400, but embodiments of the present disclosure are not limited thereto.

The supporting frame 400 according to an embodiment of the present disclosure may include an opening 420, which may be disposed at the rear periphery portion of the front member 100 to overlap the display panel 200. For example, the supporting frame 400 may have the same shape as the front member 100, but embodiments of the present disclosure are not limited thereto. For example, the supporting frame 400 may have a polygonal shape or a non-polygonal shape, which may be the same as the front member 100.

The supporting frame 400 may include an opening 420 in a central region. The supporting frame 400 may have a four-surface supporting structure (or a tetragonal frame structure) to support four peripheries of an upper, a lower, a left, and a right of the front member 100. Therefore, because the four periphery of the upper, the lower, the left, and the right of the front member 100 are all or entirely supported by the supporting frame 400, all of the upper, lower, left, and right periphery portions of the front member 100 may have the same stiffness. Accordingly, a vibration mode of the display panel 200 may be provided near the vibration apparatus 800, and a vibration region (or excitation position) of the vibration apparatus 800 may match a maximum displacement position of the display panel 200, thereby enhancing the vibration efficiency of the vibration apparatus 800 to enhance the sound pressure level, quality, and reproduction band of sound generated by a vibration of the display panel 200. It should be appreciated that the terms "left," "right," "upper," and "lower" are used as examples herein for convenience of explanation and illustration, and are interchangeable, as should be understood by one of ordinary skill in the art.

The opening 420 of the supporting frame 400 may be implemented by an inner surface (e.g., an inner sidewall) of the supporting frame portion 400. The opening 420 of the supporting frame 400 may store or accommodate the display panel 200. For example, side surfaces of the display panel 200 may surround the opening 420 of the supporting frame 400. Moreover, the opening 420 of the supporting frame 400 may store or accommodate the vibration apparatus 800. For example, at least one or more side surfaces of vibration apparatus 800 may surround the opening 420 of the supporting frame 400. For example, the opening 420 of the supporting frame 400 may have the same shape as the display panel 200. For example, the opening 420 of the supporting frame 400 may have a size that is greater than the display panel 200. For example, the opening 420 of the supporting frame 400 may have a polygonal shape or a non-polygonal shape, which may be the same as the display panel 200.

The supporting frame 400 according to an embodiment of the present disclosure may further include a plurality of connection portions 430 formed at certain intervals at one surface or one portion. Each of the plurality of connection portions 430 may be a structure for disposing (e.g., connecting) the first supporting member 500 to the supporting frame 400, and may be formed at a surface opposite to the first supporting member 500. For example, each of the plurality of connection portions 430 may include a groove or a hole. For example, the groove may be a screw groove, or a screw hole, but embodiments of the present disclosure are not limited thereto.

Figure 6:
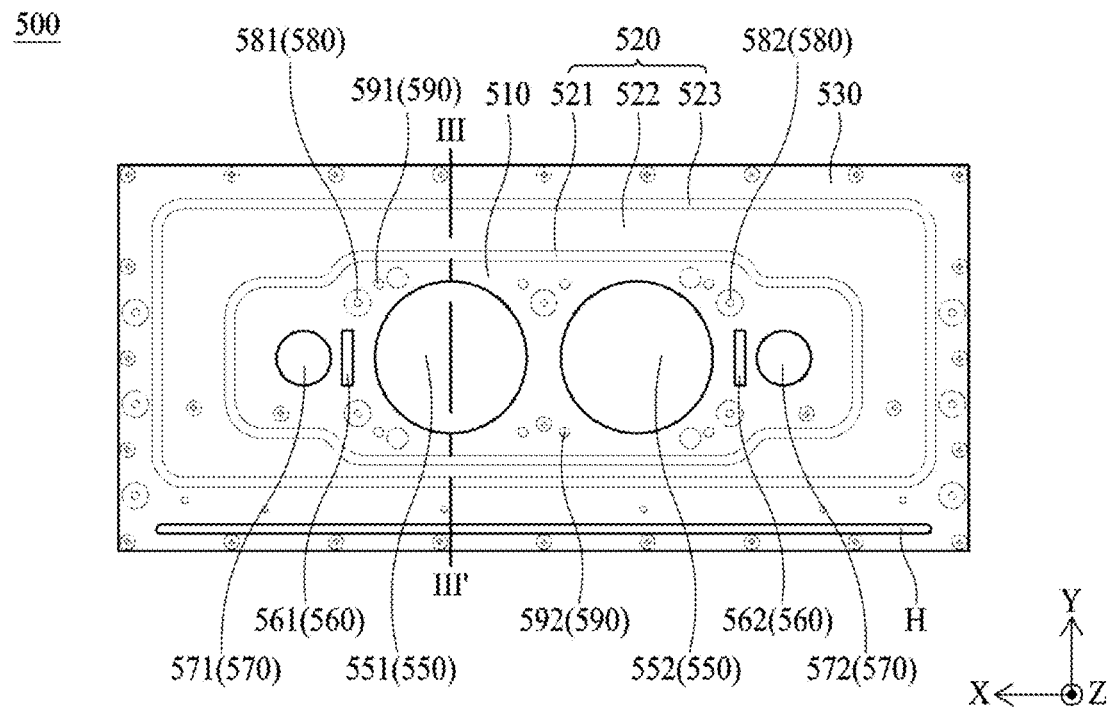
FIG. 6 illustrates a rear surface of a first supporting member according to an embodiment of the present disclosure.
Figure 7A:
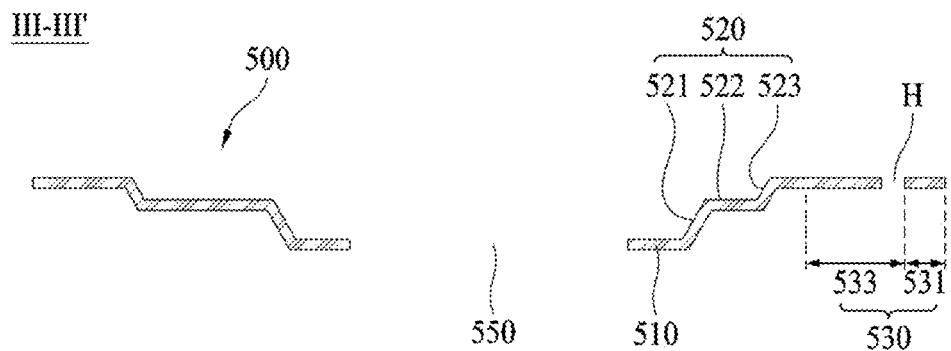
FIG. 7A is a cross-sectional view taken along line III-III' illustrated in FIG. 6.
Figure 7B:
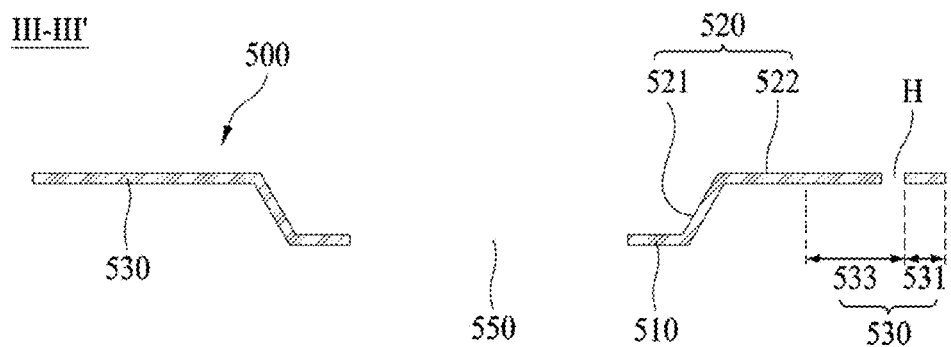
FIG. 7B is another cross-sectional view taken along line III-III' illustrated in FIG. 6.
Figure 7C:
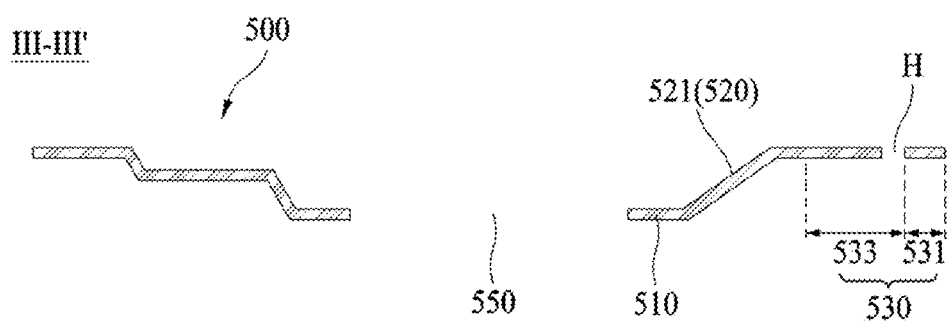
FIG. 7C is another cross-sectional view taken along line III-III' illustrated in FIG. 6.

FIG. 6 illustrates a rear surface of a first supporting member according to an embodiment of the present disclosure. FIG. 7A is a cross-sectional view taken along line III-III' illustrated in FIG. 6. FIGS. 7B and 7C are another cross-sectional view taken along line III-III' illustrated in FIG. 6.

With reference to the examples of FIGS. 2 to 7C, the first supporting member 500 may be disposed at the rear surface of the display panel 200. For example, the first supporting member 500 may be disposed at the rear surface of the supporting frame 400. For example, the first supporting member 500 may be supported by a periphery portion of the supporting frame 400, and may cover the rear surface of the display panel 200. The first supporting member 500 may support or store (or accommodate) the vibration apparatus 800. The first supporting member 500 may be formed to have the same shape as the display panel 200, and may be supported by the supporting frame 400.

According to an embodiment of the present disclosure, the first supporting member 500 may be disposed at the supporting frame 400 by the second connection member (e.g., the second coupling member) 540. For example, the second connection member 540 may be a screw or bolt, but embodiments of the present disclosure are not limited thereto. For example, one or more second connection members 540 may be disposed at a periphery portion of the first supporting member 500. For example, a hole may be formed at the region where the second connection member 540 of the first supporting member 500 is to be arranged to facilitate coupling (or fastening) of the second connection member 540.

The first supporting member 500 according to an embodiment of the present disclosure may act as a supporter for supporting the vibration apparatus 800. For example, the first supporting member 500 may include a metal material or a metal alloy material. For example, the first supporting member 500 may include one or more material among: aluminum (Al), an Al alloy, magnesium (Mg), a Mg alloy, an iron-nickel (Fe—Ni) alloy, and stainless steel, or an alloy thereof, or may have a junction structure, but embodiments of the present disclosure are not limited thereto. For example, the first supporting member 500 may have a thickness of 0.5 mm or more, but embodiments of the present disclosure are not limited thereto. The first supporting member 500 may be a rear cover, a back cover, or a rear member, but embodiments of the present disclosure are not limited thereto.

The first supporting member 500, according to another example embodiment of the present disclosure, may have a thickness of 0.5 mm or less for decreasing a weight of the display apparatus. In this case, because the stiffness of the first supporting member 500 may be weak due to having a relatively thin thickness compared to the front member 100, distortion of the first supporting member 500 may occur due to a vibration of the vibration apparatus 800. Due to this, the vibration of the vibration apparatus 800 may not normally be transferred to the front member 100.

When the first supporting member 500 does not have sufficient stiffness, the inventors of the present disclosure have recognized a problem in which the first supporting member 500 may absorb some of energy of the vibration apparatus 800. For example, when the first supporting member 500 absorbs the energy of the vibration apparatus 800, an insufficient vibration equal to energy absorbed by the first supporting member 500 may be transferred to the display panel 200. Therefore, due to an insufficient vibration of the vibration apparatus 800, it may be difficult for the display panel 200 to output sufficient sound. Thus, when the energy or vibration of the vibration apparatus 800 is lost, the inventors of the present disclosure have recognized a problem in which it is difficult for the display panel 200 to output a desired sound.

Therefore, the inventors of the present disclosure have performed various experiments for increasing or reinforcing stiffness of the first supporting member 500. Another structure may be additionally provided at the first supporting member 500 to increase stiffness of the first supporting member 500, but in this case, there may be a problem in which the display apparatus may be thickened. Through the various experiments, the inventors of the present disclosure have provided a forming portion (e.g., a stiffness reinforcement structure) at the first supporting member 500 for increasing or reinforcing stiffness of the first supporting member 500, without any increase in thickness of the display apparatus. Moreover, the display apparatus according to another embodiment of the present disclosure may further include at least one or more reinforcement portion for reinforcing stiffness of the first supporting member 500. For example, the at least one or more reinforcement portion may further include a reinforcement bar or a stiffness reinforcement structure.

The first supporting member 500, according to an embodiment of the present disclosure, may include a $1\text{-}1^{th}$ plate 510, a forming portion 520, and a $1\text{-}2^{th}$ plate 530. According to an embodiment of the present disclosure, the $1\text{-}1^{th}$ plate 510 may configure a base of the first supporting member 500, the forming portion 520 may extend in an outward direction of the $1\text{-}1^{th}$ plate 510 from the $1\text{-}1^{th}$ plate 510, the $1\text{-}2^{th}$ plate 530 may extend in an outward direction of the $1\text{-}1^{th}$ plate 510 from the forming portion 520, and the forming portion 520 may be a region between the $1\text{-}1^{th}$ plate 510 and the $1\text{-}2^{th}$ plate 530. For example, the $1\text{-}1^{th}$ plate 510, the forming portion 520, and the $1\text{-}2^{th}$ plate 530 may be provided as one body or as a single body.

The $1\text{-}1^{th}$ plate 510 (e.g., a $1\text{-}1^{th}$ supporting plate) according to an embodiment of the present disclosure may be disposed at the rear surface of the display panel 200. For example, the $1\text{-}1^{th}$ plate 510 may be disposed to face the rear surface of the display panel 200, and may cover the rear surface of the display panel 200. For example, the $1\text{-}1^{th}$ plate 510 may include a plurality of holes.

The plate 510 may be disposed at a center region of the first supporting member 500, and may support the vibration apparatus 800. For example, the $1\text{-}1^{th}$ plate may have a flat shape, but embodiments of the present disclosure are not limited thereto. The first supporting member 500 according to an embodiment of the present disclosure may include a first hole (e.g., a vibration apparatus accommodating hole) 550, which may be formed at the $1\text{-}1^{th}$ plate 510. The first hole 550 may be formed at the $1\text{-}1^{th}$ plate 510 to have a size and a shape that may enable a portion of the rear surface of the vibration apparatus 800 to be inserted or accommodated into the first hole 550.

The first hole 550 according to an embodiment of the present disclosure may include a $1\text{-}1^{th}$ hole 551 formed at a $1\text{-}1^{th}$ region (e.g., a $1\text{-}1^{th}$ plate region) of the $1\text{-}1^{th}$ plate 510, and a $1\text{-}2^{th}$ hole 552 formed at a $1\text{-}2^{th}$ region (e.g., a $1\text{-}2^{th}$ plate region) of the $1\text{-}1^{th}$ plate 510 to be adjacent to the $1\text{-}1^{th}$ hole 551. For example, the $1\text{-}1^{th}$ hole 551 and the $1\text{-}2^{th}$ hole 552 may be disposed in parallel in a first direction X. The $1\text{-}1^{th}$ hole 551 and the $1\text{-}2^{th}$ hole 552, according to an embodiment of the present disclosure, may each have a circular shape, but embodiments of the present disclosure are not limited thereto. For example, the $1\text{-}1^{th}$ hole 551 and the $1\text{-}2^{th}$ hole 552 may each have an oval shape or a polygonal shape, or may have a shape which enables a portion of the rear surface of the vibration apparatus 800 to be inserted or accommodated thereinto. As another example, the shapes of the $1\text{-}1^{th}$ hole 551 and the $1\text{-}2^{th}$ hole 552 may each be different from one another.

The first supporting member 500 according to an embodiment of the present disclosure may further include a second hole (e.g., a line hole or a wire hole) 560 formed at the $1\text{-}1^{th}$ plate 510. The second hole 560 may have a size and a shape that enable a driving signal cable of the vibration apparatus 800 disposed between the rear surface of the display panel 200 and the first supporting member 500 to pass or extend through the second hole 560, and to extend to the outside. For example, the second hole 560 may be used as a path through which a driving signal cable of the second vibration apparatus 1200 to be described below may pass or extend. The second hole 560, according to an embodiment of the present disclosure, may include a $2\text{-}1^{th}$ hole 561 adjacent to the $1\text{-}1^{th}$ hole 551, and a $2\text{-}2^{th}$ hole 562 adjacent to the $1\text{-}2^{th}$ hole 552.

The first supporting member 500 according to an embodiment of the present disclosure may further include a third hole (e.g., a dummy hole) 570 formed at the $1\text{-}1^{th}$ plate 510. For example, the third hole 570 may be used as a vent hole. For example, the third hole 570 may include a $3\text{-}1^{th}$ hole 571 adjacent to the $1\text{-}1^{th}$ hole 551, and a $3\text{-}2^{th}$ hole 572 adjacent to the $1\text{-}2^{th}$ hole 552, but embodiments of the present disclosure are not limited thereto. For example, the second hole 560 may be disposed between the first hole 550 and the third hole 560, but embodiments of the present disclosure are not limited thereto.

The first supporting member 500, according to an embodiment of the present disclosure, may further include a fourth hole 580 formed at the $1\text{-}1^{th}$ plate 510. For example, the fourth hole 580 may be used to couple or connect the first supporting member 500 to the supporting device 1100. According to an embodiment of the present disclosure, the fourth hole 580 may be used to connect or couple the first supporting member 500 to the vibration apparatus 800. For example, a sixth connection member 1140 of the supporting device 1100 may be inserted or accommodated through the fourth hole 580, and may be coupled or connected to the supporting device 1100. For example, the fourth hole 580 may include a $4\text{-}1^{th}$ hole 581 adjacent to the $1\text{-}1^{th}$ hole 551, and a $4\text{-}2^{th}$ hole 582 adjacent to the $1\text{-}2^{th}$ hole 552.

The first supporting member 500, according to an embodiment of the present disclosure, may further include a fifth hole 590 formed at the $1\text{-}1^{th}$ plate 510. For example, the fifth hole 590 may couple or connect the first supporting member 500 to the vibration apparatus 800. According to an embodiment of the present disclosure, the fifth hole 590 may connect or couple the first supporting member 500 to the supporting device 1100. For example, the fifth hole 590 may be adjacent to the $1\text{-}1^{th}$ hole 551 and the $1\text{-}2^{th}$ hole 552. For example, the fifth hole 590 may include a $5\text{-}1^{th}$ hole 591 adjacent to the $1\text{-}1^{th}$ hole 551, and a $5\text{-}2^{th}$ hole 592 adjacent to the $1\text{-}2^{th}$ hole 552.

The forming portion 520, according to an embodiment of the present disclosure, may be disposed at the rear surface of the display panel 200. For example, the forming portion 520 may be disposed to face the rear surface of the display panel 200, and may cover the rear surface of the display panel 200.

The forming portion 520 may be a region that extends in an outward direction of the $1\text{-}1^{th}$ plate 510 from the $1\text{-}1^{th}$ plate 510. For example, one end or one portion of the forming portion 520 may be connected to an outer end or outer portion of the $1\text{-}1^{th}$ plate 510. The forming portion 520 may support the vibration apparatus 800. The forming portion 520 may increase or reinforce the stiffness of the first supporting member 500, and may be formed to be concave or convex from the 1-1$^{th}$ plate 510. For example, to reduce or minimize an increase in thickness (or height) of the vibration apparatus 800, or to slim a display apparatus, the forming portion 520 may be formed to be convex toward the display panel 200 from the 1-1$^{th}$ plate 510, but embodiments of the present disclosure are not limited thereto.

The forming portion 520, according to an embodiment of the present disclosure, may be configured with one sub-forming portion or a plurality of sub-forming portions. For example, the forming portion 520 may have a structure in which the plurality of sub-forming portions are arranged in a staircase shape, but embodiments of the present disclosure are not limited thereto. For example, the plurality of sub-forming portions may be provided as one body or as a single body.

With reference to the example of FIG. 7A, a forming portion 520 may include a first sub-forming portion 521 that extends in an outward direction of the 1-1$^{th}$ plate 510 to include an inclined surface toward the rear surface of the display panel 200 from an outer end or outer portion of the 1-1$^{th}$ plate 510, a second sub-forming portion 522 that extends in an outward direction of the 1-1$^{th}$ plate 510 from an outer end (or the other end or outer portion or the other portion) of the first sub-forming portion 521 to be horizontal (e.g., parallel) to the display panel 200, and a third sub-forming portion 523 that extends in an outward direction of the 1-1$^{th}$ plate 510 from the second sub-forming portion 522.

According to an embodiment of the present disclosure, the third sub-forming portion 523 may extend toward the rear surface of the display panel 200 along an outer end or one side or one portion of the second sub-forming portion 522. For example, the third sub-forming portion 523 may extend in an outward direction or one side direction of the 1-1$^{th}$ plate 510 toward the rear surface of the display panel 200 to have an inclined surface. For example, one end of the third sub-forming portion 523 may be connected to an outer end (e.g., outer portion or the other end or the other portion) of the second sub-forming portion 522, and the other end of the third sub-forming portion 523 may be connected to the 1-2$^{th}$ plate 530. For example, the other end of the third sub-forming portion 523 may be connected to a surface, toward an inner surface of the display apparatus, of surfaces of the 1-2$^{th}$ plate 530. For example, the first sub-forming portion 521 and the third sub-forming portion 523 may have a slope within a range that is greater than 0 degrees and is not more than 90 degrees.

With reference to the example of FIG. 7B, a forming portion 520 may include a first sub-forming portion 521 that extends in an outward direction of the 1-1$^{th}$ plate 510 to include an inclined surface toward the rear surface of the display panel 200 from an outer end of the 1-1$^{th}$ plate 510, and a second sub-forming portion 522 that extends in an outward direction of the 1-1$^{th}$ plate 510 from the first sub-forming portion 521. According to an embodiment of the present disclosure, the second sub-forming portion 522 may extend from the first sub-forming portion 521 to be horizontal (e.g., parallel) to the display panel 200. For example, the second sub-forming portion 522 may extend along an outer end (e.g., the other end) of the first sub-forming portion 521. For example, the second sub-forming portion 522 may extend to be horizontal (e.g., parallel) to the display panel 200 on the same horizontal plane as the 1-2$^{th}$ plate 530. For example, one end of the second sub-forming portion 522 may be connected to the other end of the first sub-forming portion 521, and the other end of the second sub-forming portion 522 may be connected to the 1-2$^{th}$ plate 530. For example, the other end of the second sub-forming portion 522 may be connected to a surface, toward the inner surface of the display apparatus, of surfaces of the 1-2$^{th}$ plate 530.

With reference to the example of FIG. 7C, a forming portion 520 may include a first sub-forming portion 521 that extends in an outward direction or one side direction of the 1-1$^{th}$ plate 510 from the 1-1$^{th}$ plate 510. According to an embodiment of the present disclosure, the first sub-forming portion 521 may extend toward the rear surface of the display panel 200 along an outer end or one side of the 1-1$^{th}$ plate 510. For example, the first sub-forming portion 521 may extend in an outward direction or one side direction of the 1-1$^{th}$ plate 510 toward the rear surface of the display panel 200 to include an inclined surface. For example, one end (e.g., one side) of the first sub forming portion 521 may be connected to an outer end or one side of the 1-1$^{th}$ plate 510, and the other end (e.g., the other side) of the first sub-forming portion 521 may be connected to the 1-2$^{th}$ plate 530. For example, the other end (e.g., the other side) of the first sub-forming portion 521 may be connected to a surface, toward the inner surface of the display apparatus, of surfaces of the 1-2$^{th}$ plate 530.

The 1-2$^{th}$ plate (e.g., the 1-2$^{th}$ supporting plate) 530 according to an embodiment of the present disclosure may be disposed at a rear surface of a front member 100. The 1-2$^{th}$ plate 530 may configure a periphery portion of the first supporting member 500, and may be disposed at a rear surface of a supporting frame 400. The 1-2$^{th}$ plate 530 may be a region that extends in an outward direction or one side direction of the 1-1$^{th}$ plate 510 from the forming portion 520. The 1-2$^{th}$ plate 530 may include a hole H (e.g., a slit) through which a portion of a driving circuit 300 may pass or extend. For example, a PCB 330 of the driving circuit 300 may pass or extend through the hole H, and may be disposed at a rear surface of the first supporting member 500.

According to an embodiment of the present disclosure, the 1-2$^{th}$ plate 530 may be disposed at a rear surface of the supporting frame 400 by a second connection member (e.g., a second coupling member) 540. For example, the 1-2$^{th}$ plate 530 may be disposed at (e.g., connected or coupled to) the rear surface of the supporting frame 530 by the second connection member 540.

According to an embodiment of the present disclosure, the second connection member 540 may be provided in plurality, and the plurality of second connection members 540 may be disposed at the 1-2$^{th}$ plate 530. For example, the second connection member 540 may be a screw or a bolt, but embodiments of the present disclosure are not limited thereto. For example, when the second connection member 540 is a screw or a bolt, the second connection member 540 may be fastened to the supporting frame 400 at the rear surface of the 1-2$^{th}$ plate 530, and may be connected or coupled to a connection portion 430 of the supporting frame 400. For example, a hole may be formed in a region, where the second connection member 540 is disposed, of the 1-2$^{th}$ plate 530, so that coupling (or fastening) of the second connection member 540 may be relatively easy.

As another example embodiment of the present disclosure, the second connection member 540 may include an adhesive resin, a double-sided tape having an adhesive layer, or a double-sided foam pad having an adhesive layer, but embodiments of the present disclosure are not limited thereto. For example, the second connection member 540 may be disposed between the supporting frame 400 and the second connection member 540. For example, the adhesive resin and the adhesive layer of the second connection member 540 may include an acryl-based or urethane-based adhesive material, but embodiments of the present disclosure are not limited thereto. For example, in the second connection member 540, the adhesive resin and the adhesive layer may include a urethane-based adhesive material, which has a relatively ductile characteristic, rather than an acrylic-based adhesive material having a characteristic that is relatively high in hardness, for reducing, preventing, or minimizing the transfer of a vibration of the first supporting member 500 by a vibration of the vibration apparatus 800 to the supporting frame 400, but embodiments of the present disclosure are not limited thereto.

The 1-2$^{th}$ plate 530 according to an embodiment of the present disclosure may include a 2-1$^{th}$ region (e.g., a 2-1$^{th}$ plate region) 531 and a 2-2$^{th}$ region (e.g., a 2-2$^{th}$ plate region) 533. According to an embodiment of the present disclosure, the 2-1$^{th}$ region 531 may be a portion corresponding to the rear surface of the supporting frame 400, and the 2-2$^{th}$ region 533 may be a portion between the forming portion 520 and the 2-1$^{th}$ region 531. For example, the 2-1$^{th}$ region 531 may be disposed at the rear surface of the supporting frame 400 by the second connection member 540. For example, the 2-2$^{th}$ region 533 may include a hole H. For example, the hole H (e.g., the slit) may be formed at the 2-2$^{th}$ region 533 of the 1-2$^{th}$ plate 530 disposed at a first periphery portion of the first supporting member 500. For example, the 2-2$^{th}$ region 533 may have a size and a shape that enable the PCB 330 of the driving circuit 300 to pass or extend through the 2-2$^{th}$ region 533.

The plate 530 may be disposed along the supporting frame 400, and the front member 100 and the supporting frame 400 may be supported by the first supporting member 500. Therefore, four (e.g., upper, lower, left, and right) periphery portions of each of the front member 100 and the supporting frame 400 may be all or entirely supported by the 1-2$^{th}$ plate 530, and the stiffness of all of the upper, lower, left, and right periphery portions, of each of the front member 100, the supporting frame 400, and the first supporting member 500, may be the same. Thus, a vibration mode of the display panel 200 may be formed near the vibration apparatus 800, and a vibration region (e.g., an excitation position) of the vibration apparatus 800 may match a maximum displacement position of the display panel 200, thereby enhancing the vibration efficiency of the vibration apparatus 800. Accordingly, the sound pressure level, sound quality, and reproduction pitched sound band of sound generated based on a vibration of the display panel 200 may be enhanced.

Figure 8A:
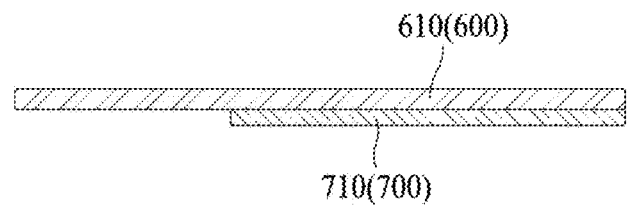
FIG. 8A illustrates a second supporting member and a third supporting member according to an embodiment of the present disclosure.
Figure 8B:
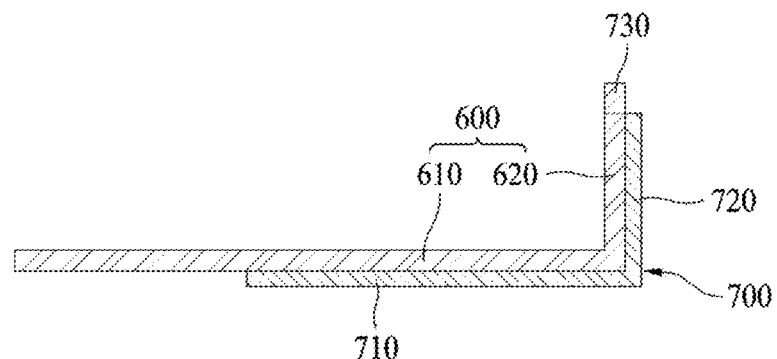
FIG. 8B illustrates a second supporting member and a third supporting member according to an embodiment of the present disclosure.
Figure 8C:
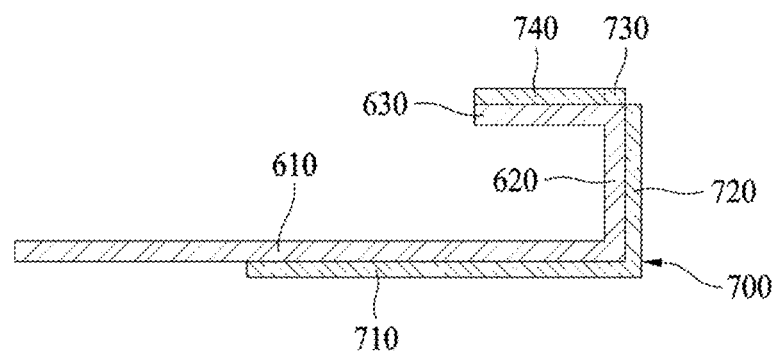
FIG. 8C illustrates a second supporting member and a third supporting member according to an embodiment of the present disclosure.

FIG. 8A is illustrates a second supporting member and a third supporting member according to an embodiment of the present disclosure. FIG. 8B is illustrates a second supporting member and a third supporting member according to an embodiment of the present disclosure. FIG. 8C is illustrates a second supporting member and a third supporting member according to an embodiment of the present disclosure.

FIGS. 8A to 8C illustrate a second supporting member and a third supporting member according to an embodiment of the present disclosure. With reference to the examples of FIGS. 5 and 8A to 8C, a second supporting member 600 may be disposed at a rear surface of a first supporting member 500. For example, the second supporting member 600 may have a structure in which the second supporting member 600 may pass or extend through a hole H of the first supporting member 500, and a portion of a driving circuit 300 disposed at the rear surface of the first supporting member 500 may be mounted thereon. For example, the second supporting member 600 may have a structure in which a PCB 330 of the driving circuit 300 is disposed thereon. For example, the second supporting member 600 may be disposed between the rear surface of the first supporting member 500 and the PCB 330, and may support the PCB 330. For example, the PCB 330 may be disposed at a rear surface of the second supporting member 600. For example, the PCB 330 may be disposed at a side surface of the second supporting member 600.

The second supporting member 600, according to an embodiment of the present disclosure, may be configured with one plate or a plurality of plates. For example, the second supporting member 600 may have a structure in which the plurality of plates are arranged in a '⊃'-shape, but embodiments of the present disclosure are not limited thereto. For example, the plurality of plates may be provided as one body or as a single body.

With reference to the examples of FIGS. 5 and 8A, a second supporting member 600 may include a 2-1$^{th}$ plate (e.g., a 2-1$^{th}$ supporting plate) 610. For example, the PCB 330 of the driving circuit 300 may be disposed at a rear surface of the 2-1$^{th}$ plate 610. For example, the 2-1$^{th}$ plate 610 may have a flat shape, but embodiments of the present disclosure are not limited thereto. For example, a portion of a flexible circuit film 310 connected to the PCB 330 may be disposed at the rear surface of the 2-1$^{th}$ plate 610.

According to an embodiment of the present disclosure, the PCB 330 may be disposed at the rear surface of the 2-1$^{th}$ plate 610 by a 3-1$^{th}$ supporting member 710. For example, the 3-1$^{th}$ supporting member 710 may be disposed between the rear surface of the 2-1$^{th}$ plate 610 and the PCB 330. For example, when the flexible circuit film 310 is disposed at the rear surface of the 2-1$^{th}$ plate 610, the 3-1$^{th}$ supporting member 710 may be disposed between the 2-1$^{th}$ plate 610 and the flexible circuit film 310 disposed at the rear surface of the 2-1$^{th}$ plate 610.

According to an embodiment of the present disclosure, the 3-1$^{th}$ supporting member 710 may include an adhesive resin, a double-sided tape having an adhesive layer, or a double-sided foam pad having an adhesive layer, but embodiments of the present disclosure are not limited thereto. For example, the adhesive resin and the adhesive layer of the 3-1$^{th}$ supporting member 710, may include an acryl-based or urethane-based adhesive material, but embodiments of the present disclosure are not limited thereto. For example, the adhesive resin and the adhesive layer of the 3-1$^{th}$ supporting member 710 may include a urethane-based adhesive material that has a relatively ductile characteristic, rather than an acrylic-based adhesive material having a characteristic that is relatively high in hardness, for reducing, preventing, or minimizing the transfer of a vibration of the 3-1$^{th}$ supporting member 710 by a vibration of the vibration apparatus 800 to a supporting frame 400, but embodiments of the present disclosure are not limited thereto.

According to an embodiment of the present disclosure, the 2-1$^{th}$ plate 610 may be disposed at a bottom surface (e.g., a first surface or a lower surface) of the first supporting member 500 (for example, a rear surface of the 1-1$^{th}$ plate 510 of the first supporting member 500) to be horizontal (e.g., parallel) to the display panel 200. For example, the 2-1$^{th}$ plate 610 may be connected (or coupled) to and disposed at the 1-1$^{th}$ plate 510, and moreover, may horizontally extend in an outward direction or one side direction of the first supporting member 500, and may overlap a forming portion 520 and a 1-2$^{th}$ plate 530.

According to an embodiment of the present disclosure, the 2-1$^{th}$ plate 610 may be disposed at a rear surface of a 1-1$^{th}$ plate 510 by a third connection member (e.g., a third coupling member) 640. For example, the 2-1$^{th}$ plate 610 may include an extension portion 615 that extends from one end (e.g., one side) of the 2-1$^{th}$ plate 610, and the extension portion 615 may be connected (or coupled) to the rear surface of the 1-1$^{th}$ plate 510 by the third connection member 640.

According to an embodiment of the present disclosure, the third connection member 640 may be provided in plurality, and the plurality of third connection members 640 may be disposed at the 2-1$^{th}$ plate 610. For example, the third connection member 640 may be a screw or a bolt, but embodiments of the present disclosure are not limited thereto. For example, when the third connection member 640 is a screw or a bolt, the third connection member 640 may be fastened to the 1-1$^{th}$ plate 510 at the rear surface of the 2-1$^{th}$ plate 610. For example, a hole may be formed in a region of the 2-1$^{th}$ plate 610 where the third connection member 640 is disposed, so that coupling (or fastening) of the third connection member 640 may be relatively easy.

As another example embodiment of the present disclosure, the third connection member 640 may include an adhesive resin, a double-sided tape having an adhesive layer, or a double-sided foam pad having an adhesive layer, but embodiments of the present disclosure are not limited thereto. For example, the third connection member 640 may be disposed between the 1-1$^{th}$ plate 510 and the 2-1$^{th}$ plate 610. For example, the adhesive resin and the adhesive layer of the third connection member 640 may include an acryl-based or urethane-based adhesive material, but embodiments of the present disclosure are not limited thereto. For example, in the third connection member 640, the adhesive resin and the adhesive layer may include a urethane-based adhesive material that has a relatively ductile characteristic, rather than an acrylic-based adhesive material having a characteristic that is relatively high in hardness, for reducing, preventing, or minimizing the transfer of a vibration of the second supporting member 600 by a vibration of the vibration apparatus 800 to the supporting frame 400, but embodiments of the present disclosure are not limited thereto.

With reference to the examples of FIGS. 5 and 8B, a second supporting member 600 may further include a 2-2$^{th}$ plate (e.g., a 2-2$^{th}$ supporting plate) 620 that is bent and extends toward the display panel 200 from the other end of the 2-1$^{th}$ plate 610. According to an embodiment of the present disclosure, the flexible circuit film 310 may extend toward a rear surface of the 2-1$^{th}$ plate 610 along an outer side or one side of the 2-2$^{th}$ plate 620 through a hole H of the first supporting member 500, and may be stably disposed at the 2-2$^{th}$ plate 620 by a 3-2th supporting member 720. For example, the 3-2$^{th}$ supporting member 720 may be disposed between the 2-2$^{th}$ plate 620 and the flexible circuit film 310. According to an embodiment of the present disclosure, the PCB 330 of the driving circuit 300 may be disposed at the 2-2$^{th}$ plate 620. For example, the PCB 330 may be disposed at an outer portion of the 2-2$^{th}$ plate 620 by the 3-2$^{th}$ supporting member 720. For example, the 3-2$^{th}$ supporting member 720 may be disposed between the 2-2$^{th}$ plate 620 and the PCB 330. For example, the 3-2$^{th}$ supporting member 720 and the 3-1$^{th}$ supporting member 710 may be provided as one body or as a single body. For example, the 3-2$^{th}$ supporting member 720 may be configured independently from the 3-1$^{th}$ supporting member 710.

According to an embodiment of the present disclosure, one end (e.g., one side or one portion) of the 2-2$^{th}$ plate 620 may be connected to the other end (e.g., the other side or the other portion) of the 2-1$^{th}$ plate 610. For example, the other end (e.g., the other side or the other portion) of the 2-2$^{th}$ plate 620 may be disposed at a lower surface of the 1-2$^{th}$ plate 530.

According to an embodiment of the present disclosure, the 2-2$^{th}$ plate 620 may be disposed at the lower surface of the 1-2$^{th}$ plate 530 by a 3-3$^{th}$ supporting member 730. For example, the 3-3$^{th}$ supporting member 730 may be disposed between the 2-2$^{th}$ plate 620 and the lower surface of the 1-2$^{th}$ plate 530. For example, the 3-3$^{th}$ supporting member 730 may be configured independently from the 3-2$^{th}$ supporting member 720.

According to an embodiment of the present disclosure, the 3-2$^{th}$ supporting member 720 and the 3-3$^{th}$ supporting member 730 may include an adhesive resin, a double-sided tape having an adhesive layer, or a double-sided foam pad having an adhesive layer, but embodiments of the present disclosure are not limited thereto. For example, the adhesive resin and the adhesive layer of each of the 3-2$^{th}$ supporting member 720 and the 3-3$^{th}$ supporting member 730 may include an acryl-based or urethane-based adhesive material, but embodiments of the present disclosure are not limited thereto. For example, in each of the 3-2$^{th}$ supporting member 720 and the 3-3$^{th}$ supporting member 730, the adhesive resin and the adhesive layer may include a urethane-based adhesive material that has a relatively ductile characteristic, rather than an acrylic-based adhesive material having a characteristic that is relatively high in hardness, for reducing, preventing, or minimizing the transfer of a vibration of each of the 3-2$^{th}$ supporting member 720 and the 3-3$^{th}$ supporting member 730 by a vibration of a vibration apparatus 800 to a supporting frame 400, but embodiments of the present disclosure are not limited thereto.

When the supporting member 600 is configured with only the 2-1$^{th}$ plate 610, the other end (e.g., the other side) of the 2-1$^{th}$ plate 610 may be floated, and thus, may be vulnerable to a vibration. For this reason, the PCB 330 disposed at the 2-1$^{th}$ plate 610 may be damaged, or a detachment phenomenon between the PCB 330 and the flexible circuit film 310 may occur, and the data driving IC 320 may be damaged by the vibration or shaking of the flexible circuit film 310 caused by the vibration or shaking of the PCB 330. However, when the second supporting member 600 includes the 2-2$^{th}$ plate 620 disposed at the 1-2$^{th}$ plate 530, the second supporting member 600 may be supported by the first supporting member 500 based on the 2-2$^{th}$ plate 620. Thus, the stability of a vibration of the vibration apparatus 800 may be secured. Accordingly, damage to the PCB 330 disposed at the second supporting member 600 may be reduced or prevented, or a detachment phenomenon between the PCB 330 and the flexible circuit film 310 may be reduced or prevented.

With reference to the examples of FIGS. 5 and 8C, a second supporting member 600 may further include a 2-3$^{th}$ plate (e.g., a 2-3$^{th}$ supporting plate) 630 that is bent and extends in an inward direction of the first supporting member 500 from the other end (e.g., the other side or the other portion) of the 2-2$^{th}$ plate 620 to be horizontal (e.g., parallel) to the display panel 200. The 2-3$^{th}$ plate 630 may extend in a center direction of the first supporting member 500 from the 2-2$^{th}$ plate 620 along a rear surface of the first supporting member 500.

According to an embodiment of the present disclosure, the 2-3$^{th}$ plate 630 may be disposed at the rear surface of the first supporting member 500 by a 3-4th supporting member 740. For example, the 2-3th plate 630 may be disposed at the rear surface of the 1-2th plate 530 of the first supporting member 500 by the 3-4th supporting member 740. For example, one end (e.g., one side or one portion) of the 2-3th plate 630 may be connected to the other end (e.g., the other side or the other portion) of the 2-2th plate 620. For example, the other end (e.g., the other side or the other portion) of the 2-3th plate 630 may be fixedly disposed at the rear surface of the 1-2th plate 530. For example, the 3-4th supporting member 740 may be disposed between the 1-2th plate 530 and the 2-3th plate 630. For example, the 3-4th supporting member 740 and the 3-3th supporting member 730 may be provided as one body or as a single body. For example, the 3-4th supporting member 740 may be configured independently from the 3-3th supporting member 730.

According to an embodiment of the present disclosure, the 3-4th supporting member 740 may include an adhesive resin, a double-sided tape having an adhesive layer, or a double-sided foam pad having an adhesive layer, but embodiments of the present disclosure are not limited thereto. For example, the adhesive resin and the adhesive layer of each of the 3-2th supporting member 720 and the 3-3th supporting member 730 may include an acryl-based or urethane-based adhesive material, but embodiments of the present disclosure are not limited thereto. For example, in each of the 3-2th supporting member 720 and the 3-3th supporting member 730, the adhesive resin and the adhesive layer may include a urethane-based adhesive material that has a relatively ductile characteristic, rather than an acrylic-based adhesive material having a characteristic that is relatively high in hardness, for reducing, preventing, or minimizing the transfer of a vibration of each of the 3-2th supporting member 720 and the 3-3th supporting member 730 by a vibration of the vibration apparatus 800 to a supporting frame 400, but embodiments of the present disclosure are not limited thereto.

When the supporting member 600 includes the 2-3th plate 630, an area where the second supporting member 600 contacts the first supporting member 500 may be enlarged by the 2-3th plate 630. Thus, the second supporting member 600 may be more stably supported by the first supporting member 500. Accordingly, damage to the PCB 330 disposed at the second supporting member 600 may be reduced or prevented, or a detachment phenomenon between the PCB 330 and the flexible circuit film 310 may be more effectively reduced or prevented.

According to an embodiment of the present disclosure, the second supporting member 600 may further include a fourth connection member (e.g., a fourth coupling member) 750, to place the 2-3th plate 630 at the 1-2th plate 530. For example, the fourth connection member 750 may be a screw or a bolt, but embodiments of the present disclosure are not limited thereto. For example, when the fourth connection member 750 is a screw or a bolt, the fourth connection member 750 may be fastened to the 2-3th plate 630 at a front surface of the 1-2th plate 530. For example, a hole may be formed in a region, where the fourth connection member 750 is disposed, of each of the 1-2th plate 530 and the 2-3th plate 630 so that coupling (or fastening) of the fourth connection member 750 may be relatively easy.

The vibration apparatus (e.g., a first vibration apparatus) 800 may be disposed between the first supporting member 500 and the display panel 200. The vibration apparatus 800 may be supported by the first supporting member 500, and may vibrate the display panel 200. The vibration apparatus 800 may vibrate based on a driving signal including a haptic feedback signal or a sound signal to directly vibrate the display panel 200, and thus, may generate sound DVS based on a vibration of the display panel 200, or may generate a haptic feedback (e.g., a haptic vibration) responding to a user touch. For example, the vibration apparatus 800 may generate sound DVS of a middle-low-pitched sound band. For example, the vibration apparatus 800 may be disposed at a center region of the display panel 200.

The vibration apparatus 800 according to an embodiment of the present disclosure may include a bobbin and a coil wound around the bobbin. The bobbin may contact the rear surface of the display panel 200.

According to an embodiment of the present disclosure, the vibration apparatus 800 may include one vibration device or a plurality of vibration devices. For example, the vibration apparatus 800 may include a first vibration device 810 and a second vibration device 830. For example, the first vibration device 810 and the second vibration device 830 may each be a coil-type vibration device.

Each of the first and second vibration devices 810 and 830 may be supported by or accommodated (e.g., received) into the first supporting member 500, and may vibrate the display panel 200. For example, each of the first and second vibration devices 810 and 830 may include a bobbin and a coil wound around the bobbin, and the bobbin may contact the rear surface of the display panel 200. The first vibration device 810 may be disposed at a first rear region of the display panel 200, and may vibrate the first rear region of the display panel 200.

The first vibration device 810 may be supported by or accommodated (e.g., received) into a first region of the 1-1th plate 510 of the first supporting member 500. For example, a portion of a rear surface of the first vibration device 810 may be inserted or accommodated (e.g., received) into a 1-1th hole 551 formed in a 1-1th region of the 1-1th supporting plate 510. The first vibration device 810 may vibrate based on a first driving signal, including a haptic feedback signal or a sound signal, to directly vibrate the first rear region of the display panel 200, and thus, may generate sound DVS based on a vibration of the display panel 200 or may generate a haptic feedback (or a haptic vibration) responding to a user touch.

The second vibration device 830 may be disposed at a second rear region of the display panel 200, and may vibrate the second rear region of the display panel 200. The second vibration device 830 may be supported by or accommodated (e.g., received) into a second region of the 1-1th plate 510 of the first supporting member 500. For example, a portion of a rear surface of the second vibration device 830 may be inserted or accommodated (e.g., received) into a 1-2th hole 552 formed in a 1-2th region of the 1-1th supporting plate 510. The second vibration device 830 may vibrate based on a second driving signal, including a haptic feedback signal or a sound signal, to directly vibrate the second rear region of the display panel 200, and thus, may generate sound DVS based on a vibration of the display panel 200 or may generate a haptic feedback (e.g., a haptic vibration) responding to a user touch.

The first driving signal and the second driving signal may be the same or differ. For example, the first driving signal may include a left sound signal or a first haptic feedback signal corresponding to a first region (or a left region) A1 of the display panel 200. The second driving signal may include a right sound signal or a second haptic feedback signal corresponding to a second region (or a right region) A2 of the display panel 200.

Each of the first and second vibration devices 810 and 830 may be disposed at the first supporting member 500 to be symmetrical with respect to a center line (e.g., a widthwise length center line) CL of the display panel 200, and may include substantially the same structure. Each of the first and second vibration devices 810 and 830 may be referred to as a "vibration module," a "vibration unit," an "actuator," an "exciter," a "transducer," or the like, but embodiments of the present disclosure are not limited thereto. Therefore, the display apparatus according to an embodiment of the present disclosure may use the display panel 200 as a vibration plate for generating sound, and thus, may output the sound in a forward direction of the display panel 200, thereby improving sound quality and increasing an immersion experience of a viewer.

Moreover, in the display apparatus according to an embodiment of the present disclosure, when the PCB 330 connected to the display panel 200 is not disposed between the display panel 200 and the first supporting member 500, the arrangement of the vibration apparatus 800 may be freely disposed without being affected by the PCB 330. Accordingly, the degree of freedom in arrangement of the vibration apparatus 800 may be secured. Accordingly, based on the efficient arrangement of the vibration apparatus 800, the sound pressure level, sound quality, and reproduction pitched sound band of sound generated based on a vibration of the display panel 200 may increase.

Moreover, in the display apparatus according to an embodiment of the present disclosure, the PCB 330 connected to the display panel 200 may be disposed on the rear surface of the first supporting member 500, and may be spaced apart from the rear surface of the display panel 200. Thus, damage to the PCB 330, caused by a vibration of the display panel 200, may be reduced, prevented, or minimized.

With reference to the examples of FIGS. 3 to 5, the display apparatus according to an embodiment of the present disclosure may further include a heat dissipation member 900 disposed at the rear surface of the display panel 200. For example, the heat dissipation member 900 may be disposed between the rear surface of the display panel 200 and the vibration apparatus 800. For example, the heat dissipation member 900 may include a metal material having high thermal conductivity, like any one or more materials of: aluminum (Al), copper (Cu), silver (Ag), and magnesium (Mg), or an alloy thereof, but embodiments of the present disclosure are not limited thereto. The heat dissipation member 620 may be referred to by other terms, such as a "heat diffusion member," a "heat diffusion sheet," a "heat diffusion layer," a "heat diffusion plate," a "heat sink," a "heat dissipation sheet," a "heat dissipation layer," a "heat dissipation plate," or the like, but embodiments of the present disclosure are not limited thereto.

The heat dissipation member 900 may be disposed at the rear surface of the display panel 200 to overlap the vibration apparatus 800, and thus, may diffuse heat, occurring when the vibration apparatus 800 is being driven, toward the display panel 200 to reduce or prevent the performance of the vibration apparatus 800 from being reduced by heat. Also, the heat dissipation member 900 may have a size that is relatively larger than or the same as the vibration apparatus 800, with respect to a center portion of the vibration apparatus 800, and thus, may diffuse heat, occurring when the vibration apparatus 800 is being driven, to a wide area, thereby reducing or preventing heat from be intensively transferred to a local region of the display panel 800 overlapping the vibration apparatus 800. Accordingly, the local luminance non-uniformity of the display panel 100 may be reduced, prevented, or minimized.

The display apparatus according to an embodiment of the present disclosure may further include a fifth connection member 1000 disposed between the display panel 200 and the first supporting member 500. For example, the fifth connection member 1000 may be disposed between the rear surface of the display panel 200 and a first periphery portion of the first supporting member 500. For example, the fifth connection member 1000 may be disposed at a front surface of the first supporting member 500 to be adjacent to a hole H of the first supporting member 500. For example, the fifth connection member 1000 may be disposed at the 2-2$^{th}$ region 533 of the 1-2$^{th}$ plate 530 between the vibration apparatus 800 and the hole H.

According to an embodiment of the present disclosure, the fifth connection member 1000 may have a hexahedral shape having a certain length along one direction Y, but embodiments of the present disclosure are not limited thereto. For example, the fifth connection member 1000 may have a length corresponding to a length of the hole H. For example, the fifth connection member 1000 may be disposed in parallel with a periphery portion of the supporting frame 400 adjacent thereto. For example, each of both ends (e.g., both portions) of the fifth connection member 1000 in a lengthwise direction Y thereof may contact a periphery portion of the supporting frame 400.

The fifth connection member 1000 may include an adhesive resin, a double-sided tape having an adhesive layer, or a double-sided foam pad having an adhesive layer, but embodiments of the present disclosure are not limited thereto. For example, the adhesive resin and the adhesive layer of the fifth connection member 1000 may include an acryl-based or urethane-based adhesive material, but embodiments of the present disclosure are not limited thereto.

According to an embodiment of the present disclosure, the fifth connection member 1000 may increase a coupling force between the display panel 200 and the first supporting member 500. For example, the fifth connection member 1000 may reduce or prevent air from flowing out through the hole H, thereby reducing or preventing a sound pressure level from varying in an air gap AG.

Figure 9:
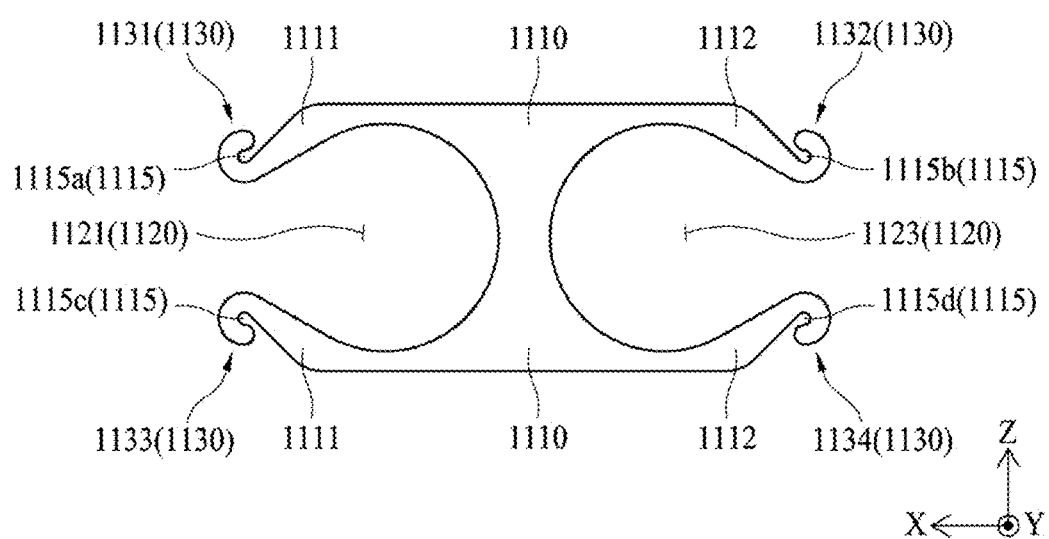
FIG. 9 is a plan view illustrating a supporting device according to an embodiment of the present disclosure.

FIG. 9 is a plan view illustrating a supporting device according to an embodiment of the present disclosure.

With reference to the examples of FIGS. 3, 4 and 9, a display apparatus according to an embodiment of the present disclosure may further include a supporting device 1100 to support a vibration apparatus 800. For example, the supporting device 1100 may be disposed between a first supporting member 500 and the vibration apparatus 800, and may support the vibration apparatus 800. For example, the supporting device 1100 may be a molding structure, which may be manufactured by a molding process using a material, such as plastic or the like, but embodiments of the present disclosure are not limited thereto.

According to an embodiment of the present disclosure, the supporting device 1100 may be an integrated supporting device that fixes and/or supports a first vibration device 810 and a second vibration device 830 to be adjacent to each other. Accordingly, the first vibration device 810 and the second vibration device 830 fixed by the supporting device 1100 may be referred to as a "pair of vibration devices."

The supporting device 1100 may include a supporting portion 1110 that supports a rear periphery of the vibration apparatus 800, an accommodation portion 1120 into which a portion of a rear surface of the vibration apparatus 800 may be accommodated, and a plurality of connection portions 1130 configured to fix and/or connect the first supporting member 500 to the vibration apparatus 800, but embodiments of the present disclosure are not limited thereto. According to an embodiment of the present disclosure, the supporting portion 1110 may have a plate shape, and the accommodation portion 1120 and the connection portion 1130 may be provided at the supporting portion 1110. For example, the supporting portion 1110 may be disposed between the first supporting member 500 and a rear periphery of the vibration apparatus 800. For example, the supporting portion 1110 may be fixed by the first supporting member 500 and may support the vibration apparatus 800.

According to an embodiment of the present disclosure, the accommodating portion 1120 may accommodate (e.g., receive) a portion of the rear surface of the vibration apparatus 800 inserted or accommodated thereinto. For example, the accommodating portion 1120 may be provided at the supporting portion 1110 to correspond to a first hole 550 that is provided in a 1-1$^{th}$ plate 510 of the first supporting member 500. For example, the accommodating portion 1120 may include a first accommodation portion 1121 that accommodates (e.g., receives) a portion of a rear surface of the first vibration device 810, and a second accommodation portion 1123 that accommodates (e.g., receives) a portion of a rear surface of the second vibration device 830. For example, each of the first accommodation portion 1121 and the second accommodation portion 1123 may be provided at the supporting portion 1110 to correspond to each of a 1-1$^{th}$ hole 551 and a 1-2$^{th}$ hole 552 that are provided at the 1-1$^{th}$ plate 510 of the first supporting member 500.

According to an embodiment of the present disclosure, the accommodating portion 1120 may be a groove that is recessed toward a center of the supporting portion 1110 from a side periphery of the supporting portion 1110, but embodiments of the present disclosure are not limited thereto. For example, the accommodating portion 1120 may have a shape corresponding to a shape of a portion of the vibration apparatus 800 accommodated (e.g., received) thereinto.

According to an embodiment of the present disclosure, the connection portion 1130 may be a structure material configured to couple or connect the supporting device 1100 to the first supporting member 500. The connection portion 1130 may be provided in plurality, and the plurality of connection portions 1130 may be disposed at a periphery of the supporting portion 1110. For example, the connection portion 1130 may include a protrusion portion that protrudes from the periphery of the supporting portion 1110 and has a hook shape. For example, the connection portion 1130 may include four protrusion portions 1131, 1132, 1133, and 1134 that protrude from each of four corner regions 1111, 1112, 1113, and 1114 of the supporting portion 1110 in a hook shape.

Moreover, the supporting device 1100 may include a coupling hole 1115 that is provided by the supporting portion 1110 and the connection portion 1130. For example, the supporting device 1100 may include a plurality of coupling holes 1115a, 1115b, 1115c, and 1115d that are provided by the supporting portion 110 and each of the protrusion portions 1131, 1131, 1132, and 1134. For example, the coupling hole 1115 may be provided to correspond to each fourth hole 580 provided at the 1-1$^{th}$ plate 510 of the first supporting member 500.

According to an embodiment of the present disclosure, the supporting device 1100 may be coupled to the first supporting member 500 by a sixth connection member 1140. For example, the sixth connection member 1140 may be a screw or a bolt, but embodiments of the present disclosure are not limited thereto. For example, the sixth connection member 1140 may be inserted or accommodated through the fourth hole 580 at a rear surface of the first supporting member 500, and may be connected (or fastened) to the coupling hole 1115 of the supporting device 1100.

The display apparatus or the vibration apparatus according to an embodiment of the present disclosure may further include a second vibration apparatus 1200 that is disposed at the rear surface of the display panel 200. The second vibration apparatus 1200 may vibrate the display panel 200 to generate sound. For example, the second vibration apparatus 1200 may be disposed between the first supporting member 500 and the display panel 200. The second vibration apparatus 1200 may vibrate based on a driving signal, including a haptic feedback signal or a sound signal, to vibrate or directly vibrate the display panel 200, and thus, may generate sound DVS based on a vibration of the display panel 200, or may generate a haptic feedback (e.g., a haptic vibration) responding to a user touch. For example, the second vibration apparatus 1200 may generate sound DVS of a middle-high-pitched sound band. For example, the vibration apparatus 800 may be disposed at a periphery portion of the display panel 200.

The second vibration apparatus 1200, according to an embodiment of the present disclosure, may be configured with a vibration device that differs from the vibration apparatus (e.g., a first vibration apparatus) 800. For example, the second vibration apparatus 1200 may be configured with a film-type vibration device. For example, the second vibration apparatus 1200 may be configured with one film-type vibration device or with a plurality of film-type vibration devices.

With reference to the examples of FIGS. 3 and 4, the second vibration apparatus 1200, according to an embodiment of the present disclosure, may be a third vibration device 1210 and a fourth vibration device 1230. The third vibration device 1210 may be disposed at the third rear region of the display panel 200, and may vibrate the third rear region of the display panel 200. The fourth vibration device 1230 may be disposed at the fourth rear region of the display panel 200, and may vibrate the fourth rear region of the display panel 200.

The third vibration device 1210 may vibrate based on a third driving signal, including a haptic feedback signal or a sound signal, to vibrate (e.g., directly vibrate) the third rear region of the display panel 200, and thus, may generate sound DVS based on a vibration of the display panel 200, or may generate a haptic feedback (e.g., a haptic vibration) responding to a user touch. The fourth vibration device 1230 may vibrate based on a fourth driving signal including a haptic feedback signal or a sound signal to vibrate (e.g., directly vibrate) the fourth rear region of the display panel 200, and thus, may generate sound DVS based on a vibration of the display panel 200 or may generate a haptic feedback (e.g., a haptic vibration) responding to a user touch.

The third driving signal and the fourth driving signal may be the same or may differ. For example, the third driving signal may include a left sound signal or a third haptic feedback signal corresponding to a first region (e.g., a left region) A1 of the display panel 200. The fourth driving signal may include a right sound signal or a fourth haptic feedback signal corresponding to a second region (e.g., a right region) A2 of the display panel 200.

Each of the third and fourth vibration devices 1210 and 1230 may be disposed at the first supporting member 500 to be symmetrical with respect to a center line (e.g., a widthwise length center line) CL of the display panel 200, and may include substantially the same structure. Each of the third and fourth vibration devices 1210 and 1230 may be referred to as a "flexible sound module," a "flexible sound generator," a "flexible actuator," a "flexible speaker," a "flexible piezoelectric speaker," a "film actuator," a "film-type piezoelectric composite actuator," a "film speaker," a "film-type piezoelectric speaker," a "film-type piezoelectric composite speaker," or the like, but embodiments of the present disclosure are not limited thereto.

Figure 10:
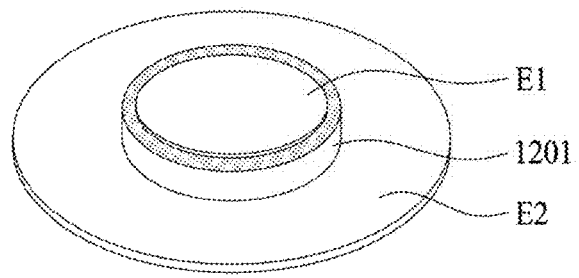
FIG. 10 illustrates a second vibration apparatus according to an embodiment of the present disclosure.

FIG. 10 illustrates a second vibration apparatus according to an embodiment of the present disclosure.

With reference to the example of FIG. 10, the second vibration apparatus 1200, according to an embodiment of the present disclosure, may include a piezoelectric vibration portion 1201, a first electrode portion E1, and a second electrode portion E2. The piezoelectric vibration portion 1201 may include a piezoelectric material (e.g., an electroactive material) that has a piezoelectric effect. For example, the piezoelectric material may have a characteristic in which, when pressure or twisting (e.g., bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto. The piezoelectric vibration portion 1201 may be referred to as a "vibration layer," a "piezoelectric layer," a "piezoelectric material layer," an "electroactive layer," a "vibration portion," a "piezoelectric material portion," an "electroactive portion," a "piezoelectric structure," an "inorganic material layer," an "inorganic material portion," or the like, but embodiments of the present disclosure are not limited thereto.

The piezoelectric vibration portion 1201 may be formed of a transparent, a semitransparent, or an opaque piezoelectric material (e.g., an electroactive material), and may be transparent, semitransparent (or translucent), or opaque. The piezoelectric vibration portion 1201 may include a ceramic-based material for generating a relatively high vibration, or may include a piezoelectric ceramic having a perovskite-based crystalline structure. The perovskite crystalline structure may have a piezoelectric effect and an inverse piezoelectric effect, and may be a plate-shaped structure having orientation or alignment. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A", and "B" may be cations, and "O" may be anions. For example, the chemical formula "$ABO_3$" may include one of lead(II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

The piezoelectric vibration portion 1201 according to an embodiment of the present disclosure may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. Also, the piezoelectric vibration portion 1201 may include at least one or more of calcium titanate ($CaTiO_3$), $BaTiO_3$, and $SrTiO_3$, each without Pb, but embodiments of the present disclosure are not limited thereto. The piezoelectric vibration portion 1201 according to an embodiment of the present disclosure may include a circular shape, an oval shape, or a polygonal shape, but embodiments of the present disclosure are not limited thereto.

The first electrode portion E1 may be disposed at a first surface (e.g., an upper surface) of the piezoelectric vibration portion 1201, and may be electrically connected to the first surface of the piezoelectric vibration portion 1201. For example, the first electrode portion E1 may have a single-body electrode that is disposed at a whole first surface of the piezoelectric vibration portion 1201. For example, the first electrode portion E1 may have the same shape as the piezoelectric vibration portion 1201, but embodiments of the present disclosure are not limited thereto. The first electrode portion E1 according an embodiment of the present disclosure may include a transparent conductive material, a semitransparent conductive material, or an opaque conductive material. For example, the transparent conductive material or the semitransparent conductive material may include indium tin oxide (ITO) or indium zinc oxide (IZO), but is not limited thereto. Examples of the opaque conductive material may include aluminum (Al), copper (Cu), gold (Au), silver (Ag), molybdenum (Mo), magnesium (Mg), and an alloy of any thereof, or the like, but embodiments of the present disclosure are not limited thereto.

The second electrode portion E2 may be disposed at a second surface (e.g., a rear surface) opposite to the first surface of the piezoelectric vibration portion 1201, and may be electrically connected to the second surface of the piezoelectric vibration portion 1201. For example, the second electrode portion E2 may have a single-body electrode that is disposed at a whole second surface of the piezoelectric vibration portion 1201. For example, the second electrode portion E2 may have a larger size than the piezoelectric vibration portion 1201, and may have the same shape as the piezoelectric vibration portion 1201, but embodiments of the present disclosure are not limited thereto. The second electrode portion E2 according to an embodiment of the present disclosure may include a transparent conductive material, a semitransparent conductive material, or an opaque conductive material. For example, the second electrode portion E2 may include the same material as the first electrode portion E1, but embodiments of the present disclosure are not limited thereto. As another example embodiment of the present disclosure, the second electrode portion E2 may include a material different from the first electrode portion E1.

The piezoelectric vibration portion 1201 may be polarized (e.g., poling) by a certain voltage applied to the first electrode portion E1 and the second electrode portion E2 in a certain temperature atmosphere, or in a temperature atmosphere that may be changed from a high temperature to a room temperature, but embodiments of the present disclosure are not limited thereto. For example, the piezoelectric vibration portion 1201 may alternately and repeatedly contract and expand based on an inverse piezoelectric effect according to a sound signal (e.g., voice signal) applied to the first electrode portion E1 and the second electrode portion E2 from the outside to vibrate.

The second vibration apparatus 1200, according to an embodiment of the present disclosure, may further include a first protection member and a second protection member. The first protection member may be disposed over the first electrode portion E1, and may protect the first electrode portion E1. For example, the first protection member may include a plastic material, a fiber material, or a wood material, but embodiments of the present disclosure are not limited thereto.

The second protection member may be disposed over the second electrode portion E2, and may protect the second electrode portion E2. For example, the second protection member may include a plastic material, a fiber material, or a wood material, but embodiments of the present disclosure are not limited thereto. For example, the first protection member may include a material that is the same as or different from the second protection member. One or more of the first protection member and the second protection member may be attached or coupled to a display panel by an adhesive member.

Figure 11:
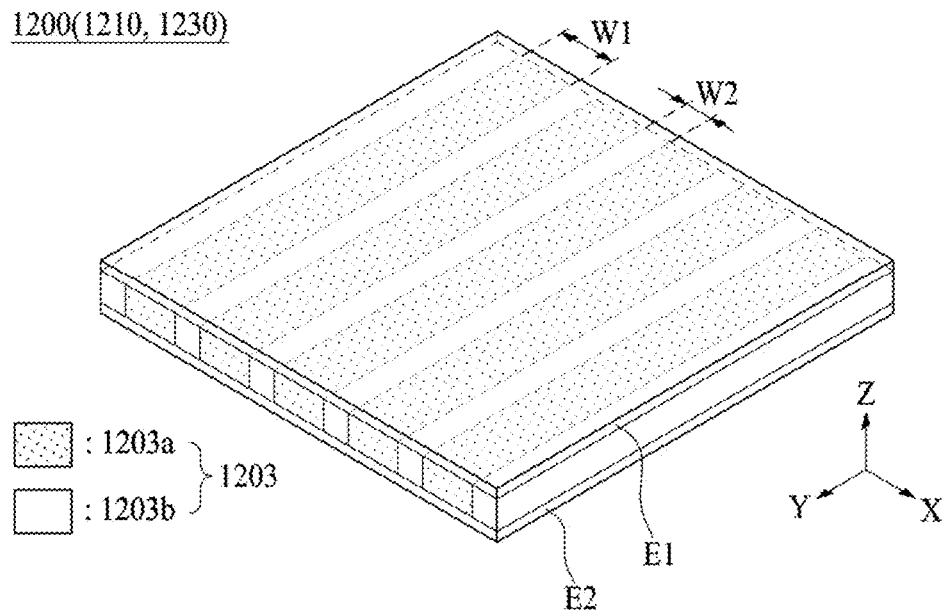
FIG. 11 illustrates a second vibration apparatus according to another embodiment of the present disclosure.

FIG. 11 illustrates a second vibration apparatus according to another embodiment of the present disclosure.

With reference to the example of FIG. 11, the second vibration apparatus 1200, according to another embodiment of the present disclosure, may be include a piezoelectric vibration portion 1203, a first electrode portion E1, and a second electrode portion E2. The piezoelectric vibration portion 1203 may include a piezoelectric material, a composite piezoelectric material, or an electroactive material that has a piezoelectric effect, but is not limited thereto. The piezoelectric vibration portion 1203 may be referred to as a "vibration layer," a "piezoelectric layer," a "piezoelectric material layer," an "electroactive layer," a "vibration portion," a "piezoelectric material portion," an "electroactive portion," a "piezoelectric structure," a "piezoelectric composite layer," a "piezoelectric composite," a "piezoelectric ceramic composite," or the like, but embodiments of the present disclosure are not limited thereto. The piezoelectric vibration portion 1203 may be formed of a transparent, a semitransparent, or an opaque piezoelectric material, and may be transparent, semitransparent, or opaque.

The piezoelectric vibration portion 1203 according to an embodiment of the present disclosure may include a plurality of first portions 1203a and a plurality of second portions 1203b. For example, the plurality of first portions 1203a and the plurality of second portions 1203b may be alternately and repeatedly arranged along a first direction X (or a second direction Y). For example, the first direction X may be a widthwise direction or a first horizontal direction of the piezoelectric vibration portion 1203. The second direction Y may be a lengthwise direction or a second horizontal direction of the piezoelectric vibration portion 1203. Embodiments of the present disclosure are not limited thereto. For example, the first direction X may be the lengthwise direction or the second horizontal direction of the piezoelectric vibration portion 1203, and the second direction Y may be the widthwise direction or the first horizontal direction of the piezoelectric vibration portion 1203.

Each of the plurality of first portions 1203a may be configured with an inorganic material portion. The inorganic material portion may include the above-described piezoelectric material. For example, each of the plurality of first portions 1203a may include a piezoelectric material that is substantially the same as the piezoelectric vibration portion 1201 described above with reference to the example of FIG. 10. Thus, like reference numerals refer to like elements and their repetitive descriptions may be omitted.

Each of the plurality of first portions 1203a, according to an embodiment of the present disclosure, may be disposed between the plurality of second portions 1203b. For example, the plurality of first portions 1203a may have a first width W1 parallel to the first direction X (or the second direction Y), and may have a length parallel to the second direction Y (or the first direction X). Each of the plurality of second portions 1203b may have a second width W2 parallel to the first direction X (or the second direction Y), and may have a length parallel to the second direction Y (or the first direction X). The first width W1 may be the same as or different from the second width W2. For example, the first width W1 may be greater than the second width W2. For example, the first portion 1203a and the second portion 1203b may include a line shape or a stripe shape that has the same size or different sizes. Therefore, the piezoelectric vibration portion 1203 may include a 2-2 composite, and thus, may have a resonance frequency of 20 kHz or less, but embodiments of the present disclosure are not limited thereto. For example, a resonance frequency of the piezoelectric vibration portion 1203 may vary based on one or more of a shape, a length, and a thickness.

In the piezoelectric vibration portion 1203, each of the plurality of first portions 1203a and the plurality of second portions 1203b may be disposed (or arranged) at the same plane (e.g., the same layer) in parallel. Each of the plurality of second portions 1203b may be connected or attached to adjacent first portions of the plurality of first portions 1203a. For example, each of the plurality of second portions 1203b may be configured to fill a gap between two adjacent first portions of the plurality of first portions 1203a, and may be connected or attached to a second portion 1203b adjacent thereto. Therefore, the piezoelectric vibration portion 1203 may extend by a desired size or length based on the side coupling (or connection) of the first portion 1203a and the second portion 1203b.

In the piezoelectric vibration portion 1203, a width (e.g., a size) W2 of each of the plurality of second portions 1203b may progressively decrease in a direction from a center portion to both peripheries (e.g., both ends) of the piezoelectric vibration portion 1203 or the second vibration apparatus 1200. According to an embodiment of the present disclosure, a second portion 1203b, having a largest width W2 of the plurality of second portions 1203b, may be located at a portion at which a highest stress may concentrate when the piezoelectric vibration portion 1201 or the second vibration apparatus 1200 is vibrating in a vertical direction Z (e.g., a thickness direction). A second portion 1203b, having a smallest width W2 among the plurality of second portions 1203b, may be located at a portion where a relatively low stress may occur when the piezoelectric vibration portion 1203 or the second vibration apparatus 1200 is vibrating in the vertical direction Z. For example, the second portion 1203b having the largest width W2 among the plurality of second portions 1203b may be disposed at the center portion of the piezoelectric vibration portion 1203. The second portion 1203b having the smallest width W2 among the plurality of second portions 1203b may be disposed at each of the both edges or peripheries of the piezoelectric vibration portion 1203. Therefore, when the piezoelectric vibration portion 1203 or the second vibration apparatus 1200 is vibrating in the vertical direction Z, interference of a sound wave or overlapping of a resonance frequency, each occurring in the portion on which the highest stress concentrates, may be reduced or minimized. Thus, a dipping phenomenon of a sound pressure level occurring in the low-pitched sound band may be reduced, thereby improving flatness of a sound characteristic in the low-pitched sound band. For example, flatness of a sound characteristic may be a level of a deviation between a highest sound pressure and a lowest sound pressure.

In the piezoelectric vibration portion 1203, each of the plurality of first portions 1203a may have different sizes (e.g., widths). For example, a size (e.g., a width) of each of the plurality of first portions 1203a may progressively decrease or increase in a direction from the center portion to the both peripheries (e.g., both ends) of the piezoelectric vibration portion 1203 or the second vibration apparatus 1200. For example, in the piezoelectric vibration portion 1203, a sound pressure level characteristic of sound may be enhanced and a sound reproduction band may increase, based on various natural vibration frequencies according to a vibration of each of the plurality of first portions 1203a having different sizes.

The plurality of second portions 1203b may be disposed between the plurality of first portions 1203a. Therefore, in the piezoelectric vibration portion 1203 or the second vibration apparatus 1200, vibration energy by a link in a unit lattice of each first portion 1203a may increase by a corresponding second portion 1203b. Thus, a vibration may increase, and a piezoelectric characteristic and flexibility may be secured. For example, the second portion 1203b may include at least one or more of an epoxy-based polymer, an acrylic-based polymer, and a silicone-based polymer, but embodiments of the present disclosure are not limited thereto.

The plurality of second portions 1203b, according to an embodiment of the present disclosure, may be configured with an organic material portion. For example, the organic material portion may be disposed between the inorganic material portions, and may absorb an impact applied to the inorganic material portion (e.g., the first portion), may release a stress concentrating on the inorganic material portion to enhance the total durability of the piezoelectric vibration portion 1203 or the second vibration apparatus 1200, and may provide flexibility to the piezoelectric vibration portion 1203 or the second vibration apparatus 1200.

The plurality of second portions 1203b, according to an embodiment of the present disclosure, may have a Young's modulus and viscoelasticity that are lower than those of each first portion 1203a. Thus, the second portion 1203b may enhance the reliability of each first portion 1203a vulnerable to an impact due to a fragile characteristic. For example, the second portion 1203b may include a material having a loss coefficient of about 0.01 to about 1.0 and modulus of about 0.1 gigapascals (GPa) to about 10 gigapascals (GPa).

The organic material portion included in the second portion 1203b may include one or more of: an organic material, an organic polymer, an organic piezoelectric material, and an organic non-piezoelectric material, that has a flexible characteristic in comparison with the inorganic material portion of the first portions 1203a. For example, the second portion 1203b may be referred to as an "adhesive portion," an "elastic portion," a "bending portion," a "damping portion," or a "flexible portion each having flexibility," but embodiments of the present disclosure are not limited thereto.

Therefore, the plurality of first portions 1203a and the second portion 1203b may be disposed on (e.g., connected to) the same plane. Thus, the piezoelectric vibration portion 1203 of the vibration array 210, according to various embodiments of the present disclosure, may have a single thin film shape. For example, the piezoelectric vibration portion 1203 may have a structure in which a plurality of first portions 1203a are connected to one side. For example, the plurality of first portions 1203a may have a structure connected to a whole the piezoelectric vibration portion 1203. For example, the piezoelectric vibration portion 1203 may be vibrated in a vertical direction (e.g., a thickness direction) by the first portion 1203a having a vibration characteristic, and may be bent in a curved shape by the second portion 1203b having flexibility. Also, in the piezoelectric vibration portion 1203 according to various embodiments of the present disclosure, a size of the first portion 1203a and a size of the second portion 1203b may be adjusted based on a piezoelectric characteristic and flexibility needed for the piezoelectric vibration portion 1203 or the second vibration apparatus 1200. For example, when it is desirable for the piezoelectric vibration portion 1203 to have a piezoelectric characteristic, rather than flexibility, a size of the first portion 1203a may be adjusted to be greater than the second portion 1203b. As another example embodiment of the present disclosure, when it is desirable for the piezoelectric vibration portion 1203 to have flexibility, rather than a piezoelectric characteristic, a size of the second portion 1203b may be adjusted to be greater than the first portion 1203a. For example, the size of the second portion 1203b and the size of the first portion 1203a may be one or more of a width, a length, and a thickness. Accordingly, a size of the piezoelectric vibration portion 1203 may be adjusted based on a characteristic needed therefor. Thus, the piezoelectric vibration portion 1203 may be relatively easy to design.

The first electrode portion E1 may be disposed at a first surface (e.g., an upper surface) of the piezoelectric vibration portion 1203. The first electrode portion E1 may be disposed at or coupled to a first surface of each of a plurality of first portions 1203a and a first surface of each of a plurality of second portions 1203b in common, and may be electrically connected to the first surface of each of the plurality of first portions 1203a. For example, the first electrode portion E1 may be a single-body electrode that is disposed at a whole first surface of the piezoelectric vibration portion 1203. For example, the first electrode portion E1 may have the same shape as the piezoelectric vibration portion 1203, but embodiments of the present disclosure are not limited thereto. The first electrode portion E1 according to an embodiment of the present disclosure, as described above with reference to the example of FIG. 10, may include a transparent conductive material, a semitransparent conductive material, or an opaque conductive material.

The second electrode portion E2 may be disposed at a second surface (e.g., a rear surface) opposite to the first surface of the piezoelectric vibration portion 1203. The second electrode portion E2 may be disposed at or coupled to a second surface of each of a plurality of first portions 1203a and the second surface of each of a plurality of second portions 1203b in common, and may be electrically connected to a second surface of each of the plurality of first portions 1203a. For example, the second electrode portion E2 may be a single-body electrode that is disposed on a whole second surface of the piezoelectric vibration portion 1203. For example, the second electrode portion E2 may have the same shape as the piezoelectric vibration portion 1203, but embodiments of the present disclosure are not limited thereto. The second electrode portion E2 according to an embodiment of the present disclosure, as described above with reference to the example of FIG. 10, may include a transparent conductive material, a semitransparent conductive material, or an opaque conductive material.

The piezoelectric vibration portion 1203 may be polarized by a certain voltage applied to the first electrode portion E1 and the second electrode portion E2 in a certain temperature atmosphere, or a temperature atmosphere that may be changed from a high temperature to a room temperature, but embodiments of the present disclosure are not limited thereto. For example, the piezoelectric vibration portion 1203 may alternately and repeatedly contract and expand based on an inverse piezoelectric effect according to a sound signal (e.g., voice signal) applied to the first electrode portion E1 and the second electrode portion E2 from the outside to vibrate. For example, the piezoelectric vibration portion 1203 may vibrate based on a vertical-direction (e.g., a thickness direction Z) vibration d33 and a horizontal-direction (e.g., a planar direction) vibration d31 by the first electrode portion E1 and the second electrode portion E2. The piezoelectric vibration portion 1203 may increase the displacement of the display apparatus by contraction and expansion in the horizontal-direction, thereby further improving the vibration.

According to some embodiments of the present disclosure, the second vibration apparatus 1200 may include a plurality of inorganic material portions having piezoelectric characteristic and an organic material portion between the plurality of inorganic material portions. For example, the second vibration apparatus 1200 may include a plurality of inorganic material portions having piezoelectric characteristic and an organic material portion connected between the plurality of inorganic material portions.

The second vibration apparatus 1200 according to another embodiment of the present disclosure may further include a first protection member and a second protection member. The first protection member may be disposed over the first electrode portion E1, and may protect the first electrode portion E1. For example, the first protection member may include a plastic material, a fiber material, or a wood material, but embodiments of the present disclosure are not limited thereto.

The second protection member may be disposed over the second electrode portion E2, and may protect the second electrode portion E2. For example, the second protection member may include a plastic material, a fiber material, or a wood material, but embodiments of the present disclosure are not limited thereto. For example, the first protection member may include a material that is the same as or different from the second protection member. One or more of the first protection member and the second protection member may be attached or coupled to one or more a display apparatus by an adhesive member.

Figure 12:
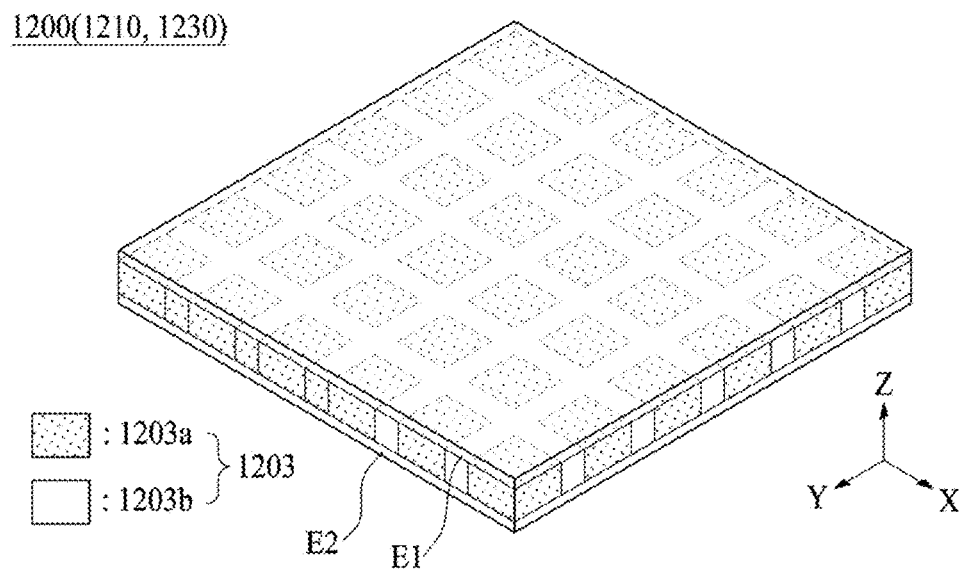
FIG. 12 illustrates a second vibration apparatus according to another embodiment of the present disclosure.

FIG. 12 illustrates a second vibration apparatus according to another embodiment of the present disclosure.

FIG. 12 illustrates an embodiment in which the piezoelectric vibration portion illustrated in FIG. 11 is modified. Hereinafter, therefore, repetitive descriptions of elements other than the piezoelectric vibration portion may be omitted or will be briefly given.

With reference to the example of FIG. 12, in the second vibration apparatus 1200, according to another embodiment of the present disclosure, the piezoelectric vibration portion 1203 may include a plurality of first portions 1203a, which may be spaced apart from one another along a first direction X and a second direction Y, and a second portion 1203b disposed between the plurality of first portions 1203a.

Each of the plurality of first portions 1203a may be disposed to be spaced apart from one another along the first direction X and the second direction Y. For example, each of the plurality of first portions 1203a may have a hexahedral shape (e.g., a six-sided object shape) having the same size, and may be disposed in a lattice shape. For example, each of the plurality of first portions 1203a may include a piezoelectric material that may be substantially the same as the first portion 1203a described above with reference to the example of FIG. 11. Thus, like reference numerals refer to like elements, and their repetitive descriptions may be omitted.

The second portion 1203b may be disposed between the plurality of first portions 1203a along each of the first direction X and the second direction Y. The second portion 1203b may be configured to fill a gap or a space between two adjacent first portions 1203a, or to surround each of the plurality of first portions 1203a, and thus, may be connected or attached to an adjacent first portion 1203a. According to an embodiment of the present disclosure, a width of a second portion 1203b disposed between two first portions 1203a adjacent to each other along the first direction X may be the same as or different from the first portion 1203a, and a width of a second portion 1203b disposed between two first portions 1203a adjacent to each other along the second direction Y may be the same as or different from the first portion 1203a. For example, the second portion 1203b may include an organic material that may be substantially the same as the second portion 1203b described above with reference to the example of FIG. 11. Thus, like reference numerals refer to like elements, and their repetitive descriptions may be omitted.

Therefore, the piezoelectric vibration portion 1203 of the second vibration apparatus 1200 according to another embodiment of the present disclosure may include a 1-3 composite structure, and thus may have a resonance frequency of 30 MHz or less, but embodiments of the present disclosure are not limited thereto. For example, a resonance frequency of the piezoelectric vibration portion 1203 may vary based on one or more of: a shape, a length, and a thickness.

Figure 13:
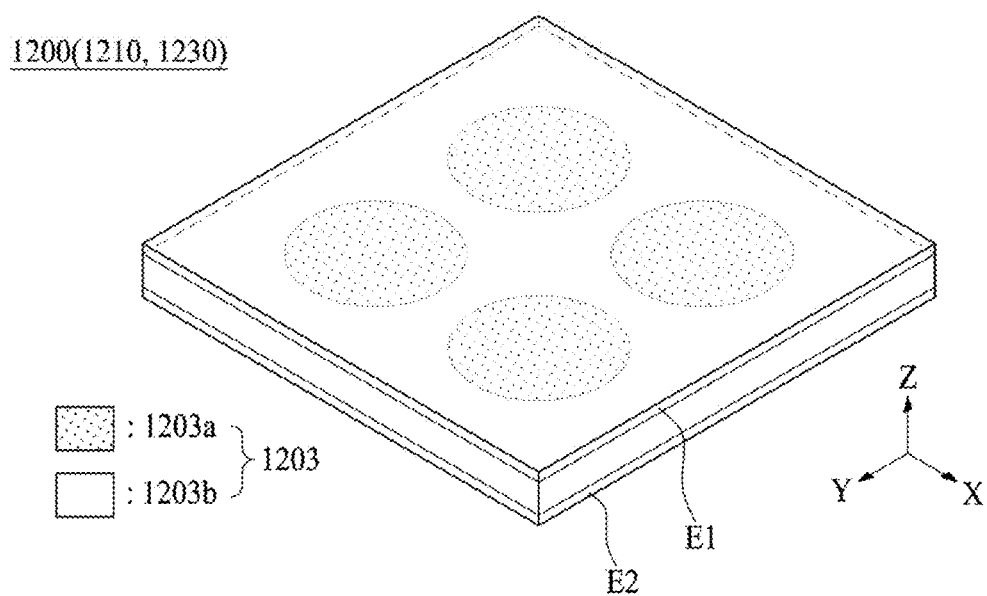
FIG. 13 illustrates a second vibration apparatus according to another embodiment of the present disclosure.

FIG. 13 illustrates a second vibration apparatus according to another embodiment of the present disclosure.

FIG. 13 illustrates an embodiment in which the piezoelectric vibration portion illustrated in FIG. 11 is modified. Hereinafter, therefore, repetitive descriptions of elements other than the piezoelectric vibration portion may be omitted or will be briefly given.

With reference to the example of FIG. 13, in the second vibration apparatus 1200, according to another embodiment of the present disclosure, the piezoelectric vibration portion 1203 may include a plurality of first portions 1203a, which may be spaced apart from one another along a first direction X and a second direction Y, and a second portion 1203b disposed between the plurality of first portions 1203a. Each of the plurality of first portions 1203a may be disposed to be spaced apart from one another along the first direction X and the second direction Y. For example, each of the plurality of first portions 1203a may have a flat structure of a circular shape, but embodiments of the present disclosure are not limited thereto. For example, each of the plurality of first portions 1203a may have a dot shape, including an oval shape, a polygonal shape, or a donut shape.

The second portion 1203b may be disposed between the plurality of first portions 1203a along each of the first direction X and the second direction Y. The second portion 1203b may be configured to surround each of the plurality of first portions 1203a, and thus, may be connected to or attached on a side surface of each of the plurality of first portions 1203a. The plurality of first portions 1203a and the second portion 1203b may be disposed (or arranged) in parallel on the same plane (e.g., the same layer).

In the piezoelectric vibration portion 1203 of the second vibration apparatus 1200, according to another embodiment of the present disclosure, each of the plurality of first portions 1203a may have a flat structure of a triangular shape, instead of a flat structure of a circular shape. For example, each of the plurality of first portions 1203a may have a triangular plate shape.

According to an embodiment of the present disclosure, four adjacent first portions 1203a, among the plurality of first portions 1203a, may be adjacent to one another to form a tetragonal or quadrilateral shape (e.g., a square shape). Vertices of the four adjacent first portions 1203a, forming a tetragonal shape, may be adjacent to one another in a center portion (or a central portion) of the tetragonal shape.

According to another embodiment of the present disclosure, six adjacent first portions 1203a, among the plurality of first portions 1203a, may be adjacent to one another to form a hexagonal shape (e.g., a regular hexagonal shape). Vertices of the six adjacent first portions 1203a, forming a hexagonal shape, may be adjacent to one another in a center portion (or a central portion) of the hexagonal shape.

The first supporting member 500, according to an embodiment of the present disclosure, may include a fifth hole 590 for coupling of the vibration apparatus 800. A frequency-amplitude characteristic may vary based on the number and positions of fifth holes 590 disposed at the first supporting member 500. Thus, a display apparatus having a desired frequency-amplitude characteristic may be implemented based on changing the number and arrangement of fifth holes 590.

Figure 14A:
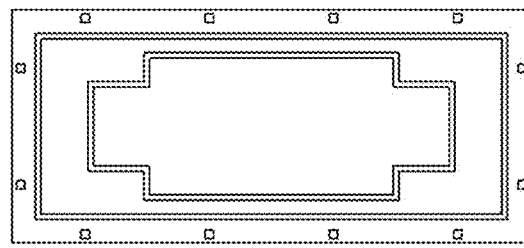
FIG. 14A illustrates a first supporting member according to another embodiment of the present disclosure.

FIG. 14A illustrates a first supporting member according to another embodiment of the present disclosure. FIGS. 14B to 14E illustrate various arrangements of fifth holes formed at a first supporting member according to an embodiment of the present disclosure. FIG. 15 is a graph showing a frequency-amplitude characteristic measured in each display apparatus.

For example, FIG. 14A illustrates a first supporting member in which a fifth hole is not formed. FIGS. 14B to 14E illustrate various example arrangements of fifth holes formed at a first supporting member. In the example of FIG. 15, the abscissa axis represents a frequency (shown in Hertz (Hz)), and the ordinate axis represents an amplitude (shown in meters (m)). In FIG. 15, an amplitude represents a width of a frequency-based vibration of the first supporting member that vibrates when a display apparatus vibrates, and an amplitude may represent the amount of energy consumed in a vibration of the first supporting member. Therefore, because the amount of energy, consumed in a vibration of the first supporting member, is reduced as an amplitude decreases, vibration energy transferred to a display panel may be high. Thus, a vibration efficiency of the display panel may be enhanced.

In FIG. 15, a thin solid line represents a comparative example. A thick solid line represents a first embodiment of the present disclosure. A dotted line represents a second embodiment of the present disclosure. A one-dot-dashed line represents a third embodiment of the present disclosure. A two-dot-dashed line represents a fourth embodiment of the present disclosure.

With reference to the examples of FIGS. 14A to 15, a fifth hole 590, formed at the first supporting member 500, may be for coupling the first supporting member 500 to the vibration apparatus 800. For example, a screw or a bolt may be fastened to the fifth hole 590, and may couple or connect the first supporting member 500 to the vibration apparatus 800.

With reference to the examples of FIGS. 14A to 15, a first supporting member 500a of an experiment example (e.g., FIG. 14A) does not include a fifth hole 590, and first supporting members 500b to 500e of the first to fourth embodiments of the present disclosure (e.g., FIGS. 14B to 14E) include fifth holes 590b to 590e. At a frequency of about 1,500 Hz or less, it may be seen that an amplitude of the first supporting member 500a, measured in a display apparatus including the first supporting member 500a of the experiment example (e.g., FIG. 14A), is greater than an amplitude of each of the first supporting members 500b to 500e, measured in a display apparatus including the first supporting members 500b to 500e according to the first to fourth embodiments of the present disclosure (e.g., FIGS. 14B to 14E). Also, it may be seen that an amplitude of each of the first supporting members 500b to 500e, measured in the display apparatus including the first supporting members 500b to 500e according to the first to fourth embodiments of the present disclosure (e.g., FIGS. 14B to 14E), is more stable than an amplitude of the first supporting member 500a, measured in the display apparatus including the first supporting member 500a of the experiment example (e.g., FIG. 14A).

According to an embodiment of the present disclosure, at a frequency of about 1,500 Hz or less, an amplitude of each of the first to fourth embodiments of the present disclosure (e.g., FIGS. 14B to 14E) is smaller than an amplitude of the experiment example (e.g., FIG. 14A). Therefore, the amount of energy consumed in a vibration of the first supporting members 500b to 500e of the first to fourth embodiments of the present disclosure (e.g., FIGS. 14B to 14E) is smaller than the amount of energy consumed in a vibration of the first supporting member of the experiment example (e.g., FIG. 14A), thus generating a sound characteristic of a middle-low-pitched sound band. Also, in a frequency of about 1,500 Hz or less, a variation amount of an amplitude of each of the first to fourth embodiments of the present disclosure (e.g., FIGS. 14B to 14E) is smaller than a variation amount of an amplitude of the experiment example (e.g., FIG. 14A). Thus, sound having stable flatness may be generated. Therefore, when the first supporting member 500 is coupled or connected to the vibration apparatus 800 by using the fifth hole 590 and a screw (or a bolt), a vibration efficiency of a display panel may be more enhanced than when the first supporting member 500 is not coupled to the vibration apparatus 800, and sound flatness may be enhanced.

Figure 14B:
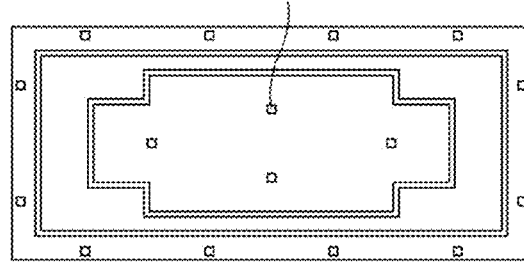
FIGS. 14B to 14E illustrate various arrangements of fifth holes formed at a first supporting member according to an embodiment of the present disclosure.
Figure 14C:
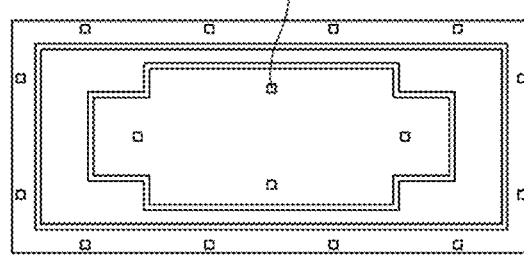
Figure 15:
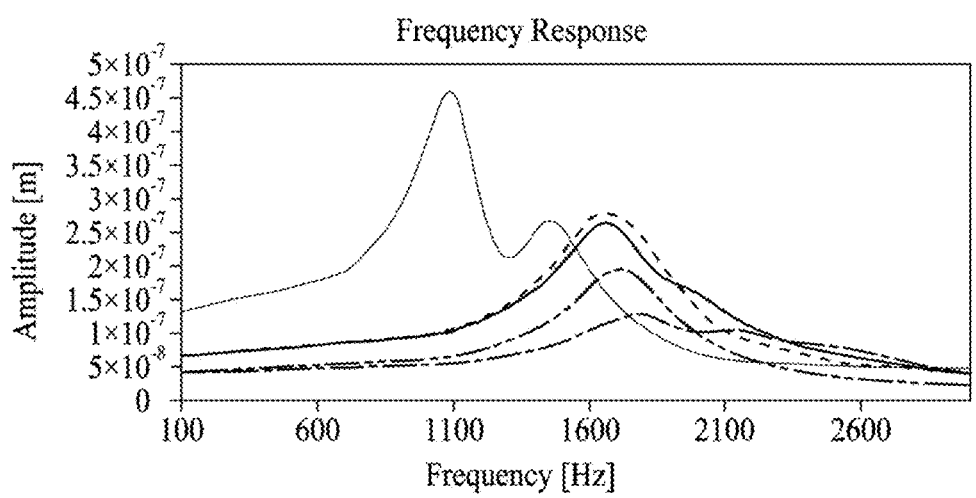
FIG. 15 is a graph showing a frequency-amplitude characteristic measured in each display apparatus.

With reference to the examples of FIGS. 14B and 14C, the first supporting members 500b and 500c of the first embodiment of the present disclosure (e.g., FIG. 14B) and the second embodiment of the present disclosure (e.g., FIG. 14C) may include a same number of fifth holes 590b and 590c. Also, the fifth hole 590b formed at the first supporting member 500b of the first embodiment of the present disclosure (e.g., FIG. 14B) may more concentrate at a center of the first supporting member 500b than the fifth hole 590c formed at the first supporting member 500b of the second embodiment of the present disclosure (e.g., FIG. 14C).

With reference to the example of FIG. 15, it may be seen that a peak value of an amplitude of the first supporting member 500b, measured in a display apparatus including the first supporting member 500b according to the first embodiment of the present disclosure (e.g., FIG. 14B), is smaller than a peak value of an amplitude of the first supporting member 500c, measured in a display apparatus including the first supporting member 500c according to the second embodiment of the present disclosure (e.g., FIG. 14C). For example, in a frequency of about 1,100 Hz to about 1,900 Hz, because an amplitude of the first supporting member 500b according to the first embodiment of the present disclosure (e.g., FIG. 14B) is smaller than an amplitude of the first supporting member 500c according to the second embodiment of the present disclosure (e.g., FIG. 14C), vibration efficiency in the display apparatus including the first supporting member 500b according to the first embodiment of the present disclosure (e.g., FIG. 14B) is higher than vibration efficiency in the display apparatus including the first supporting member 500c according to the second embodiment of the present disclosure (e.g., FIG. 14C).

Figure 14D:
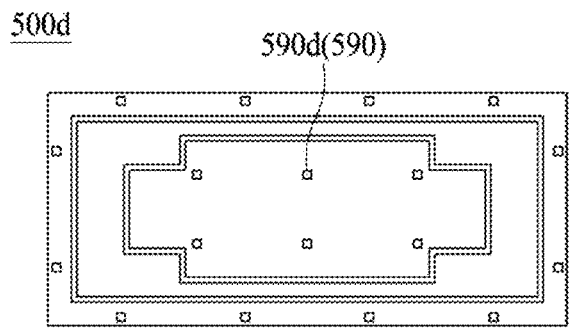
Figure 14E:
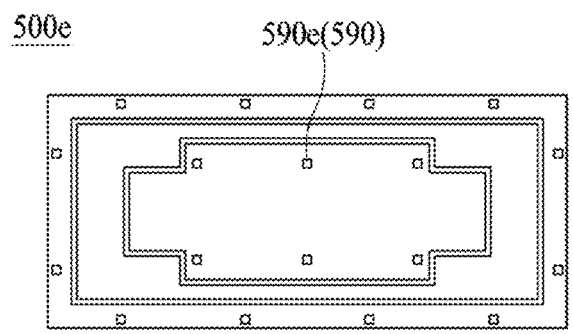

With reference to the examples of FIGS. 14D and 14E, the first supporting members 500d and 500e of the third embodiment of the present disclosure (e.g., FIG. 14D) and the fourth embodiment of the present disclosure (e.g., FIG. 14E) may include a same number of fifth holes 590d and 590e. Also, the fifth hole 590d formed at the first supporting member 500b of the third embodiment of the present disclosure (e.g., FIG. 14D) may more concentrate on a center of the first supporting member 500d than the fifth hole 590e formed at the first supporting member 500e of the fourth embodiment of the present disclosure (e.g., FIG. 14E).

With reference to the example of FIG. 15, it may be seen that a peak value of an amplitude of the first supporting member 500c, measured in a display apparatus including the first supporting member 500d according to the third embodiment of the present disclosure (e.g., FIG. 14D), is smaller than a peak value of an amplitude of the first supporting member 500d, measured in a display apparatus including the first supporting member 500e according to the fourth embodiment of the present disclosure (e.g., FIG. 14E). For example, in a frequency of about 1,100 Hz to about 2,000 Hz, because an amplitude of the first supporting member 500d according to the third embodiment of the present disclosure (e.g., FIG. 14D) is smaller than an amplitude of the first supporting member 500e according to the fourth embodiment of the present disclosure (e.g., FIG. 14E), vibration efficiency in the display apparatus including the first supporting member 500d according to the third embodiment of the present disclosure (e.g., FIG. 14C) is higher than vibration efficiency in the display apparatus including the first supporting member 500e according to the fourth embodiment of the present disclosure (e.g., FIG. 14E).

Therefore, although the first supporting member 500 may be coupled or connected to the vibration apparatus 800 using a same number of fifth holes 590 and a screw (or a bolt), when the first supporting member 500 is coupled or connected to the vibration apparatus 800 using a same number of fifth holes 590 and a screw (or a bolt) in a region adjacent to the vibration apparatus 800, a coupling force between the first supporting member 500 and the vibration apparatus 800 may more increase than when the first supporting member 500 is coupled or connected to the vibration apparatus 800 using the fifth hole 590 and a screw (or a bolt) in a region relatively far away from the vibration apparatus 800. Thus, the amount of energy consumed in the first supporting member 500 may be reduced, thereby enhancing a vibration efficiency of the display panel and enhancing sound flatness.

With reference to the examples of FIGS. 14B to 14E, the number of fifth holes 590d and 590e formed at the first supporting members 500d and 500e of the third embodiment of the present disclosure (e.g., FIG. 14D) and the fourth embodiment of the present disclosure (e.g., FIG. 14E) may be more than the number of fifth holes 590b and 590c formed at the first supporting members 500b and 500c of the first embodiment of the present disclosure (e.g., FIG. 14B) and the second embodiment of the present disclosure (e.g., FIG. 14C). With reference to the example of FIG. 15, it may be seen that a peak value of an amplitude of each of the first supporting members 500d and 500e, measured in a display apparatus including the first supporting members 500d and 500e according to the third embodiment of the present disclosure (e.g., FIG. 14D) and the fourth embodiment (e.g., FIG. 14E), is smaller than a peak value of an amplitude of each of the first supporting members 500b and 500c, measured in a display apparatus including the first supporting members 500b and 500c according to the first embodiment of the present disclosure (e.g., FIG. 14B) and the second embodiment of the present disclosure (e.g., FIG. 14C).

According to an embodiment of the present disclosure, in a frequency of about 1,100 Hz to about 2,100 Hz, because an amplitude of each of the first supporting members 500d and 500e according to the third embodiment of the present disclosure (e.g., FIG. 14D) and the fourth embodiment of the present disclosure (e.g., FIG. 14E) is smaller than an amplitude of each of the first supporting members 500b and 500c according to the first embodiment of the present disclosure (e.g., FIG. 14B) and the second embodiment of the present disclosure (e.g., FIG. 14C), vibration efficiency in the display apparatus including the first supporting members 500d and 500e according to the third embodiment of the present disclosure (e.g., FIG. 14D) and the fourth embodiment of the present disclosure (e.g., FIG. 14E) is higher than vibration efficiency in the display apparatus including the first supporting members 500b and 500c according to the first embodiment of the present disclosure (e.g., FIG. 14B) and the second embodiment of the present disclosure (e.g., FIG. 14C).

Therefore, when the first supporting member 500 is coupled or connected to the vibration apparatus 800 using relatively more fifth holes 590 and a screw (or a bolt), a coupling force between the first supporting member 500 and the vibration apparatus 800 may more increase than when the first supporting member 500 is coupled or connected to the vibration apparatus 800 using relatively fewer fifth holes 590 and a screw (or a bolt). Thus, the amount of energy consumed by the first supporting member 500 may be reduced, thereby enhancing a vibration efficiency of the display panel and enhancing sound flatness.

Figure 16:
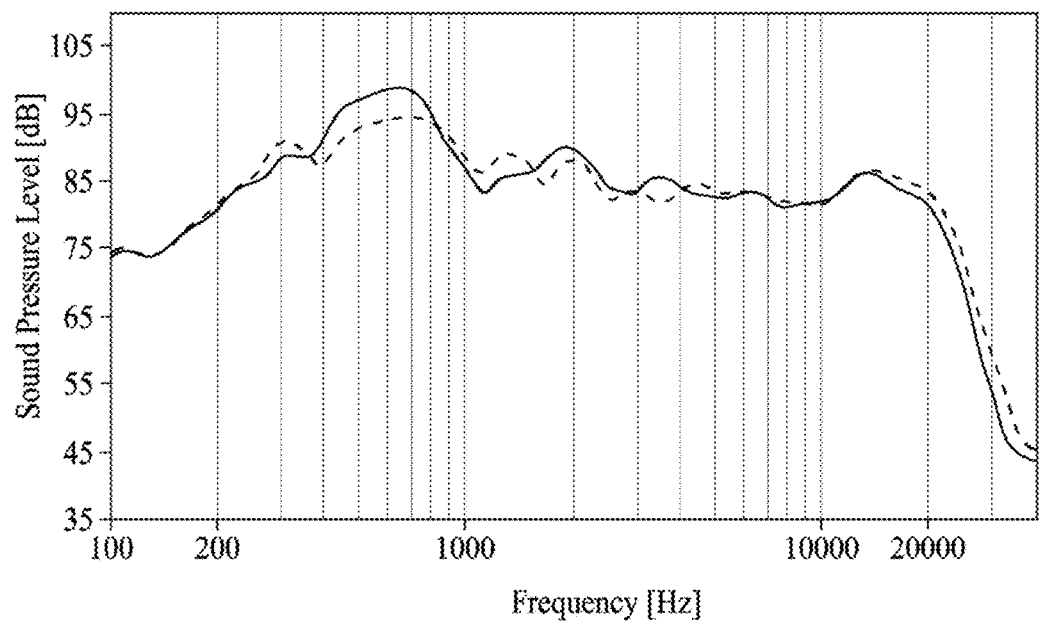
FIG. 16 is a graph showing a sound pressure level characteristic of a display apparatus according to an embodiment of the present disclosure.
Figure 17:
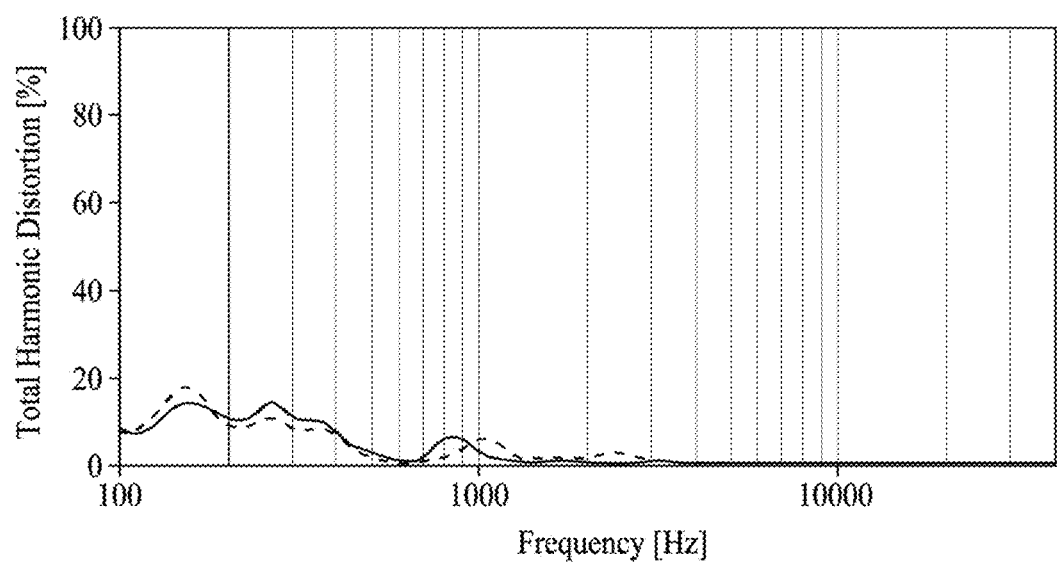
FIG. 17 is a graph showing a total harmonic distortion characteristic of a display apparatus according to an embodiment of the present disclosure.

FIG. 16 is a graph showing a sound pressure level characteristic of a display apparatus according to an embodiment of the present disclosure. FIG. 17 is a graph showing a total harmonic distortion characteristic of a display apparatus according to an embodiment of the present disclosure.

In FIG. 16, the abscissa axis represents a frequency (Hz), and the ordinate axis represents a sound pressure level (shown in decibels (dB)). In FIG. 17, the abscissa axis represents a frequency (Hz), and the ordinate axis represents a total harmonic distortion (THD) rate (%). In each of the examples of FIGS. 16 and 17, a first embodiment of the present disclosure, illustrated by a solid line, is a result measured in a display apparatus including a pair of vibration devices spaced apart by an interval of 60 mm, and a second embodiment of the present disclosure, illustrated by a dotted line, is a result measured in a display apparatus including a pair of vibration devices spaced apart by an interval of 17.8 mm.

According to an embodiment of the present disclosure, when the PCB 330 of the driving circuit 300 is not disposed between the display panel 200 and the first supporting member 500, the arrangement of the vibration apparatus 800 may not be affected by the PCB 330. Thus, the degree of freedom in arrangement of the vibration apparatus 800 may be enhanced. Accordingly, as in the first embodiment of the present disclosure, a pair of vibration devices may be spaced apart by an interval of 60 mm, and, as in the second embodiment of the present disclosure, a pair of vibration devices may be spaced apart by an interval of 17.8 mm.

With reference to the example of FIG. 16, it may be seen that sound output from a display apparatus according to an embodiment of the present disclosure is output at a sound pressure level of 65 dB or more in a reproduction pitched sound band of 100 Hz to 20 kHz. For example, sound is output at a sound pressure level of 79 dB or more in a reproduction pitched sound band of 200 Hz to 20 kHz. Therefore, the display apparatus according to an embodiment of the present disclosure may output sound having a frequency band of 100 Hz to 20 kHz based on a vibration of the display panel 200 even without a separate speaker. Also, it may be seen that sound output from the display apparatus according to an embodiment of the present disclosure has stable sound flatness in a frequency band of 1 kHz to 20 kHz. Sound flatness may be a magnitude of a deviation between a highest sound pressure level and a lowest sound pressure level.

With reference to the example of FIG. 17, a display apparatus according to an embodiment of the present disclosure may have a low THD rate of 20% or less in a reproduction pitched sound band of 100 Hz to 10 kHz, and may not have a period where a THD rate increases rapidly. Thus, a good-quality sound may be output.

Figure 18:
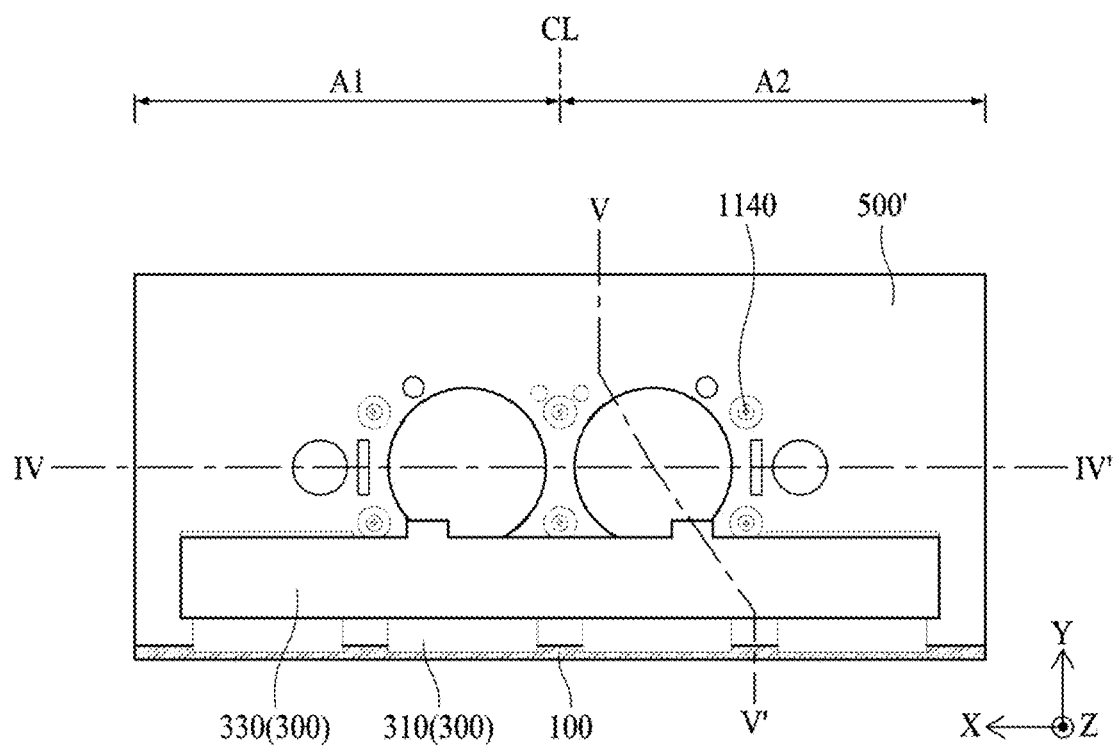
FIG. 18 illustrates a rear surface of a display apparatus according to another embodiment of the present disclosure.
Figure 19:
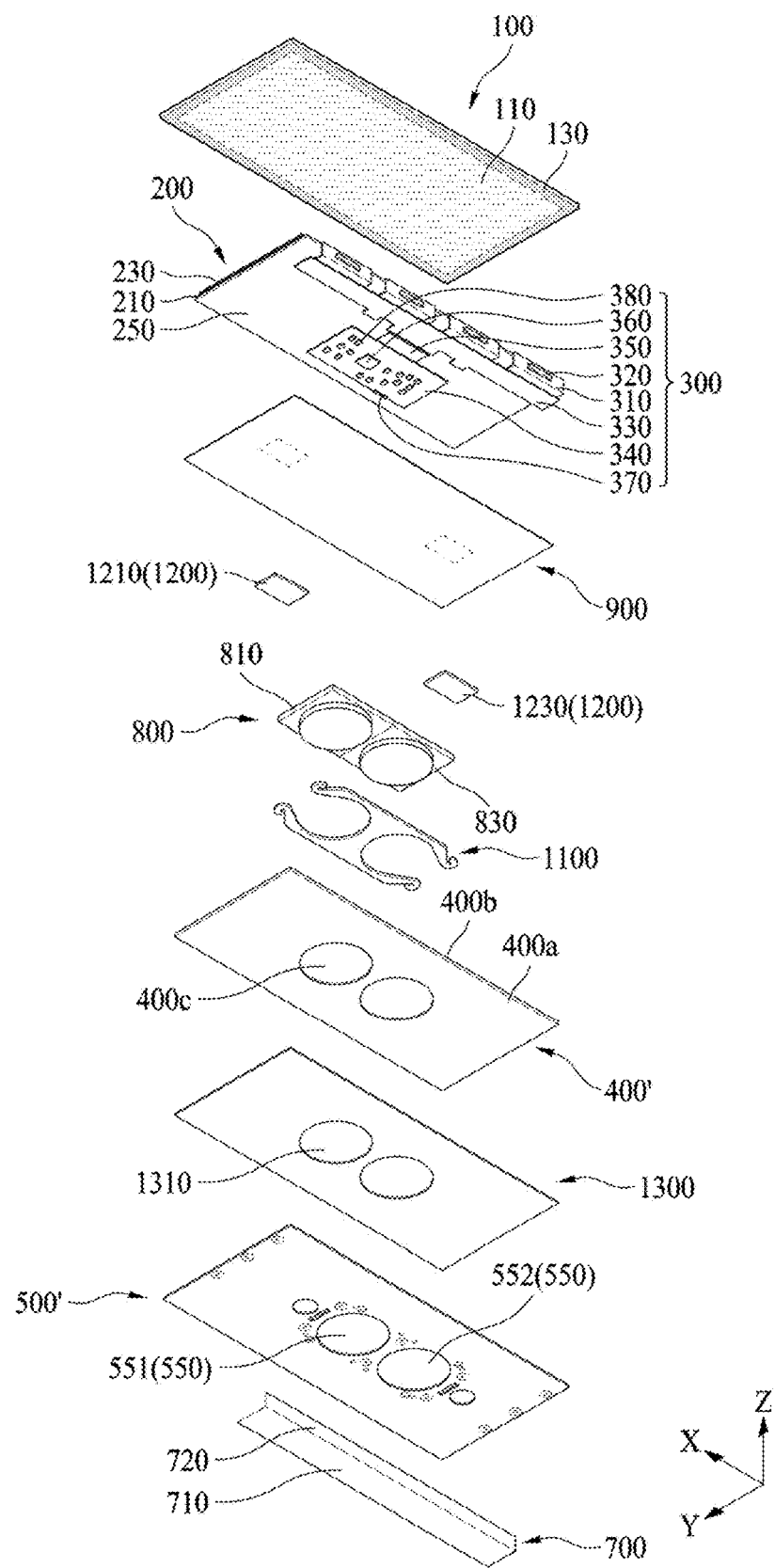
FIG. 19 is an exploded perspective view of the display apparatus illustrated in FIG. 18.
Figure 20:
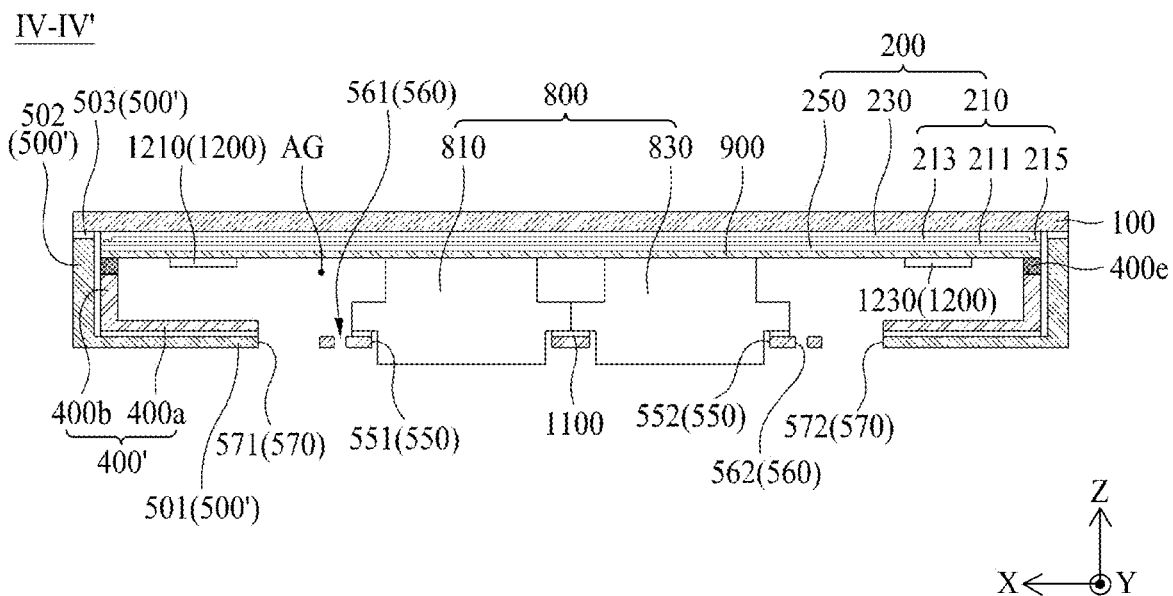
FIG. 20 is a cross-sectional view taken along line IV-IV' illustrated in FIG. 18.
Figure 21:
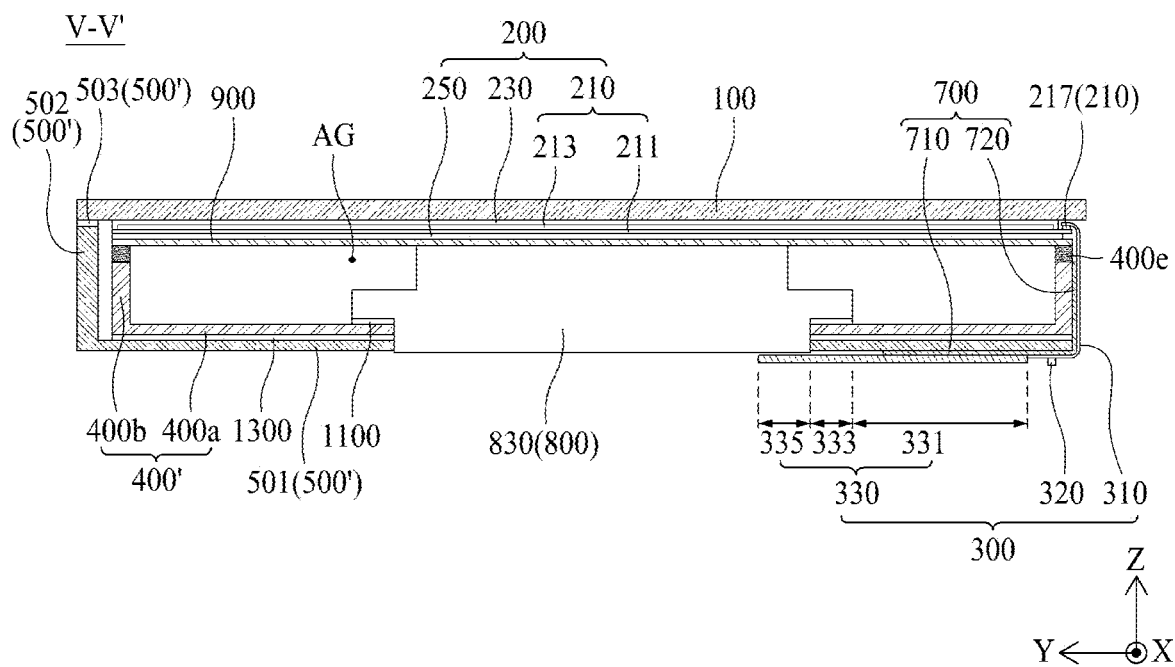
FIG. 21 is a cross-sectional view taken along line V-V' illustrated in FIG. 18.
Figure 22:
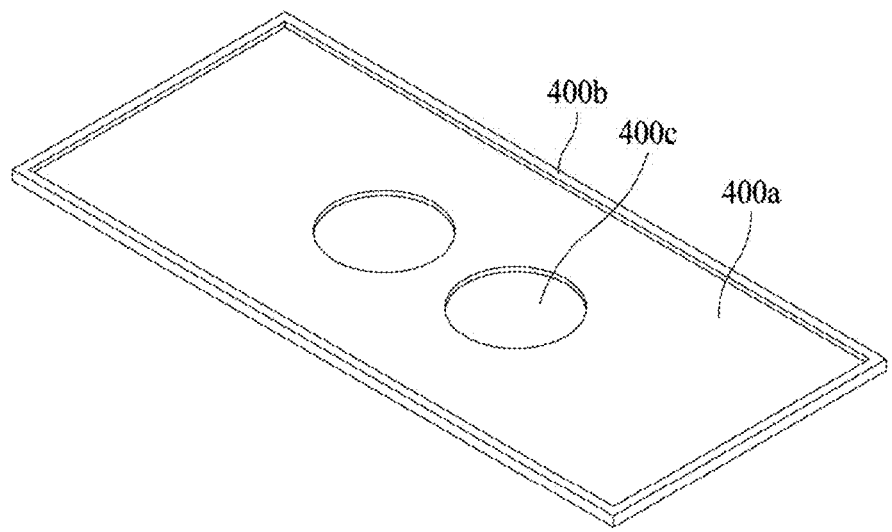
FIG. 22 is a front perspective view of a supporting frame illustrated in FIG. 19.

FIG. 18 illustrates a rear surface of a display apparatus according to another embodiment of the present disclosure. FIG. 19 is an exploded perspective view of the display apparatus illustrated in FIG. 18. FIG. 20 is a cross-sectional view taken along line IV-IV' illustrated in FIG. 18. FIG. 21 is a cross-sectional view taken along line V-V' illustrated in FIG. 18. FIG. 22 is a front perspective view of a supporting frame illustrated in FIG. 19.

With reference to the examples of FIGS. 18 to 22, the display apparatus according to another embodiment of the present disclosure may be implemented by modifying the supporting frame 400 and the first supporting member 500 in the display apparatus illustrated in the examples of FIGS. 1 to 5, modifying the second supporting member 600 and the fifth connection member 1000 to a ninth connection member (e.g., a guide connection member) 1300, and applying the supporting member 700 configured with the 3-1$^{th}$ supporting member 710 and the 3-2$^{th}$ supporting member 720 illustrated in the example of FIG. 8B, to a third supporting member 700. The display apparatus according to another embodiment of the present disclosure may include fewer elements and simpler configuration than the display apparatus according to an embodiment of the present disclosure. Thus, the product price and a product assembly and/or production time of embodiments may be reduced. In the following description, repetitive descriptions of the same elements other than a modified element, and elements relevant thereto will be briefly given or are omitted.

The display apparatus according to another embodiment of the present disclosure may be configured to reinforce the stiffness of a first supporting member 500' by using a structure (for example, an area and a shape) of a supporting frame 400' and the first supporting member 500', and to absorb an undesired vibration of a vibration apparatus 800, thereby reducing or preventing the occurrence of noise caused by coupling between elements. In the display apparatus according to another embodiment of the present disclosure, the supporting frame 400' may be disposed at a rear surface of a display panel 200. For example, when a heat dissipation member 900 is disposed at the rear surface of the display panel 200, the supporting frame 400' may be disposed at a rear surface of the heat dissipation member 900. The supporting frame 400' may provide an accommodation or reception space of the vibration apparatus 800, or an air gap AG between the rear surface of the display panel 200 and the supporting frame 400'. For example, the supporting frame 400' may be adjusted by an interval between a front member 100 and the first supporting member 500'.

According to another embodiment of the present disclosure, the supporting frame 400' may be disposed at the rear surface of the display panel 200, or the rear surface of the heat dissipation member 900, by a seventh connection member 400e. For example, the seventh connection member 400e may include an adhesive resin, a double-sided tape having an adhesive layer, or a double-sided foam pad having an adhesive layer, but embodiments of the present disclosure are not limited thereto. For example, the adhesive resin and the adhesive layer of the seventh connection member 400e may include an acryl-based or urethane-based adhesive material, but embodiments of the present disclosure are not limited thereto.

According to another embodiment of the present disclosure, the supporting frame 400' may be disposed between the first supporting member 500' and the display panel 200, supported by the first supporting member 500, and supported by the display panel 200. For example, a portion of the supporting frame 400' may be disposed at the first supporting member 500' and a rear periphery of a vibration apparatus 800, and may support the vibration apparatus 800. For example, the supporting frame 400' may be a molding structure, which may be manufactured by a molding process using a material, such as plastic or the like, but embodiments of the present disclosure are not limited thereto.

The supporting frame 400', according to an embodiment of the present disclosure, may include a first surface 400a disposed at the first supporting member 500', and a second surface 400b extending vertically along a periphery of the first surface 400a. For example, the first surface 400a and the second surface 400b may be provided as one body or as a single body, but embodiments of the present disclosure are not limited thereto. For example, the first surface 400a may be a bottom surface or a lower surface, but embodiments of the present disclosure are not limited thereto. For example, the second surface 400b may be a sidewall or a side surface, but embodiments of the present disclosure are not limited thereto.

As described above, the supporting frame 400' may be disposed to support the vibration apparatus 800. Thus, the vibration apparatus 800 may be supported by the supporting frame 400' and the first supporting member 500'. Accordingly, the supporting frame 400' may complement the stiffness of the first supporting member 500' supporting the vibration apparatus 800, and thus, may more reinforce the stiffness of a rear surface of the vibration apparatus than when the vibration apparatus 800 is supported by only the first supporting member 500'.

According to an embodiment of the present disclosure, the first surface 400a of the supporting frame 400' may have a flat shape, but embodiments of the present disclosure are not limited thereto. For example, a periphery of the first surface 400a may be disposed along a periphery of the display panel 200. The first surface 400a according to an embodiment of the present disclosure may include a supporting hole 400c (e.g., a hole or a groove) into which the vibration apparatus 800 may be inserted or accommodated. For example, the supporting hole 400c may have a size and a shape that enables a portion of a rear surface of the vibration apparatus 800 to be inserted or accommodated thereinto. For example, the first surface (e.g., a peripheral portion or peripheral region) 400a near the supporting hole 400c may be disposed between a periphery of the vibration apparatus 800 and the first supporting member 500', and may support a rear periphery of the vibration apparatus 800. For example, the supporting hole 400c may be formed to correspond to a first hole 550 of the first supporting member 500'.

According to an embodiment of the present disclosure, the second surface 400b of the supporting frame 400' may be disposed along a periphery of the first surface 400a. For example, the second surface 400b may be disposed at the rear surface of the display panel 200, or a rear surface of a heat dissipation member 900, by a seventh connection member 400e. For example, the second surface 400b may surround the vibration apparatus 800, and may provide an accommodation or reception space of the vibration apparatus 800, or an air gap AG, between the rear surface of the display panel 200 and the supporting frame 400'.

Figure 23:
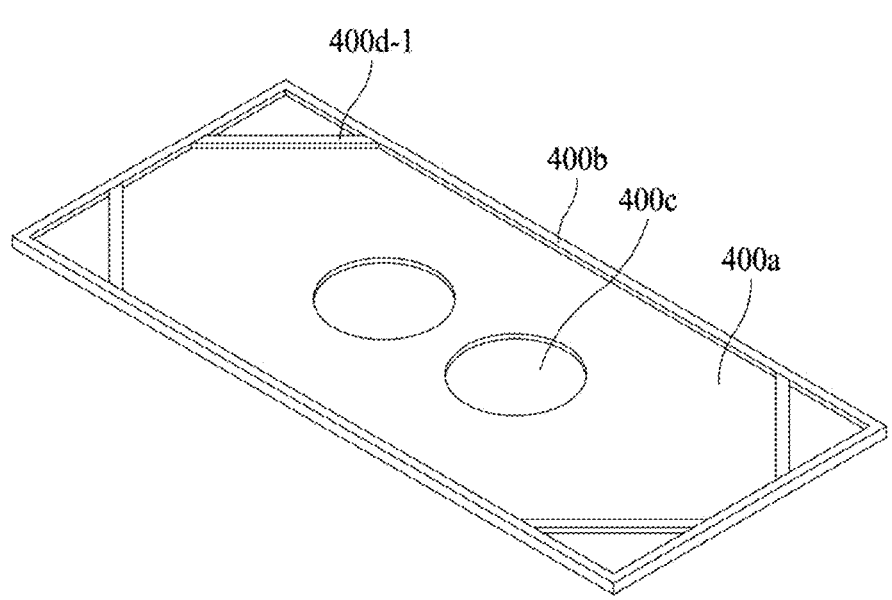
FIGS. 23 to 25 illustrate another example of a supporting frame according to an embodiment of the present disclosure.
Figure 24:
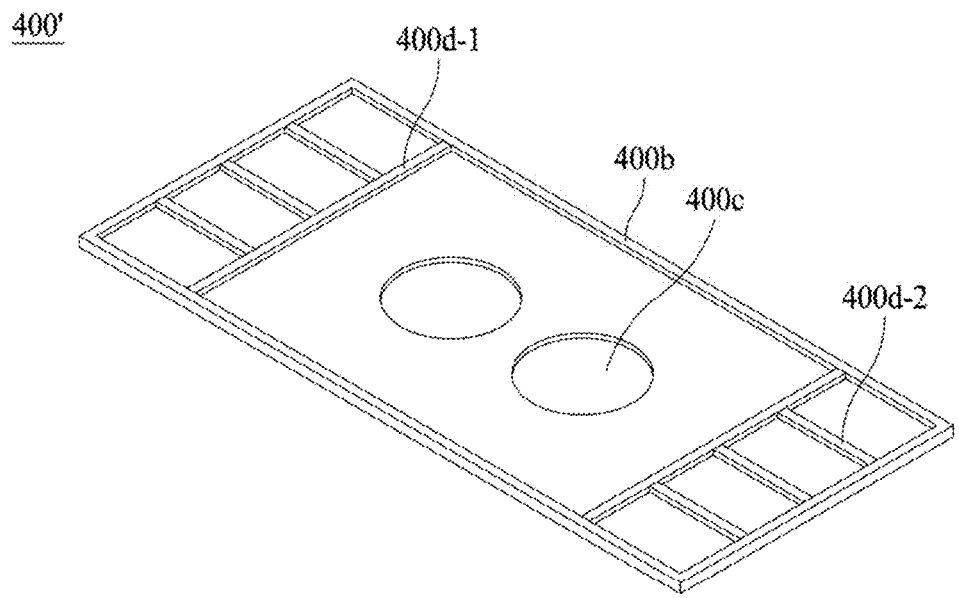
Figure 25:
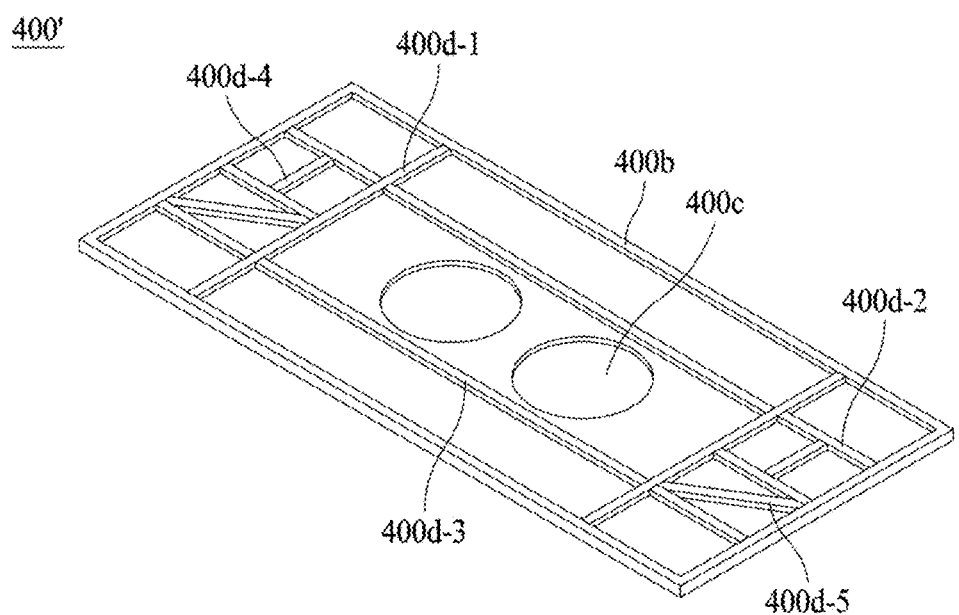

FIGS. 23 to 25 illustrate another example of a supporting frame according to an embodiment of the present disclosure.

FIGS. 23 to 25 illustrate various example arrangements of a reinforcement structure, but the arrangement of the reinforcement structure is not limited thereto. With reference to the examples of FIGS. 23 to 25, the supporting frame 400' according to an embodiment of the present disclosure may further include a reinforcement structure 400d having various shapes, which may reinforce the stiffness of the supporting frame 400'. For example, the reinforcement structure 400d may be disposed between the rear surface of the display panel 200 and the first surface 400a. For example, the reinforcement structure 400d may protrude toward the rear surface of the display panel 200 from the first surface 400a, or may be disposed at a surface (e.g., a front surface) of the first surface 400a facing the rear surface of the display panel 200.

According to an embodiment of the present disclosure, a thickness (e.g., a height) of the reinforcement structure 400d may be the same as a thickness (e.g., a height) of the second surface 400b. For example, a top surface of the reinforcement structure 400d may contact the rear surface of the display panel 200. According to an embodiment of the present disclosure, a thickness of the reinforcement structure 400d may differ from a thickness of the second surface 400b. For example, a thickness of the reinforcement structure 400d may be smaller than a thickness of the second surface 400b.

A reinforcement structure 400d, according to an embodiment of the present disclosure, may include at least one or more reinforcement member. For example, the reinforcement member may have a rod shape. For example, the at least one reinforcement member may be disposed in various shapes.

With reference to the example of FIG. 23, the reinforcement structure 400d may include a reinforcement member (e.g., a first reinforcement member) 400d_1 disposed on a first surface 400a thereof. For example, the reinforcement member 400d_1 may connect two different second surfaces 400b. For example, the reinforcement member 400d_1 may be disposed at the first surface 400a to be adjacent to a corner (for a connection point between the second surfaces 400b) formed at the first surface 400a, and may connect the two different second surfaces 400b configuring a corner (e.g., a connection point).

With reference to the example of FIG. 24, the reinforcement structure 400d may include a first reinforcement member 400d_1 and a second reinforcement member 400d_2, which may be disposed at the first surface 400a. For example, the first reinforcement member 400d_1 may connect two different second surfaces 400b. For example, the second reinforcement member 400d_2 may connect the first reinforcement member 400d_1 to the second surface 400b.

With reference to the example of FIG. 25, the reinforcement structure 400d may further include a third reinforcement member 400d_3 disposed at the first surface 400a. For example, the third reinforcement member 400d_3 may connect two different first reinforcement members 400d_1. For example, the reinforcement structure 400d may further include a fourth reinforcement member 400d_4 disposed at the first surface 400a. For example, the fourth reinforcement member 400d_4 may connect two different second reinforcement members 400d_2. For example, the fourth reinforcement member 400d_4 may further include a fifth reinforcement member 400d_5 that may connect the first reinforcement member 400d_1 to the second reinforcement member 400d_2, and may be disposed at the first surface 400a.

Figure 26:
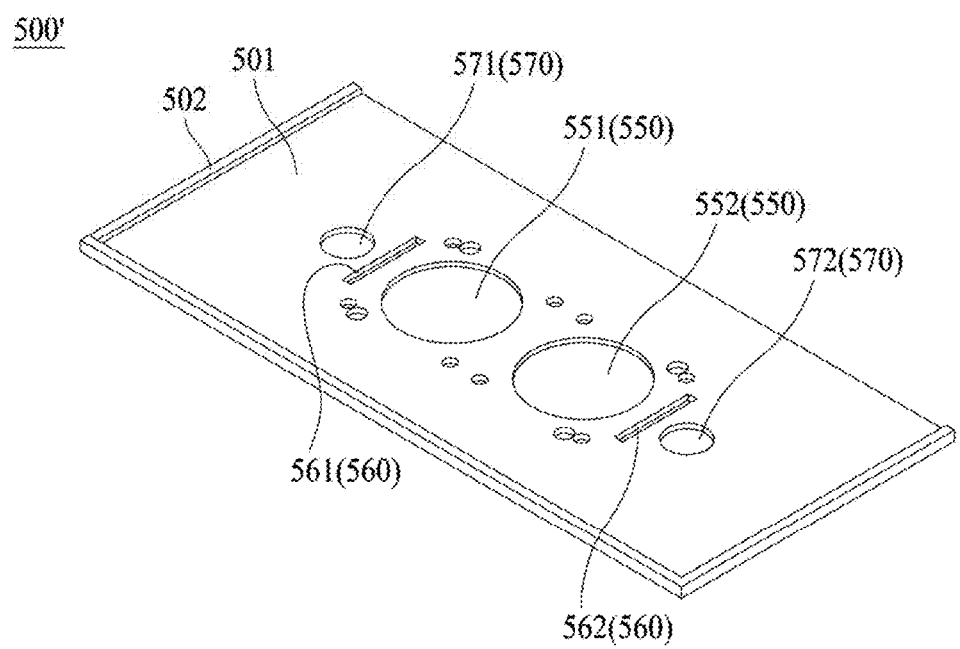
FIG. 26 is a front perspective view of the first supporting member illustrated in FIG. 19.

FIG. 26 is a front perspective view of the first supporting member illustrated in FIG. 19.

With reference to the examples of FIGS. 18 to 21 and 26, a first supporting member (or a supporting member) 500' according to another embodiment of the present disclosure may be disposed at a rear surface of a front member 100. For example, the first supporting member 500' may be disposed at a rear surface of a display panel 100. For example, the first supporting member 500' may be disposed at a rear surface of a supporting frame 400'. For example, the first supporting member 500' may support or accommodate (e.g., receive) a vibration apparatus 800. For example, the first supporting member 500' may surround side surfaces (e.g., lateral surfaces) of the display panel 200. For example, the first supporting member 500' may surround side surfaces (e.g., lateral surfaces) of the supporting frame 400'.

According to another embodiment of the present disclosure, the first supporting member 500' may be disposed at a rear surface of the front member 100 by an eighth connection member 503. For example, the eighth connection member 503 may include an adhesive resin, a double-sided tape having an adhesive layer, or a double-sided foam pad having an adhesive layer, but embodiments of the present disclosure are not limited thereto. For example, the adhesive resin and the adhesive layer of the eighth connection member 503 may include an acryl-based or urethane-based adhesive material, but embodiments of the present disclosure are not limited thereto.

The first supporting member 500' according to another embodiment of the present disclosure may not include a forming portion, unlike the first supporting member 500 according to another embodiment of the present disclosure. A display apparatus according to another embodiment of the present disclosure may include a supporting frame 400' that is disposed to support the vibration apparatus 800. Accordingly, the stiffness of the first supporting member 500', associated with supporting of the vibration apparatus 800, may be reinforced. Thus, although the first supporting member 500' does not include the forming portion, the vibration apparatus 800 may be stably supported. As described above, because the first supporting member 500' does not include the forming portion, a thickness of a display apparatus may decrease.

The first supporting member 500', according to another embodiment of the present disclosure, may include a bottom plate (e.g., a lower plate) 501 and a side portion 502, but embodiments of the present disclosure are not limited thereto. For example, the bottom plate 501 and the side portion 502 may be provided as one body or as a single body, but embodiments of the present disclosure are not limited thereto.

The bottom plate 501 of the first supporting member 500', according to another embodiment of the present disclosure, may be an element corresponding to a 1-1$^{th}$ plate 510 of the first supporting member 500, according to an embodiment of the present disclosure. Thus, its detailed description will be briefly given below or is omitted.

The bottom plate 501 of the first supporting member 500' may be disposed at the rear surface of the display panel 200, and may support the vibration apparatus 800. For example, the bottom plate 501 may configure a base of the first supporting member 500', and may have a plate shape. For example, the bottom plate 501 may have the same shape as the front member 100. For example, a periphery of the bottom plate 501 may be disposed along a periphery of the front member 100. For example, the supporting frame 400' may be disposed at the bottom plate 501 of the first supporting member 500'.

The side portion 502 of the first supporting member 500' may be disposed along the periphery of the bottom plate 501. For example, the side portion 502 may extend toward the front member 100 from the periphery of the bottom plate 501, and may be disposed at a rear surface of the front member 100. For example, the side portion 502 may be disposed along a rear periphery of the front member 100. For example, the side portion 502 may be disposed at the rear surface of the front member 100 by an eighth connection member 503. For example, the side portion 502 may surround a side surface (e.g., lateral surfaces) of the display panel 200. For example, the side portion 502 may surround a second surface 400b of the supporting frame 400'.

The first supporting member 500', according to another embodiment of the present disclosure, may include a side portion 502 where one side (e.g., one portion) thereof is opened, and may include a three-surface supporting structure that supports three peripheries of four peripheries (for example, upper, lower, left, and right peripheries) of the front member 100. For example, the side portion 502 may not be disposed at a first periphery portion (e.g., one periphery portion) of the bottom plate 501. Here, the first periphery portion of the bottom plate 501 may correspond to the first periphery portion of the display panel 200.

As described above, the side portion 502 of the first supporting member 500' may include an open region. Thus, a flexible circuit film 310 of a driving circuit 300 may extend to a rear surface of the first supporting member 500' through the open region, and a PCB 330 connected to the flexible circuit film 310 may be disposed at a first rear periphery of the first supporting member 500'.

In the display apparatus according to another embodiment of the present disclosure, a third supporting member (e.g., a substrate connection member) 700 may include a 3-1$^{th}$ supporting member 710 and a 3-2$^{th}$ supporting member 720. For example, the 3-1$^{th}$ supporting member 710 and the 3-2$^{th}$ supporting member 720 may be provided as one body or as a single body, but embodiments of the present disclosure are not limited thereto.

According to another embodiment of the present disclosure, the 3-1$^{th}$ supporting member 710 may be disposed between the bottom plate 501 of the first supporting member 500 and the PCB 330. For example, when the flexible circuit film 310 is disposed at a rear surface of the bottom plate 330, the 3-1$^{th}$ supporting member 710 may be disposed between the bottom plate 501 and the flexible circuit film 310 disposed at the rear surface of the bottom plate 501.

According to another embodiment of the present disclosure, the 3-2$^{th}$ supporting member 720 may extend toward the rear surface of the display panel 200 from the 3-1$^{th}$ supporting member 710. For example, the 3-2$^{th}$ supporting member 720 may extend along a side surface (e.g., an outer surface) exposed at the outside of the second surface 400b of the supporting frame 400'. For example, the 3-2$^{th}$ supporting member 720 may be disposed between the second surface 400b of the supporting frame 400' and the flexible circuit film 310, which extends along an outer surface of the second surface 400b through an open region of the side portion 502 of the first supporting member 500'.

In the display apparatus according to another embodiment of the present disclosure, the supporting frame 400' may be disposed between the first supporting member 500' and a rear surface of the vibration apparatus 800. Accordingly, a supporting device 1100 may be disposed between the supporting frame 400' and a rear surface of the vibration apparatus 800. For example, the supporting device 1100 may be disposed between the first surface 400a of the supporting frame 400' and the rear surface of the vibration apparatus 800.

A ninth connection member 1300, according to another embodiment of the present disclosure, may be disposed between the supporting frame 400' and the first supporting member 500'. For example, the ninth connection member 1300 may have a flat shape, but embodiments of the present disclosure are not limited thereto. The ninth connection member 1300 may include an accommodation hole 1310 into which the vibration apparatus may be inserted or accommodated. For example, the accommodation hole 1310 may have a size and a shape that enables a portion of a rear surface of the vibration apparatus 800 to be inserted or accommodated thereinto. For example, the accommodation hole 1310 may be formed to correspond to a supporting hole 400c of the supporting frame 400'.

The display apparatus according to another embodiment of the present disclosure may include a structure in which the first supporting member 500', the ninth connection member 1300, and the supporting frame 400' are sequentially stacked. A stacked structure of the first supporting member 500', the ninth connection member 1300, and the supporting frame 400' may reduce or prevent an undesired vibration from being transferred, and may implement a damping structure. For example, the transfer of an undesired vibration to the display apparatus may be reduced or prevented by changing the physical properties of the ninth connection member 1300. For example, the transfer of an undesired vibration to the display apparatus may be reduced or prevented by changing a thickness of the ninth connection member 1300. For example, the transfer of an undesired vibration to the display apparatus may be reduced or prevented by changing a contact area between the ninth connection member 1300 and the supporting frame 400'.

Figure 27:
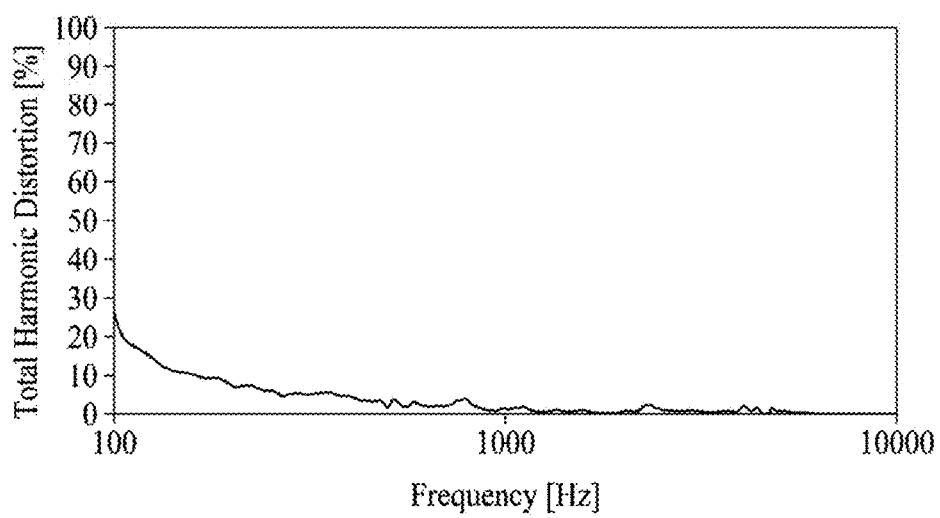
FIG. 27 is a graph showing a total harmonic distortion (THD) characteristic of a display apparatus according to an embodiment of the present disclosure

FIG. 27 is a graph showing a THD characteristic of a display apparatus according to an embodiment of the present disclosure.

In FIG. 27, the abscissa axis represents a frequency (Hz), and the ordinate axis represents a THD rate (%). With reference to the example of FIG. 27, a display apparatus according to another embodiment of the present disclosure may have a low THD rate of 25% or less in a reproduction pitched sound band of 100 Hz to 10 kHz. Accordingly, a sound pressure level characteristic of a low-pitched sound band may enhance a sound pressure level characteristic, and may not have a period where a THD rate increases rapidly. Thus, a good-quality sound may be output.

Figure 28:
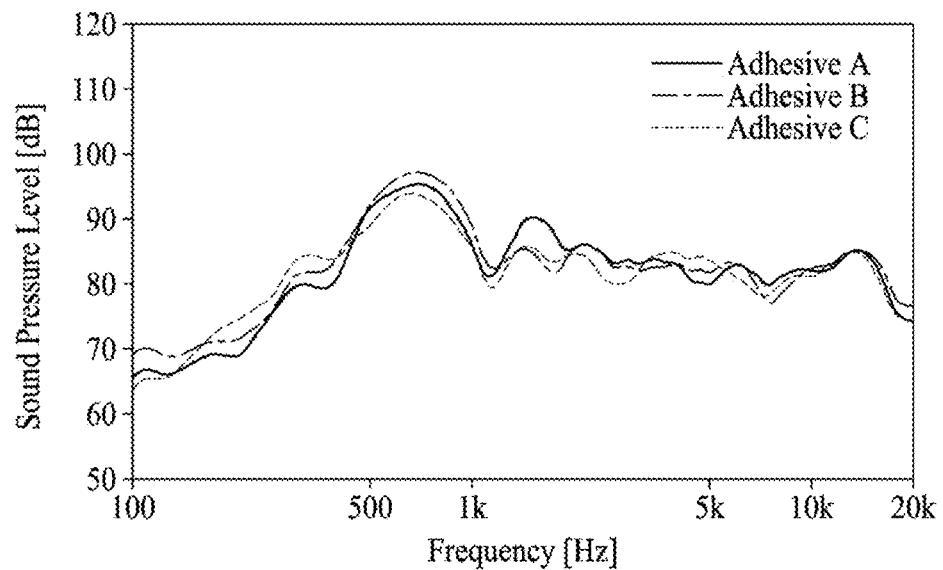
FIGS. 28 and 29 are graphs showing a sound pressure level characteristic of a display apparatus according to another embodiment of the present disclosure.
Figure 29:
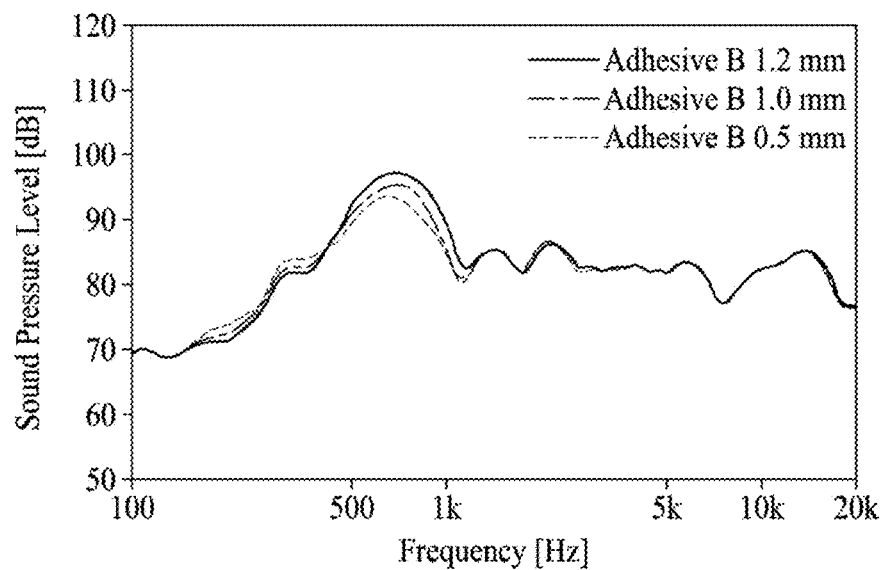

FIGS. 28 and 29 are graphs showing a sound pressure level characteristic of a display apparatus according to another embodiment of the present disclosure.

In the examples of FIGS. 28 and 29, the abscissa axis represents a frequency (Hz), and the ordinate axis represents a sound pressure level (dB). FIG. 28 is a graph showing a sound pressure level characteristic with respect to the physical properties of a ninth connection member 1300 of a display apparatus according to another embodiment of the present disclosure.

In FIG. 28, a solid line represents a result measured in a display apparatus including a ninth connection member 1300 having "A" physical properties, a one-dot-dashed line represents a result measured in a display apparatus including a ninth connection member 1300 having "B" physical properties, and a dotted line represents a result measured in a display apparatus including a ninth connection member 1300 having "C" physical properties. With reference to the example of FIG. 28, it may be seen that sound pressure level characteristics, measured in display apparatuses respectively including ninth connection members 1300 having different physical properties, differ.

FIG. 29 is a graph showing a sound pressure level characteristic with respect to a thickness of a ninth connection member 1300 of a display apparatus according to another embodiment of the present disclosure. In FIG. 29, a solid line represents a result measured in a display apparatus including a ninth connection member 1300 having "B" physical properties and a thickness of 1.2 mm, a one-dot-dashed line represents a result measured in a display apparatus including a ninth connection member 1300 having "B" physical properties and a thickness of 1.0 mm, and a dotted line represents a result measured in a display apparatus including a ninth connection member 1300 having "B" physical properties and a thickness of 0.5 mm. With reference to the example of FIG. 29, it may be seen that sound pressure level characteristics, measured in display apparatuses respectively including ninth connection members 1300 having the same physical properties and different thicknesses, differ.

With reference to the examples of FIGS. 28 and 29, it may be seen that the display apparatus according to another embodiment of the present disclosure outputs sounds having different sound pressure level characteristics based on the physical properties and thickness of the ninth connection member 1300. Accordingly, a damping effect may be adjusted by changing the physical properties and thickness of the ninth connection member 1300.

Figure 30:
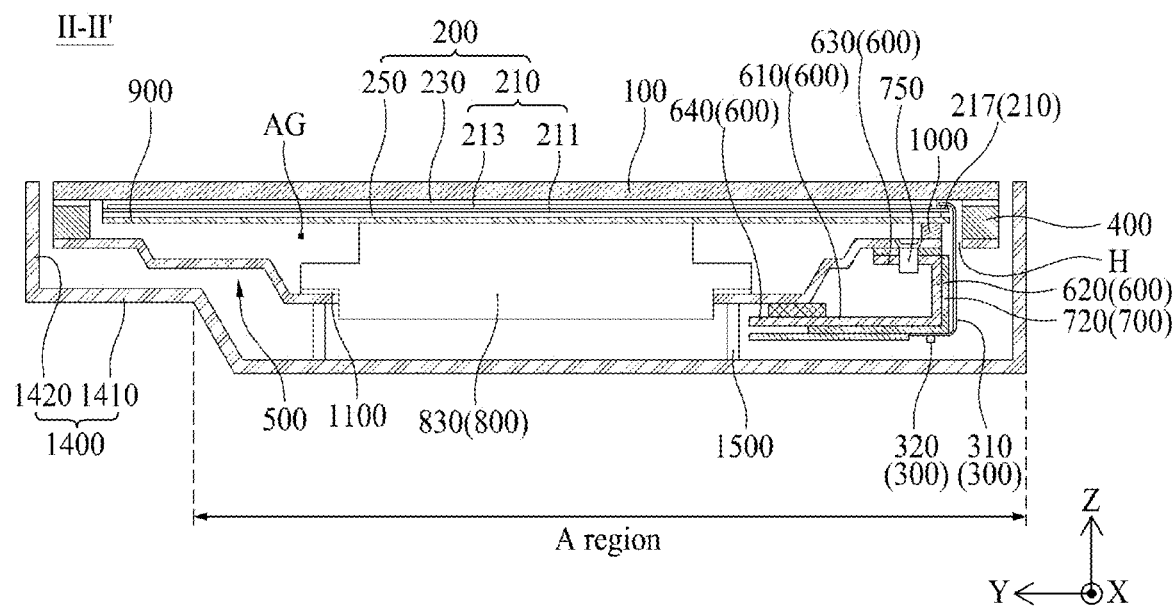
FIG. 30 is a cross-sectional view taken along line II-II' illustrated in FIG. 2 in a display apparatus according to another embodiment of the present disclosure.

FIG. 30 is a cross-sectional view taken along line II-II' illustrated in FIG. 2 in a display apparatus according to another embodiment of the present disclosure.

The display apparatus according to another embodiment of the present disclosure may be implemented by adding a rear cover 1400 to a display apparatus according to an embodiment of the present disclosure. Hereinafter, therefore, repetitive descriptions of the same elements other than a rear cover 1400, and elements relevant thereto will be briefly given or are omitted.

With reference to the example of FIG. 30, the display apparatus according to another embodiment of the present disclosure may further include a rear cover 1400. The rear cover 1400 may accommodate or receive a display panel 200 with a first vibration apparatus 800 disposed therein, a driving circuit 300, and a first supporting member 500. For example, the rear cover 1400 may protect the first vibration apparatus 800, exposed at a rear surface of the first supporting member 500, and the driving circuit 300 disposed at the rear surface of the first supporting member 500. For example, the rear cover 1400 may include a first cover 1410 and a second cover 1420, but embodiments of the present disclosure are not limited thereto. For example, the first cover 1410 and the second cover 1420 may be provided as one body or as a single body, but embodiments of the present disclosure are not limited thereto.

The first cover 1410 of the rear cover 1400 may be an outermost rear element disposed at a rear surface of the display apparatus. For example, the first cover 1410 may support the first supporting member 500, and may be disposed at the rear surface of the first supporting member 500.

According to another embodiment of the present disclosure, the first cover 1410 may cover the rear surface of the first supporting member 500. For example, the first cover 1410 may cover all of the rear surface of the first supporting member 500. For example, the first cover 1410 may cover the first vibration apparatus 800 exposed at the rear surface of the first supporting member 500. For example, the first cover 1410 may cover a rear surface of the first vibration apparatus 800 exposed at the rear surface of the first supporting member 500. For example, the first cover 1410 may cover a side surface of the first vibration apparatus 800 exposed at the rear surface of the first supporting member 500.

According to another embodiment of the present disclosure, the first cover 1410 may cover the exposed driving circuit 300. For example, the first cover 1410 may cover a PCB 330 disposed at the rear surface of the first supporting member 500. For example, the first cover 1410 may cover a flexible circuit film 310 disposed at the rear surface of the first supporting member 500.

The second cover 1420 of the rear cover 1400 may be an outermost side element disposed at a side surface of the display apparatus, and may be disposed at a periphery of the first cover 1410. For example, the second cover 1420 may be disposed along a whole periphery of the first cover 1410.

According to another embodiment of the present disclosure, the second cover 1420 may cover a side surface of the first vibration apparatus 800 exposed at the rear surface of the first supporting member 500. For example, the second cover 1420 may cover the side surface of the first supporting member 500. For example, the second cover 1420 may cover a side surface of a supporting frame 400. For example, the second cover 1420 may cover a side surface of a front member 100.

In FIG. 30, the second cover 1420 is illustrated as a structure that covers the side surface of the front member 100, but embodiments of the present disclosure are not limited thereto. For example, the second cover 1420 may be disposed at a rear surface of the front member 100, and may be adjacent to the supporting frame 400. The second cover 1420 may be disposed at the rear surface of the front member 100 by an adhesive member, including an adhesive resin, a double-sided tape having an adhesive layer, or a double-sided foam pad having an adhesive layer, but embodiments are not limited thereto.

The display apparatus according to another embodiment of the present disclosure may further include a supporting structure 1500 disposed between the rear cover 1400 and the first supporting member 500. According to another embodiment of the present disclosure, the supporting structure 1500 may be disposed between the rear surface of the first supporting member 500 and a front surface of the rear cover 1400, and the first supporting member 500 may be supported by the rear cover 1400 by the supporting structure 1500. For example, the supporting structure 1500 may maintain an interval between the first supporting member 500 and the rear cover 1400, and may allow a portion, exposed at the rear surface of the first supporting member 500, of the first vibration apparatus 800 to not contact the rear cover 1400, thereby reducing or preventing the rear cover 1400 from being shaken by a vibration of the first vibration apparatus 800.

According to another embodiment of the present disclosure, the supporting structure 1500 may cover a side surface, exposed at the rear surface of the first supporting member 500, of the first vibration apparatus 800. For example, the supporting structure 1500 may cover a portion of the side surface, exposed at the rear surface of the first supporting member 500, of the first vibration apparatus 800. For example, the supporting structure 1500 may cover all of the side surface, exposed at the rear surface of the first supporting member 500, of the first vibration apparatus 800.

According to another embodiment of the present disclosure, the supporting structure 1500 may include an adhesive resin, a double-sided tape having an adhesive layer, or a double-sided foam pad having an adhesive layer, but embodiments of the present disclosure are not limited thereto. According to another embodiment of the present disclosure, the adhesive resin and the adhesive layer of the supporting structure 1500 may include an acryl-based or urethane-based adhesive material, but embodiments of the present disclosure are not limited thereto. For example, the adhesive resin and the adhesive layer of the supporting structure 1500 may include a urethane-based adhesive material that has a relatively ductile characteristic, rather than an acrylic-based adhesive material having a characteristic that is relatively high in hardness, for reducing, preventing, or minimizing the transfer of a vibration of the first vibration apparatus 800 to the rear cover 1400, but embodiments of the present disclosure are not limited thereto.

Figure 31:
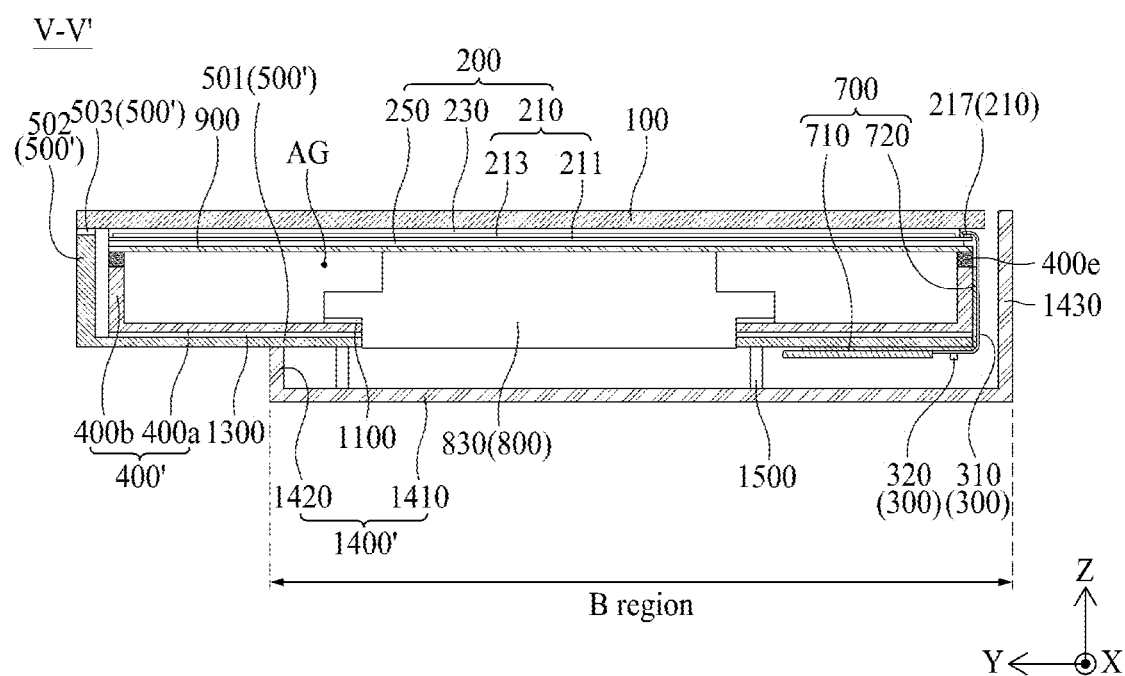
FIG. 31 is a cross-sectional view taken along line V-V' illustrated in FIG. 18 in a display apparatus according to another embodiment of the present disclosure.

FIG. 31 is a cross-sectional view taken along line V-V' illustrated in FIG. 18 in a display apparatus according to another embodiment of the present disclosure.

With reference to the example of FIG. 31, the display apparatus according to another embodiment of the present disclosure may be implemented by adding a rear cover 1400' to a display apparatus according to another embodiment of the present disclosure. Hereinafter, therefore, repetitive descriptions of the same elements, other than a rear cover 1400' and elements relevant thereto, will be briefly given or are omitted.

The display apparatus according to another embodiment of the present disclosure may further include a rear cover 1400'. The rear cover 1400' may be disposed at a rear surface of a first supporting member 500', and may cover the rear surface of the first supporting member 500'. According to an embodiment of the present disclosure, the rear cover 1400' may cover a whole region or a partial region of the first supporting member 500'. For example, the rear cover 1400' may cover a portion, exposed at the outside, of the first supporting member 500' of the first vibration apparatus 800. For example, the rear cover 1400' may cover an exposed driving circuit 300. For example, the rear cover 1400' may cover a PCB 330 disposed at the rear surface of the first supporting member 500'. For example, the rear cover 1400' may cover a flexible circuit film 310 exposed through an open region of the first supporting member 500'.

According to another embodiment of the present disclosure, the rear cover 1400' may include a first cover 1410, a second cover 1420, and a third cover 1430, but embodiments of the present disclosure are not limited thereto. For example, the first cover 1410, the second cover 1420, and the third cover 1430 may be provided as one body or as a single body, but embodiments of the present disclosure are not limited thereto.

The first cover 1410 of the rear cover 1400' may be disposed at a rear surface of the first supporting member 500'. For example, the first cover 1410 may have a plate shape, but embodiments of the present disclosure are not limited thereto. For example, the first cover 1410 may cover the first vibration apparatus 800 exposed at the rear surface of the first supporting member 500'. For example, the first cover 1410 may cover a rear surface of the first vibration apparatus 800 exposed at the rear surface of the first supporting member 500'.

According to another embodiment of the present disclosure, the first cover 1410 may cover the exposed driving circuit 300. For example, the first cover 1410 may cover the PCB 330 disposed at the rear surface of the first supporting member 500'. For example, the first cover 1410 may cover the flexible circuit film 310 disposed at the rear surface of the first supporting member 500'.

The second cover 1420 of the rear cover 1400' may be disposed at a periphery of the first cover 1410. For example, the second cover 1420 may be disposed at one periphery of the first cover 1410, and may cover an open region of the first supporting member 500'.

According to another embodiment of the present disclosure, the second cover 1420 may cover a side surface of a supporting frame and a side surface, exposed through the open region of the first supporting member 500', of a display panel 200. For example, the second cover 1420 may cover the flexible circuit film 310 disposed along the open region of the first supporting member 500'. For example, the second cover 1420 may cover a side surface, exposed through the rear surface of the first supporting member 500', of the first vibration apparatus 800. For example, the second cover 1420 may cover a side surface of a front member 100.

The third cover 1430 of the rear cover 1400' may be disposed at one periphery of the first cover 1410. For example, the third cover 1430 may be disposed at the other periphery, which may be opposite to one periphery, of the first cover 1410. For example, the third cover 1430 may be disposed at the rear surface of the first supporting member 500'.

According to another embodiment of the present disclosure, the third cover 1430 may cover a side surface, exposed at the rear surface of the first supporting member 500', of the first vibration apparatus 800. For example, the third cover 1430 may be disposed at the rear surface of the first supporting member 500' by an adhesive member. For example, the adhesive member may include an adhesive resin, a double-sided tape having an adhesive layer, or a double-sided foam pad having an adhesive layer, but embodiments of the present disclosure are not limited thereto. For example, the adhesive resin and the adhesive layer of the adhesive member may include an acryl-based or urethane-based adhesive material, but embodiments of the present disclosure are not limited thereto.

In FIG. 31, the second cover 1420 is illustrated as a structure that covers a side surface of the front member 100, but embodiments of the present disclosure are not limited thereto. For example, the second cover 1420 may be disposed at the rear surface of the front member 100. In this case, the second cover 1420 may be disposed at the rear surface of the front member 100 by an adhesive member including an adhesive resin, a double-sided tape having an adhesive layer, or a double-sided foam pad having an adhesive layer, but embodiments are not limited thereto.

In FIG. 31, the third cover 1430 is illustrated as a structure that is disposed at the rear surface of the first supporting member 500', but embodiments of the present disclosure are not limited thereto. For example, the third cover 1430 may cover a side surface of the front member 100, such as a left region of the second cover 1420 illustrated in FIG. 30. For example, the third cover 1430 may be disposed at the rear surface of the front member 100 to be adjacent to a side portion 502 of the first supporting member 500'. In this case, the third cover 1430 may be disposed at the rear surface of the front member 100 by an adhesive member including an adhesive resin, a double-sided tape having an adhesive layer, or a double-sided foam pad having an adhesive layer, but embodiments are not limited thereto.

The display apparatus according to another embodiment of the present disclosure may further include a supporting structure 1500 that may be disposed between the rear cover 1400' and the first supporting member 500'. According to another embodiment of the present disclosure, the supporting structure 1500 may be disposed between the rear surface of the first supporting member 500' and a front surface of the rear cover 1400', and the first supporting member 500' may be supported by the rear cover 1400' by the supporting structure 1500. For example, the supporting structure 1500 may maintain an interval between the first supporting member 500' and the rear cover 1400', and may allow a portion, exposed at the rear surface of the first supporting member 500', of the first vibration apparatus 800 to not contact the rear cover 1400', thereby reducing or preventing the rear cover 1400' from being shaken by a vibration of the first vibration apparatus 800.

According to another embodiment of the present disclosure, the supporting structure 1500 may cover a side surface, exposed at the rear surface of the first supporting member 500', of the first vibration apparatus 800. For example, the supporting structure 1500 may cover a portion of the side surface, exposed at the rear surface of the first supporting member 500', of the first vibration apparatus 800. For example, the supporting structure 1500 may cover all of the side surface, exposed at the rear surface of the first supporting member 500', of the first vibration apparatus 800.

According to another embodiment of the present disclosure, the supporting structure 1500 may include an adhesive resin, a double-sided tape having an adhesive layer, or a double-sided foam pad having an adhesive layer, but embodiments of the present disclosure are not limited thereto. According to another embodiment of the present disclosure, the adhesive resin and the adhesive layer of the supporting structure 1500 may include an acryl-based or urethane-based adhesive material, but embodiments of the present disclosure are not limited thereto. For example, the adhesive resin and the adhesive layer of the supporting structure 1500 may include a urethane-based adhesive material that has a relatively ductile characteristic, rather than an acrylic-based adhesive material having a characteristic that is relatively high in hardness, for reducing, preventing, or minimizing the transfer of a vibration of the first vibration apparatus 800 to the rear cover 1400, but embodiments of the present disclosure are not limited thereto.

The display apparatus according to an embodiment of the present disclosure described above with reference to the examples of FIGS. 1 to 31 may be installed in a vehicle. For example, the display apparatus according to an embodiment of the present disclosure may be installed in a vehicle structure. For example, the vehicle structure may include a dashboard, a dashboard device, a seat sheet, a door, or the like. According to another embodiment of the present disclosure, when the display apparatus according to an embodiment of the present disclosure, e.g., as described above with reference to the examples of FIGS. 1 to 29, is equipped in a vehicle, all of the display apparatus may be inserted (e.g., accommodated) into a vehicle structure.

According to another embodiment of the present disclosure, when the display apparatus according to an embodiment of the present disclosure, e.g., as described above with reference to the example of FIG. 30, is equipped at a vehicle, all of the display apparatus may be inserted (e.g., accommodated) into a vehicle structure, or an "A" region of the rear cover 1400 of FIG. 30 may be inserted (e.g., accommodated) into the vehicle structure. According to another embodiment of the present disclosure, when the display apparatus according to an embodiment of the present disclosure, e.g., as described above with reference to the example of FIG. 31, is equipped at a vehicle, all of the display apparatus may be inserted (e.g., accommodated) into a vehicle structure, or a "B" region of the rear cover 1400' of FIG. 31 may be inserted (e.g., accommodated) into the vehicle structure.

Figure 32:
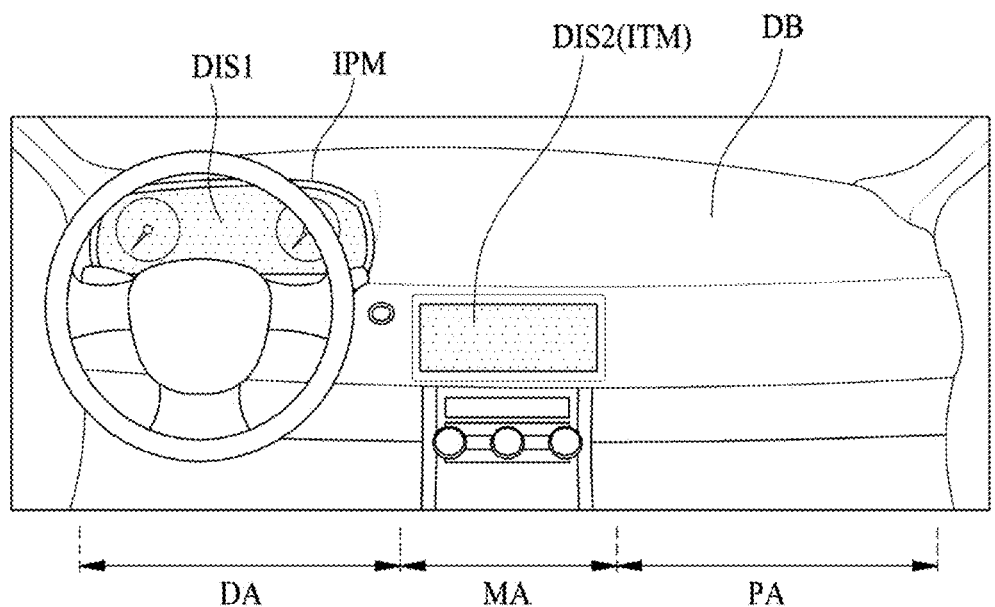
FIG. 32 illustrates a vehicle according to an embodiment of the present disclosure.

FIG. 32 illustrates a vehicle according to an embodiment of the present disclosure.

The vehicle of FIG. 32 may include one or more display apparatuses according to an embodiment of the present disclosure described above with reference to any one or more of the examples of FIGS. 1 to 31. With reference to the example of FIG. 32, the vehicle according to an embodiment of the present disclosure may include a dashboard DB, an instrument panel device IPM (as an example of a dashboard device), and an infotainment device ITM.

The dashboard DB may include a first region DA facing a driver seat, a second region PA facing a passenger seat, and a third region MA between the first region DA and the second region PA. The instrument panel device IPM may include a first display DIS1, which may be disposed at the first region DA of the dashboard DB. The first display DIS1 may provide a driver with various information, such as vehicle state information, and driving-related information, such as the driving time, velocity, fuel amount, and revolutions per minute (RPM) of the vehicle.

The first display DIS1 may include the display apparatus illustrated in any one or more of the examples of FIGS. 1 to 31, and thus, its repetitive description is omitted. Therefore, the first display DIS1 may display an image, corresponding to vehicle driving information provided from a vehicle host system, on a display panel. Also, the first display DIS1 may output, to the driver seat, sound generated by a vibration of the display panel responding to a vibration of a vibration apparatus, based on a sound driving signal provided from the vehicle host system.

The infotainment device ITM (or an infotainment system) may include a second display DIS2, which may be disposed at the third region MA of the dashboard DB. The second display DIS2 may be connected to a navigation system and a vehicle convenience system, such as an audio system, an air conditioning system, and a multimedia system, each equipped in the vehicle, and may display navigation information provided from the navigation system and a control icon for controlling a corresponding vehicle convenience system. Also, the second display DIS2 may provide a driver or a passenger with sound corresponding to a sound signal provided from the audio system and/or the multimedia system.

The second display DIS2 may include the display apparatus illustrated in any one or more of the examples of FIGS. 1 to 31, and thus, its repetitive description is omitted. Therefore, the second display DIS2 may display navigation information, provided from the navigation system, and a control icon for controlling a corresponding vehicle convenience system, on a display panel. Also, the second display DIS2 may directly output sound generated from the display panel, which may vibrate by a vibration of the vibration apparatus, based on a sound signal provided from the audio system and/or the multimedia system. Also, the second display DIS2 may sense a user touch, e.g., through a touch electrode layer disposed at the display panel, to perform an interface with a user. The second display DIS2 may have a length that is enlarged toward the second region PA of the dashboard DB. For example, the second display DIS2 may be disposed at the third region MA and the second region PA of the dashboard DB.

Therefore, the vehicle according to an embodiment of the present disclosure may include the instrument panel device IPM, including the first display DIS1 to which the display apparatus according to an embodiment of the present disclosure illustrated in any one or more of the examples of FIGS. 1 to 31 may be applied. Thus, the instrument panel device IPM may output sound, generated by a vibration of the first display DIS1, to a face of a driver to directly transfer the sound to ears of the driver, thereby transferring sound substantially similar to an original sound to the driver.

Moreover, the vehicle according to an embodiment of the present disclosure may include the infotainment device ITM, including the second display DIS2 to which the display apparatus according to an embodiment of the present disclosure illustrated in any one or more of the examples of FIGS. 1 to 31 may be applied. Thus, the infotainment device ITM may output sound, generated by a vibration of the second display DIS2, to ears of the driver and/or a passenger, thereby transferring sound substantially similar to an original sound to the driver and/or the passenger.

Moreover, the vehicle according to an embodiment of the present disclosure may use each of the first display DIS1 of the instrument panel device IPM, and the second display DIS2 of the infotainment device ITM, as a speaker for outputting sound, and may transfer sound to the driver and/or the passenger, using sound generated by a vibration of each of the first and second displays DIS1 and DIS2. The sound may include a two-channel sound.

Figure 33:
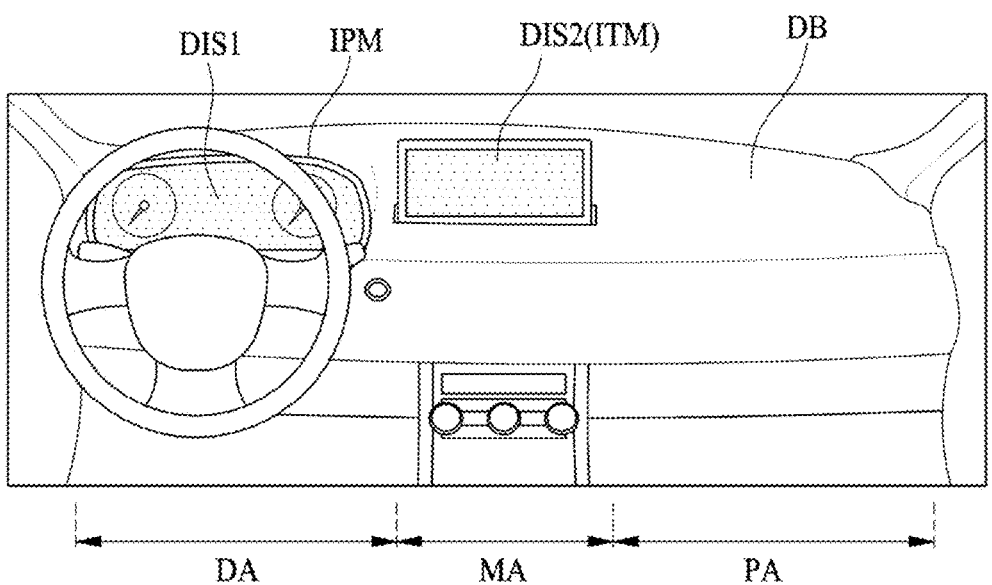
FIG. 33 illustrates a vehicle according to another embodiment of the present disclosure.

FIG. 33 illustrates a vehicle according to another embodiment of the present disclosure.

FIG. 33 illustrates an example in which a structure of the infotainment device illustrated in FIG. 32 is modified. Hereinafter, repetitive descriptions of the same elements, except an infotainment device and relevant elements, will be briefly given or are omitted.

With reference to the example of FIG. 33, an infotainment device ITM according to another embodiment of the present disclosure may be installed to be raised or lowered in a third region MA of a dashboard DB. The infotainment device ITM may be accommodated (e.g., received) into the dashboard DB, based on the power-off of a vehicle or manipulation of a passenger, and may be protruded from the inside of the dashboard DB, based on the power-on of the vehicle or manipulation of the passenger.

The infotainment device ITM according to another embodiment of the present disclosure may include a second display DIS2 and a display elevation part. The second display DIS2 is substantially the same as the second display DIS2 illustrated in FIG. 32, and thus, its repetitive description is omitted.

The display elevation pat (e.g., display lifting part) may be disposed inside the third region MA of the dashboard DB, and may support the second display DIS2 to be raised or lowered. For example, the display elevation part may raise the second display DIS2 to protrude the second display DIS2 from the inside of the dashboard DB, based on the power-on of the vehicle or manipulation of the passenger. Also, the display elevation part may lower the second display DIS2 to accommodate or receive the second display DIS2 into the dashboard DB, based on the power-off of the vehicle or manipulation of the passenger. Therefore, the vehicle according to another embodiment of the present disclosure may have the same effect as the vehicle illustrated in FIG. 32.

Figure 34:
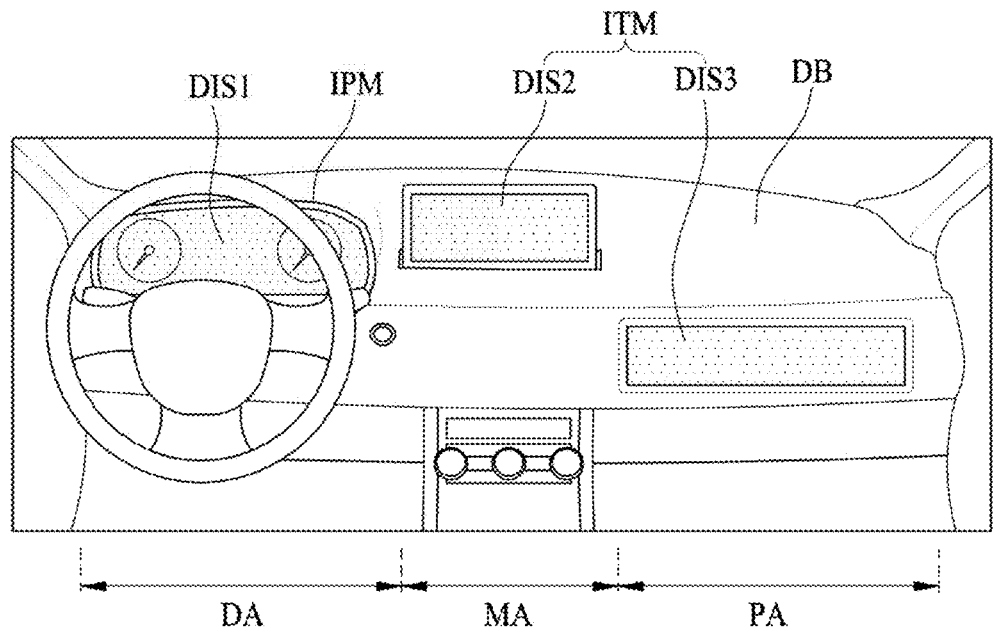
FIG. 34 illustrates a vehicle according to another embodiment of the present disclosure.

FIG. 34 illustrates a vehicle according to another embodiment of the present disclosure.

FIG. 34 illustrates an example in which a structure of the infotainment device illustrated in FIG. 33 is modified. Hereinafter, descriptions of the same elements, except an infotainment device and relevant elements, will be briefly given or are omitted.

With reference to the example of FIG. 34, an infotainment device ITM, according to an embodiment of the present disclosure, may include a second display DIS2 that may be installed to be raised or lowered in a third region MA of a dashboard DB, a display elevation part that may raise or lower the second display DIS2, and a third display DIS3 that may be installed in a second region PA of the dashboard DB. The second display DIS2 and the display elevation part are substantially the same as the second display and the display elevation part each illustrated in FIG. 33, and thus, their repetitive descriptions are omitted.

The third display DIS3 may share a function of the second display DIS2. According to another embodiment of the present disclosure, the third display DIS3 may be connected to a navigation system and a vehicle convenience system, such as an audio system, an air conditioning system, and a multimedia system each equipped inside the vehicle, and may display navigation information, provided from the navigation system, and a control icon for controlling a corresponding vehicle convenience system. Also, the third display DIS3 may provide a passenger with sound corresponding to a sound signal provided from the audio system and/or the multimedia system. Also, the third display DIS3 may transmit or receive image information or sound information, e.g., through wireless communication with a wireless communication device, for example, of a passenger sitting on a passenger seat, and may display the received image information on a display panel.

The third display DIS3 may include the display apparatus according to an embodiment of the present disclosure illustrated in any one or more of the examples of FIGS. 1 to 31, and thus, its repetitive description is omitted. The third display DIS3 may have a length that is enlarged toward the third region MA of the dashboard DB. For example, the third display DIS3 may be disposed at the second region PA and the third region MA of the dashboard DB.

A first display DIS1 of the instrument panel device IPM, and the second and third displays DIS2 and DIS3 of the infotainment device ITM, may each be used as a speaker for outputting sound inside the vehicle. Therefore, the vehicle according to another embodiment of the present disclosure may have the same effect as the vehicle illustrated in the examples of FIG. 32 or FIG. 33. Also, the vehicle according to an embodiment of the present disclosure may use each of the first display DIS1 of the instrument panel device IPM, and the second and third displays DIS2 and DIS3 of the infotainment device ITM, as a speaker for outputting sound. The vehicle according to an embodiment of the present disclosure may transfer sound including a three-channel sound to a driver and/or a passenger using sound generated by a vibration of each of the first to third displays DIS1, DIS2, and DIS3.

Figure 35:
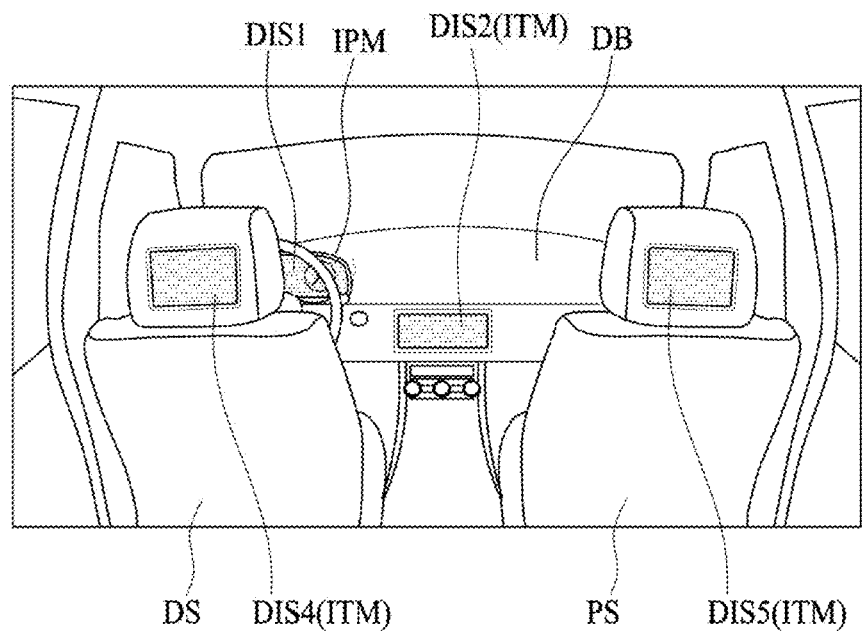
FIG. 35 illustrates a vehicle according to another embodiment of the present disclosure.

FIG. 35 illustrates a vehicle according to another embodiment of the present disclosure.

FIG. 35 illustrates an example in which a structure of the infotainment device illustrated in FIG. 32 is modified. Hereinafter, repetitive descriptions of the same elements, except an infotainment device and relevant elements, will be briefly given or are omitted.

With reference to the example of FIG. 35, an infotainment device ITM, according to another embodiment of the present disclosure, may further include a fourth display DIS4, disposed at a rear surface of a driver seat (e.g., a driver seat sheet) DS, and a fifth display DIS5, disposed at a rear surface of a passenger seat (e.g., a passenger seat sheet) PS. The fourth display DIS4 may be disposed in or buried into a headrest of the driver seat DS, and the fifth display DIS5 may be disposed in or buried into a headrest of the passenger seat PS. Each of the fourth and fifth displays DIS4 and DIS5 may include the display apparatus according to an embodiment of the present disclosure illustrated in any one or more of the examples of FIGS. 1 to 31, and thus, their repetitive descriptions are omitted.

Each of the fourth and fifth displays DIS4 and DIS5 may share a function of the second display DIS2. Also, each of the fourth and fifth displays DIS4 and DIS5 may transmit or receive image information or sound information, e.g., through wireless communication with a wireless communication device, for example, of a passenger sitting in a back seat, and may display the received image information on a display panel.

A first display DIS1 of the instrument panel device IPM, and the second, fourth, and fifth displays DIS2, DIS4, and DIS5 of the infotainment device ITM, may each be used as a speaker for outputting sound inside the vehicle. Therefore, the vehicle according to another embodiment of the present disclosure may have the same effect as the vehicle illustrated in FIG. 32. Also, the vehicle according to an embodiment of the present disclosure may use each of the first display DIS1 of the instrument panel device IPM, and the second, fourth, and fifth displays DIS2, DIS4, and DIS5 of the infotainment device ITM, as a speaker for outputting sound. The vehicle according to an embodiment of the present disclosure may transfer sound including a four-channel sound to a driver and/or a passenger using sound generated by a vibration of each of the first, second, fourth, and fifth displays DIS1, DIS2, DIS4, and DIS5.

Additionally, in the vehicle according to another embodiment of the present disclosure, as illustrated in the example of FIG. 33, the second display DIS2 of the infotainment device ITM may be installed in a third region MA of a dashboard DB to be raised or lowered. Also, the infotainment device ITM may further include the third display DIS3 illustrated in the example of FIG. 34. In this case, the vehicle according to an embodiment of the present disclosure may use at least one or more of the first display DIS1 of the instrument panel device IPM, and the second to fifth displays DIS2 to DIS5 of the infotainment device ITM, as a speaker for outputting sound, and may transfer sound, generated by a vibration of a display panel included in at least one or more of the first to fifth displays DIS1 to DIS5, to a driver and/or a passenger.

The display apparatus according to an embodiment of the present disclosure described with reference to the examples of FIGS. 1 to 31 described above may output sound (DVS), or may generate a haptic feedback (e.g., a haptic vibration) responding to the user touch. The display apparatus according to an embodiment of the present disclosure may simultaneously generate sound (DVS) and a haptic feedback. The display apparatus according to an embodiment of the present disclosure described above may include two coil-type vibration device 810 and 830, and two film-type vibration devices 1210 and 1230, and the number of vibration devices included in the display apparatus is not limited thereto.

Figure 36:
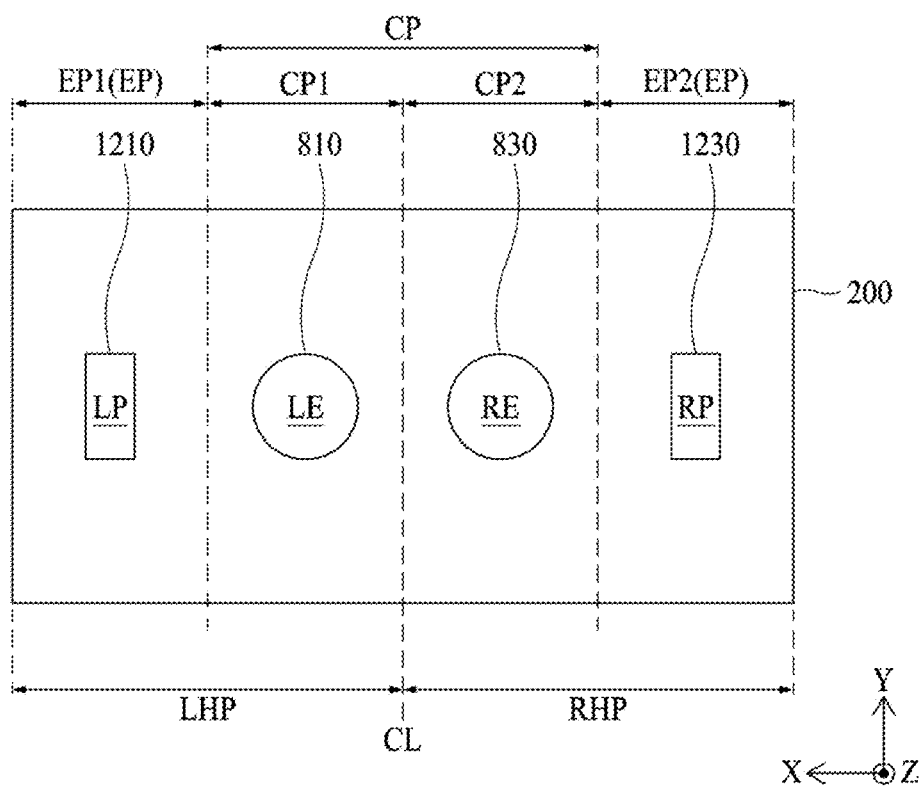
FIG. 36 illustrates an arrangement of vibration devices in a display apparatus according to an embodiment of the present disclosure.

FIG. 36 illustrates an arrangement of vibration devices in a display apparatus according to an embodiment of the present disclosure.

With reference to the example of FIG. 36, in the display apparatus according to an embodiment of the present disclosure, a first vibration apparatus 800 may include a first vibration device 810 and a second vibration device 830, and a second vibration apparatus 1200 may include a third vibration device 1210 and a fourth vibration device 1230. According to an embodiment of the present disclosure, each of the first vibration device 810 and the second vibration device 830 may be a coil-type vibration device, and each of the third vibration device 1210 and the fourth vibration device 1230 may be a film-type vibration device.

According to an embodiment of the present disclosure, the display apparatus may include 2*m (where m is a natural number) number of coil-type vibration devices and 2*n (where n is a natural number) number of film-type vibration devices. For example, when m is the same as n, the number of coil-type vibration devices may be the same as the number of film-type vibration devices. For example, when m differs from n, the number of coil-type vibration devices may differ from the number of film-type vibration devices. In this case, the 2*m coil-type vibration devices and the 2*n film-type vibration devices may be disposed to be symmetrical with respect to a center line CL of a display panel 200.

According to an embodiment of the present disclosure, with respect to a first direction X (e.g., a widthwise direction) of the display panel 200, the display panel 200 may include a left region LHP and a right region RHP with respect to the center line CL. The display panel 200 may include a center portion CP and a periphery portion EP. For example, the display panel 200 may be divided into the center portion CP and two periphery portion EP1 and EP2, which may be parallel to each other with the center portion CP therebetween.

The center portion CP of the display panel 200 may be divided into a first center portion C1 and a second center portion C2. For example, the first center portion C1 may be a left portion (e.g., a left center portion) of the center portion CP, and the second center portion C2 may be a right portion (e.g., a right center portion) of the center portion CP. With respect to the first direction X (e.g., the widthwise direction) of the display panel 200, the first center portion C1 and the second center portion C2 may be left-to-right symmetrical with respect to the center line CL of the display panel 200.

The periphery portion EP of the display panel 200 may be divided into a first periphery portion EP1 and a second periphery portion EP2. For example, the first periphery portion EP1 may be a left portion (e.g., a left periphery portion) of the periphery portion EP, and the second periphery portion EP2 may be a right portion (e.g., a right periphery portion) of the periphery portion EP. With respect to the first direction X (e.g., the widthwise direction) of the display panel 200, the first periphery portion EP1 and the second periphery portion EP2 may be left-to-right symmetrical with respect to the center line CL of the display panel 200.

According to an embodiment of the present disclosure, m first vibration devices (e.g., a first m number of the vibration devices or a first m vibration devices) 810 (or LE) of the 2*m coil-type vibration devices may be disposed at a first center portion CP11 of the display panel 200, and the other m second vibration devices (e.g., a second m number of the vibration devices or a second m vibration devices) 830 (or RE) of the 2*m coil-type vibration devices may be disposed at a second center portion CP2 of the display panel 200. For example, n third vibration devices (e.g., a first n number of the vibration devices or a first n vibration devices) 1210 (or LP) of the 2*n film-type vibration devices may be disposed at the first periphery portion EP1 of the display panel 200, and the other n fourth vibration devices (e.g., a second n number of the vibration devices or a second n vibration devices) 1230 (or RP) of the 2*n film-type vibration devices may be disposed at the second periphery portion EP2 of the display panel 200. The 2*m coil-type vibration devices 810 and 830 the 2*n film-type vibration devices 1210 and 1230 may vibrate based on a driving signal from a driving circuit 300 to vibrate the display panel 200, and thus, may generate sound or may generate a haptic feedback (e.g., a haptic vibration).

According to an embodiment of the present disclosure, the driving circuit 300 may transfer the driving signal, supplied from a display host system, to the vibration devices 810, 830, 1210, and 1230. For example, when the driving circuit 300 includes a vibration driving circuit 380, the vibration driving circuit 380 may control the vibration devices 810, 830, 1210, and 1230, in response to the driving signal from the display host system.

Hereinafter, an example in which the vibration driving circuit 380 controls the vibration devices 810, 830, 1210, and 1230 will be described, but embodiments of the present disclosure are not limited thereto. For example, the vibration devices (e.g., first to fourth vibration devices) 810, 830, 1210, and 1230 may be controlled by a display host system. For example, the vibration driving circuit 380 may be another circuit (e.g., module) implemented to control the vibration devices 810, 830, 1210, and 1230 based on the driving signal provided from the display host system.

The vibration driving circuit 380 may drive the first to fourth vibration devices 810, 830, 1210, and 1230 based on the driving signal provided from the display host system to vibrate the display panel 200, and thus, may generate one or more of the sound and the haptic feedback, or may simultaneously generate the sound and the haptic feedback. For example, the vibration driving circuit 380 may be implemented to increase or maximize driving efficiency of the vibration devices by driving to reduce or minimize mutual interference between the sound and the haptic feedback.

According to an embodiment of the present disclosure, the vibration driving circuit 380 may analyze a frequency of the driving signal from the display host system, and then, may independently drive the first vibration apparatus 800 and the second vibration apparatus 1200 for each frequency band. For example, the vibration driving circuit 380 may independently drive the first vibration apparatus 800 and the second vibration apparatus 1200, based on a frequency band of the driving signal, touch event occurrence information, and touch coordinate information.

According to an embodiment of the present disclosure, the vibration driving circuit 380 may independently drive the first vibration device 810 and the second vibration device 830 of the first vibration apparatus 800. For example, the vibration driving circuit 380 may independently drive the third vibration device 1210 and the fourth vibration device 1230 of the second vibration apparatus 1200.

According to an embodiment of the present disclosure, the vibration driving circuit 380 may drive at least one or more of the first vibration apparatus 800 and the second vibration apparatus 1200, based on the frequency band of the driving signal, the touch event occurrence information, and the touch coordinate information. Accordingly, the vibration driving circuit 380 may allow the display panel 200 to generate the sound, to generate the haptic feedback, or to generate the sound and the haptic feedback.

According to an embodiment of the present disclosure, the vibration driving circuit 380 may drive the first vibration apparatus 800 to allow the display panel 200 to generate sound of a first pitched sound band, or may drive the second vibration apparatus 1200 to allow the display panel 200 to generate sound of a second pitched sound band, or may drive the first vibration apparatus 800 to allow the display panel 200 to generate a haptic feedback of a third pitched sound band. According to an embodiment of the present disclosure, the first pitched sound band may be a middle-low-pitched sound band. For example, the middle-low-pitched sound band may be 0 kHz to 3 kHz, but embodiments of the present disclosure are not limited thereto. For example, the second pitched sound band may be a high-pitched sound band which is higher than the first pitched sound band. For example, the high-pitched sound band may be 3 kHz or more, but embodiments of the present disclosure are not limited thereto. For example, the third pitched sound band may be a low-pitched sound band. For example, the low-pitched sound band may be less than 200 Hz, but embodiments of the present disclosure are not limited thereto.

When the vibration driving circuit 380 vibrates the display panel 200 to generate the sound, the vibration driving circuit 380 may drive at least one or more of the first vibration apparatus 800 and the second vibration apparatus 1200 to vibrate the display panel 200, based on a frequency band of the driving signal. According to an embodiment of the present disclosure, when a frequency of the driving signal is a frequency (e.g., a first frequency band) corresponding the first pitched sound band, the vibration driving circuit 380 may drive the first vibration apparatus 800 to allow the display panel 200 to vibrate, thereby generating sound of the first pitched sound band. For example, when a frequency of the driving signal is a frequency (e.g., a second frequency band) corresponding the second pitched sound band, the vibration driving circuit 380 may drive the second vibration apparatus 1200 to allow the display panel 200 to vibrate, thereby generating sound of the second pitched sound band.

When a touch event occurs, the vibration driving circuit 380 may drive the first vibration apparatus 800 to allow the display panel 200 to vibrate, thereby generating a haptic feedback of the third pitched sound band. For example, based on the touch coordinate information, when the vibration driving circuit 380 generates a haptic feedback, the vibration driving circuit 380 may vibrate the first vibration device 810 disposed at the left center portion CP1 of the display panel 200, or may vibrate the second vibration device 830 disposed at the right center portion CP2 of the display panel 200.

According to an embodiment of the present disclosure, when touch coordinates are coordinates in the left region LHP of the display panel 200, the vibration driving circuit 380 may vibrate the first vibration device 810 disposed at the left center portion CP1 of the display panel 200, or when touch coordinates are coordinates in the right region RHP of the display panel 200, the vibration driving circuit 380 may vibrate the second vibration device 830 disposed at the right center portion CP2 of the display panel 200. For example, when the touch coordinates are coordinates in the center line CL, the vibration driving circuit 380 may vibrate the first vibration device 810 disposed at the left center portion CP1 of the display panel 200, or may vibrate the second vibration device 830 disposed at the right center portion CP2 of the display panel 200. According to an embodiment of the present disclosure, the vibration driving circuit 380 may vibrate the second vibration apparatus 1200 to vibrate the display panel 200, thereby generating all of the sound and the haptic feedback.

According to an embodiment of the present disclosure, when the touch coordinates are coordinates in the left region LHP of the display panel 200, the vibration driving circuit 380 may drive the first vibration device 810, disposed at the left center portion CP1 of the display panel 200, to allow the left center portion CP1 of the display panel 200 to vibrate, thereby generating the haptic feedback of the third pitched sound band, and may drive the second vibration device 830, disposed at the right center portion CP2 of the display panel 200, to allow the right center portion CP2 of the display panel 200 to vibrate, thereby generating the sound of the first pitched sound band.

According to an embodiment of the present disclosure, when the touch coordinates are coordinates in the right region RHP of the display panel 200, the vibration driving circuit 380 may drive the second vibration device 830, disposed at the right center portion CP2 of the display panel 200, to allow the right center portion CP2 of the display panel 200 to vibrate, thereby generating the haptic feedback of the third pitched sound band, and may drive the first vibration device 810, disposed at the left center portion CP1 of the display panel 200, to allow the left center portion CP1 of the display panel 200 to vibrate, thereby generating the sound of the first pitched sound band.

According to an embodiment of the present disclosure, to reduce, minimize, or prevent a reduction in sound pressure level performance, the vibration driving circuit 380 may equalize a signal having a frequency (e.g., a first frequency band) corresponding to the first pitched sound band, and then, may drive the first vibration device 810, disposed at the left center portion CP1 of the display panel 200, based on the equalized signal to allow the left center portion CP1 of the display panel 200 to vibrate, thereby generating the sound of the first pitched sound band, or may drive the second vibration device 830, disposed at the right center portion CP2 of the display panel 200, to allow the right center portion CP2 of the display panel 200 to vibrate, thereby generating the sound of the first pitched sound band.

When a frequency (e.g., a third frequency band) of the third pitched sound band is included in a frequency (e.g., a first frequency band) of the first pitched sound band, when all of sound and a haptic feedback are generated, a sound pressure level may be reduced, and a sound characteristic may vary. To reduce, prevent, or minimize a reduction in sound pressure level and a variation of a sound characteristic, the vibration driving circuit 380 may generate sound of the other pitched sound band (e.g., a fourth pitched sound band), which may not correspond to a frequency of the third pitched sound band, of a frequency of the first pitched sound band. For example, when the first pitched sound band is 0 kHz to 3 kHz, and the third pitched sound band is less than 200 Hz, the vibration driving circuit 380 may generate sound DVS having a frequency (e.g., the fourth frequency band) of 200 Hz to 3 kHz.

According to an embodiment of the present disclosure, when the occurrence of a touch event ends, the vibration driving circuit 380 may use a region, generating a haptic feedback, of the display panel 200 as a region that generates sound DVS. According to an embodiment of the present disclosure, when coordinates in the left region LHP of the display panel 200 are touched, the vibration driving circuit 380 may vibrate the left center portion CP1 of the display panel 200 to generate a haptic feedback of the third pitched sound band, and then, when the occurrence of a touch event ends, the vibration driving circuit 380 may vibrate the left center portion CP1 of the display panel 200 to generate sound of the first pitched sound band or sound of the fourth pitched sound band. According to an embodiment of the present disclosure, when coordinates in the right region RHP of the display panel 200 are touched, the vibration driving circuit 380 may vibrate the right center portion CP2 of the display panel 200 to generate a haptic feedback of the third pitched sound band, and then, when the occurrence of a touch event ends, the vibration driving circuit 380 may vibrate the right center portion CP2 of the display panel 200 to generate sound of the first pitched sound band or sound of the fourth pitched sound band.

Figure 37A:
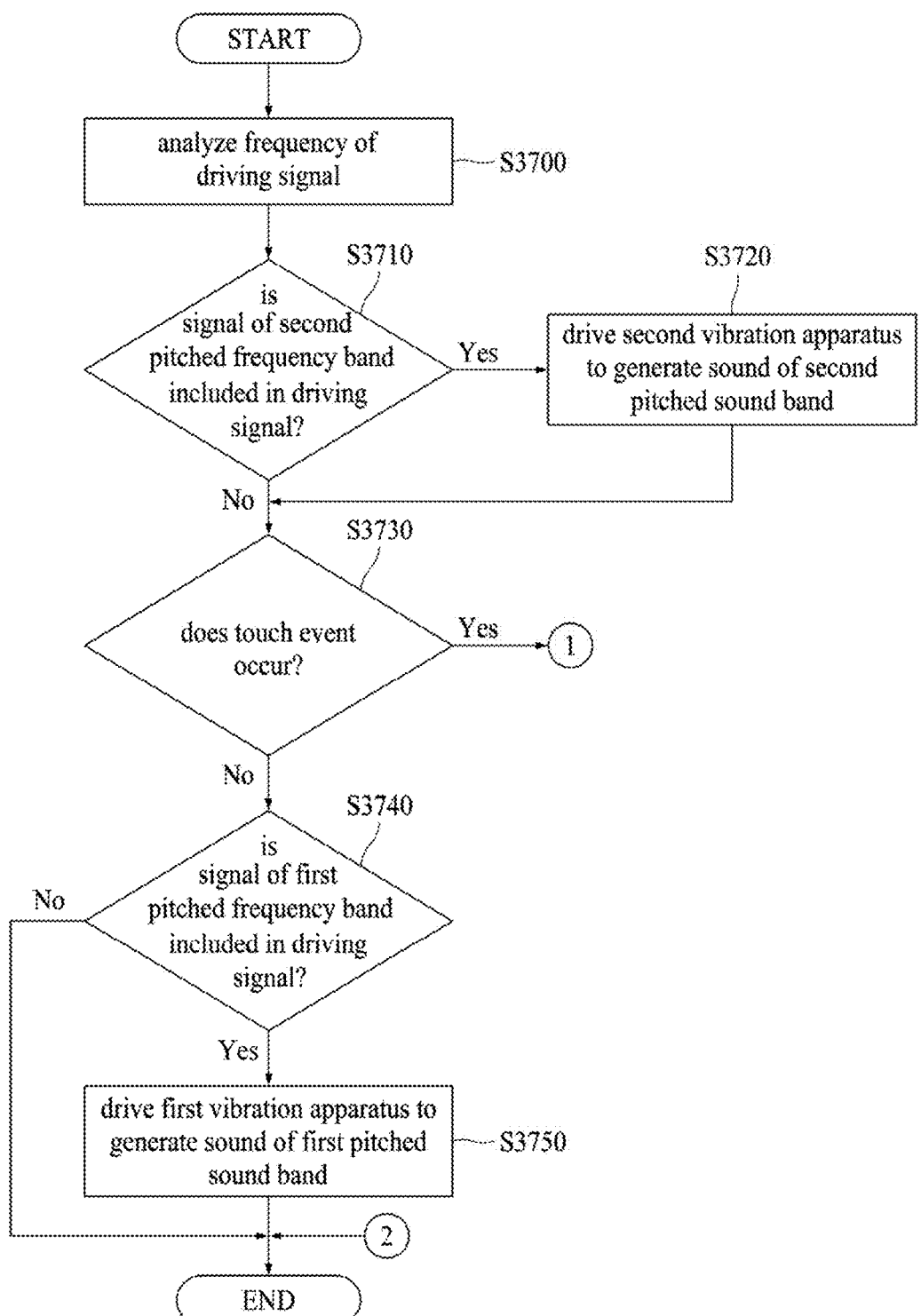
FIGS. 37A and 37B are flowcharts for describing a driving algorithm generating sound and a haptic feedback in a display apparatus according to an embodiment of the present disclosure.
Figure 37B:
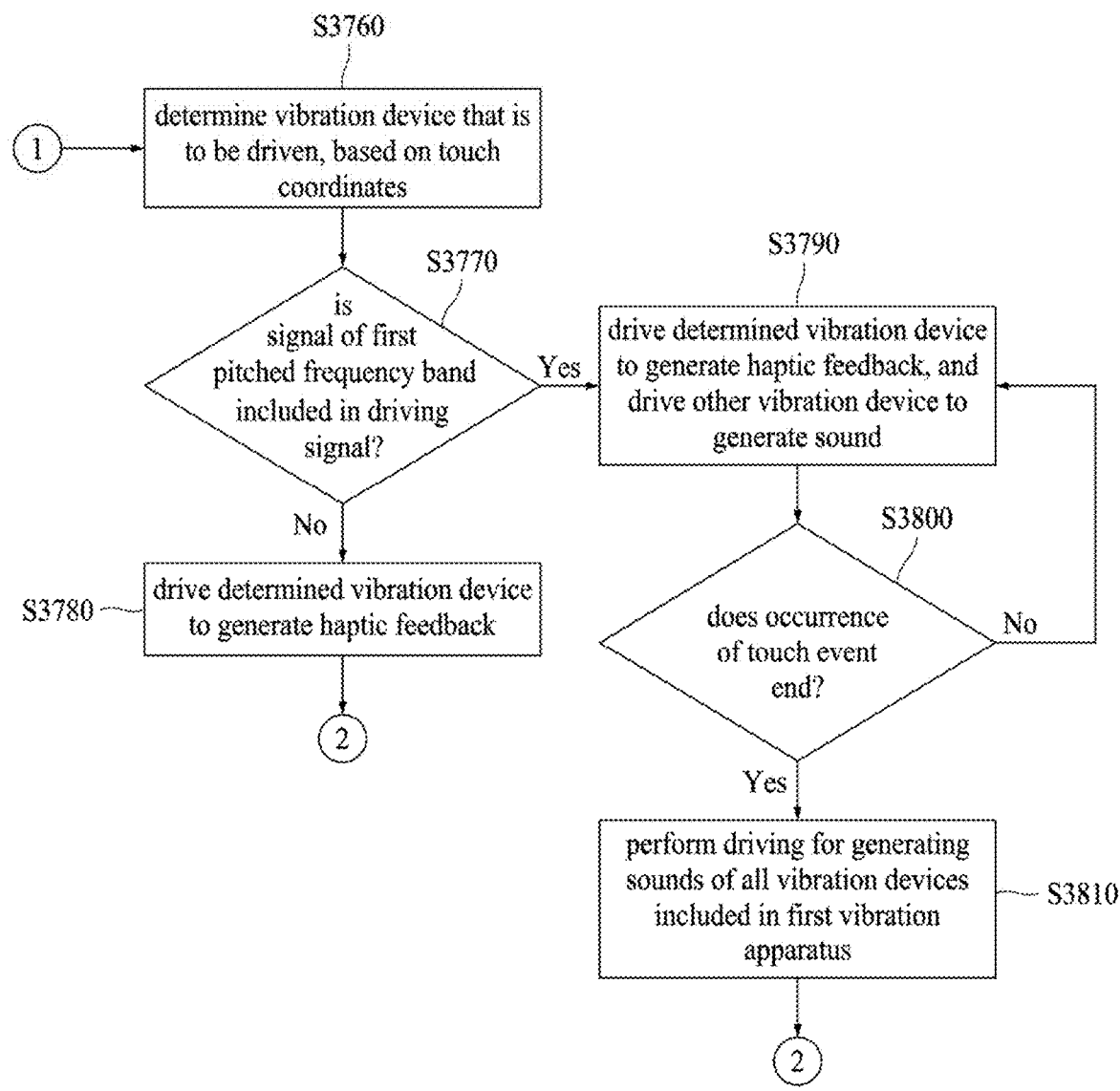

FIGS. 37A and 37B are flowcharts for describing a driving algorithm generating sound and a haptic feedback in a display apparatus according to an embodiment of the present disclosure.

With reference to the examples of FIGS. 36 to 37B, the vibration driving circuit 380 may analyze a frequency of a driving signal provided from the display host system in operation S3700. After the frequency is analyzed in operation S3700, the vibration driving circuit 380 may determine whether a signal of the second frequency band is included in the driving signal in operation S3710. When the signal of the second frequency band is included in the driving signal (e.g., "Yes" in operation S3710), the vibration driving circuit 380 may drive the second vibration apparatus 1200, based on the signal of the second frequency band of the driving signal to allow the display panel 200 to vibrate, thereby generating sound of the second pitched sound band in operation S3720. In operation S3720, the vibration driving circuit 380 may drive the third vibration device 1210 to allow the left periphery portion EP1 of the display panel 200 to vibrate, thereby generating a left sound, and may drive the fourth vibration device 1230 to allow the right periphery portion EP2 of the display panel 200 to vibrate, thereby generating a right sound.

When the signal of the second frequency band is not included in the driving signal (e.g., "No" in operation S3710), or after the sound of the second pitched sound band is generated in operation S3320, the vibration driving circuit 380 may determine the occurrence or lack of occurrence of a touch event in operation S3730. In operation S3730, the vibration driving circuit 380 may determine the occurrence or lack of occurrence of the touch event, based on touch event occurrence information from the display host system. For example, the vibration driving circuit 380 may determine whether a haptic feedback signal is included in the driving signal, thereby determining the occurrence or lack of occurrence of the touch event.

When it is determined that the touch event does not occur (e.g., "No" in operation S3730), the vibration driving circuit 380 may determine whether a signal of the first frequency band is included in the driving signal in operation S3740, and when the signal of the first frequency band is included in the driving signal (e.g., "Yes" in operation S3740), the vibration driving circuit 380 may drive the first vibration apparatus 800 to allow the display panel 200 to vibrate, thereby generating sound of the first pitched sound band in operation S3750. In operation S3750, the vibration driving circuit 380 may drive the first vibration device 810 to allow the left center portion CP1 of the display panel 200 to vibrate, thereby generating a left sound, and may drive the second vibration device 830 to allow the right center portion CP2 of the display panel 200 to vibrate, thereby generating a right sound.

In operation S3740, when the signal of the first frequency band is not included in the driving signal (e.g., "No" in operation S3740), the vibration driving circuit 380 may end a control operation, based on a currently received driving signal. In operation S3750, the vibration driving circuit 380 may control the first vibration apparatus 800, and then, may end a control operation, based on the currently received driving signal.

In operation S3730, when it is determined that the touch event occurs (e.g., "Yes" in operation S3730), the vibration driving circuit 380 may determine a vibration device, to be driven for a haptic feedback, of a plurality of vibration devices included in the first vibration apparatus 800, based on the touch coordinates in operation S3760. For example, the vibration driving circuit 380 may recognize touch coordinates, based on a haptic feedback signal included in the driving signal.

In operation S3760, the vibration driving circuit 380 may determine whether the touch coordinates are coordinates in the left region LHP of the display panel 200 or coordinates in the right region RHP of the display panel 200, based on touch coordinate information from the display host system. When the touch coordinates are the coordinates in the left region LHP of the display panel 200, the vibration driving circuit 380 may determine the first vibration device 810, disposed at the left center portion CP1 of the display panel 200, as a vibration device to be driven, and when the touch coordinates are the coordinates in the right region RHP of the display panel 200, the vibration driving circuit 380 may determine the second vibration device 820, disposed at the right center portion CP2 of the display panel 200, as a vibration device to be driven.

After operation S3760, the vibration driving circuit 380 may determine whether the signal of the first frequency band is included in the driving signal in operation S3770, and when the signal of the first frequency band is not included in the driving signal (e.g., "No" in operation S3770), the vibration driving circuit 380 may drive the driving module, determined in operation S3760, and thus, may allow the display panel 200 to vibrate, thereby generating a haptic feedback of the third pitched sound band in operation S3780. In operation S3780, the vibration driving circuit 380 may drive the vibration device, and then, may end a control operation based on a currently received driving signal.

In operation S3770, when it is determined that the signal of the first frequency band is included in the driving signal (e.g., "Yes" in operation S3770), the vibration driving circuit 380 may drive the driving module, determined in operation S3760, to allow the display panel 200 to vibrate, thereby generating a haptic feedback of the third pitched sound band, and may drive the other driving module of the vibration devices included in the first vibration apparatus 800 to allow the display panel 200 to vibrate, thereby generating sound of the first pitched sound band in operation S3790.

In operation S3790, when the first vibration device 810 is determined as a vibration device for generating a haptic feedback in operation S3760, the vibration driving circuit 380 may drive the first vibration device 810 to allow the left center portion CP1 of the display panel 200 to vibrate, thereby generating a haptic feedback of the third pitched sound band, and may drive the second vibration device 830 to allow the right center portion CP2 of the display panel 200 to vibrate, thereby generating sound of the first pitched sound band. In operation S3790, when the second vibration device 830 is determined as a vibration device for generating a haptic feedback in operation S3760, the vibration driving circuit 380 may drive the second vibration device 830 to allow the right center portion CP2 of the display panel 200 to vibrate, thereby generating a haptic feedback of the third pitched sound band, and may drive the first vibration device 810 to allow the left center portion CP1 of the display panel 200 to vibrate, thereby generating sound of the first pitched sound band.

In operation S3790, the vibration driving signal 380 may equalize a signal of the first frequency band included in the driving signal, and then, may drive the second vibration device 830 based on the equalized signal or may drive the first vibration device 810. In operation S3790, based on a signal except a signal of the third frequency band in a signal of the first frequency band included in the driving signal, the vibration driving signal 380 may drive the second vibration device 830 or the first vibration device 810 to allow the display panel 200 to vibrate, thereby generating sound of the fourth pitched sound band. In operation S3790, the vibration driving circuit 380 may drive the vibration device, and then, may end a control operation based on a currently received driving signal.

According to an embodiment of the present disclosure, the vibration driving circuit 380 may further perform the following operations. After operation S3790, the vibration driving circuit 380 may determine whether the occurrence of the touch event ends in operation S3800, and when the occurrence of the touch event does not end (e.g., "No" in operation S3800), the vibration driving circuit 380 may perform an operation which is performed in operation S3790. In operation S3790, when the occurrence of the touch event ends (e.g., "Yes" in operation S3800), the vibration driving circuit 380 may drive a vibration device to be driven to generate a haptic feedback in operation S3790, to generate sound DVS of the first pitched sound band, and thus, may drive all vibration devices 810 and 830 included in the first vibration apparatus 800 to allow the display panel 200 to vibrate, thereby generating sound of the first pitched sound band in operation S3810. In operation S3810, the vibration driving circuit 380 may drive the vibration device, and then, may end a control operation based on a currently received driving signal.

Figure 38:
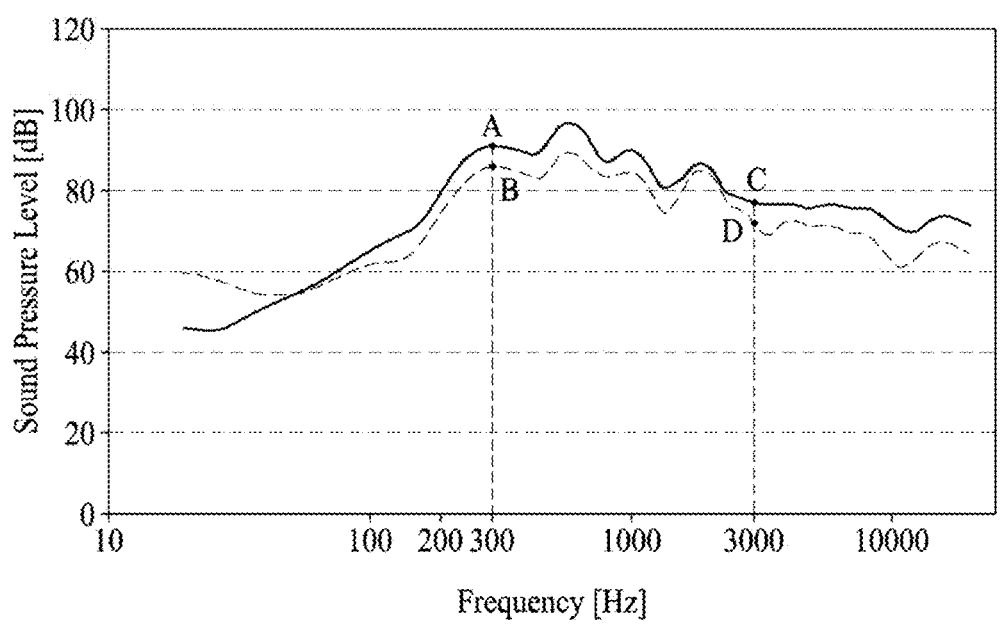
FIG. 38 is a graph showing sound pressure level characteristic of sound generated through driving based on the driving algorithm of FIGS. 37A and 37B.

FIG. 38 is a graph showing a sound pressure level characteristic of sound generated through driving based on the driving algorithm of FIGS. 37A and 37B.

In FIG. 38, a dotted line represents a sound pressure level characteristic before the driving algorithm is applied, and a solid line represents a sound pressure level characteristic after the driving algorithm is applied. A sound pressure level at point "A" is 90.89 dB, a sound pressure level at point "B" is 85.93 dB, a sound pressure level at point "C" is 77.04 dB, and a sound pressure level at point "D" is 71.68 dB.

With reference to the example of FIG. 38, when a vibration apparatus is driven by applying the driving algorithm according to an embodiment of the present disclosure, it may be seen that a display apparatus generates sound having a more enhanced sound pressure level characteristic than before the driving algorithm according to an embodiment of the present disclosure is applied. For example, when the driving algorithm is applied in a frequency of 300 Hz, it may be seen that a sound pressure level is enhanced by about 5 dB or more compared to a case where the driving algorithm is not applied. For example, when the driving algorithm is applied in a frequency of 3 kHz, it may be seen that a sound pressure level is enhanced by about 6 dB or more compared to when the driving algorithm is not applied. Accordingly, according to an embodiment of the present disclosure, a display apparatus where a sound pressure level characteristic thereof is enhanced in a middle-low-pitched sound band may be provided.

As described above, when the driving algorithm according to an embodiment of the present disclosure is used, a display apparatus may simultaneously generate sound and a haptic feedback, and may generate sound having an enhanced sound pressure level characteristic.

A vibration apparatus according to an embodiment of the present disclosure may be applied to a vibration apparatus disposed at a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, variable apparatuses, sliding apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, home appliances, etc. Also, the vibration apparatus according to an embodiment of the present disclosure may be applied to organic light-emitting lighting apparatuses or inorganic light-emitting lighting apparatuses. When the vibration apparatus of an embodiment of the present disclosure is applied to lighting apparatuses, the vibration apparatus may act as lighting and a speaker.

A display apparatus according to embodiments of the present disclosure may output a sound in a forward direction of a display panel, and may output a sound having improved sound quality, sound performance, and sound pressure level characteristic, thereby increasing an immersion experience of a viewer or a listener. Moreover, the display apparatus according to embodiments of the present disclosure may reduce, prevent, or minimize the damage of a driving circuit caused by a vibration of the display panel, thereby enhancing the reliability of the driving circuit.

In the display apparatus according to embodiments of the present disclosure, the degree of freedom in arrangement of a vibration apparatus may be enhanced, and based on the efficient arrangement of the vibration apparatus, the sound pressure level, sound quality, and reproduction pitched sound band of a sound generated based on a vibration of the display panel may increase. Moreover, the display apparatus according to embodiments of the present disclosure may simultaneously generate sound and a haptic feedback, and may generate sound having an enhanced sound pressure level characteristic.

A display apparatus and a vehicle including the same according to various embodiments of the present disclosure will be described below.

A display apparatus according to an embodiment of the present disclosure may include a display panel configured to display an image, a driving circuit including a flexible circuit film connected to the display panel and a printed circuit board connected to the flexible circuit film, a first supporting member at a rear surface of the display panel, the first supporting member including a hole therein, and a vibration apparatus supported by the first supporting member, the vibration apparatus including a first vibration apparatus at the rear surface of the display panel, the flexible circuit film may extend through the hole, and the printed circuit board may be disposed at a rear surface of the first supporting member.

According to some embodiments of the present disclosure, the display apparatus may further include a second supporting member at a periphery of the rear surface of the first supporting member, the printed circuit board may be disposed at the second supporting member.

According to some embodiments of the present disclosure, the display apparatus may further include a front member at a front surface of the display panel, and a supporting frame at a rear surface of the front member, the supporting frame supporting side surfaces of the display panel, the first supporting member may be disposed at a rear surface of the supporting frame.

According to some embodiments of the present disclosure, the supporting frame may include a plurality of connection portions having certain intervals at one surface or one portion of the supporting frame.

According to some embodiments of the present disclosure, the supporting frame may include an opening at a rear periphery portion of the front member, the opening overlapping the display panel or an opening in a central region of the display apparatus.

According to some embodiments of the present disclosure, the supporting frame may be supporting four peripheries four peripheries of an upper, a lower, a left, and a right of the front member, and the four peripheries of the front member may be supported by the supporting frame.

According to some embodiments of the present disclosure, the display apparatus may further include a third supporting member between the second supporting member and the printed circuit board.

According to some embodiments of the present disclosure, the first supporting member may include a 1-1$^{th}$ plate at the rear surface of the display panel, the 1-1$^{th}$ plate supporting the first vibration apparatus, a forming portion extending in an outward direction of the 1-1$^{th}$ plate from the 1-1$^{th}$ plate, and a 1-2$^{th}$ plate extending in the outward direction of the 1-1$^{th}$ plate from the forming portion.

According to some embodiments of the present disclosure, the first supporting member may further comprise a vibration apparatus accommodating hole at the 1-1$^{th}$ plate.

According to some embodiments of the present disclosure, the first supporting member may further comprise a line hole or a wire hole through which a line or wire is disposed formed at the 1-1$^{th}$ plate.

According to some embodiments of the present disclosure, the first supporting member may further comprise a dummy hole at the 1-1$^{th}$ plate.

According to some embodiments of the present disclosure, the first supporting member may further comprise a hole configured to couple or connect the first supporting member to the supporting device at the 1-1$^{th}$ plate.

According to some embodiments of the present disclosure, wherein the first supporting member may further comprise a hole configured to couple or connect the first supporting member to the vibration apparatus at the 1-1th plate.

According to some embodiments of the present disclosure, the forming portion may include a first sub-forming portion extending in the outward direction of the 1-1$^{th}$ plate from an outer portion of the 1-1th plate to have an inclined surface toward the rear surface of the display panel.

According to some embodiments of the present disclosure, the forming portion may include a first sub-forming portion extending in the outward direction of the 1-1$^{th}$ plate from an outer portion of the 1-1th plate to have an inclined surface toward the rear surface of the display panel, a second sub-forming portion extending in the outward direction of the 1-1$^{th}$ plate from an outer portion of the first sub-forming portion to be horizontal (e.g., parallel) to the display panel, and a third sub-forming portion extending in the outward direction of the 1-1$^{th}$ plate from an outer portion of the second sub-forming portion to have an inclined surface toward the rear surface of the display panel.

According to some embodiments of the present disclosure, the forming portion may comprise a first sub-forming portion extending in an outward direction of the 1-1$^{th}$ plate, the first sub-forming portion including an inclined surface toward the rear surface of the display panel from an outer end of the 1-1$^{th}$ plate, and a second sub-forming portion extending in an outward direction of the 1-1$^{th}$ plate from the first sub-forming portion.

According to some embodiments of the present disclosure, the forming portion may comprise a first sub-forming portion extending in an outward direction or one side direction of the 1-1$^{th}$ plate from the 1-1$^{th}$ plate.

According to some embodiments of the present disclosure, the second supporting member may include a 2-1$^{th}$ plate at a first surface of the first supporting member, the 2-1$^{th}$ plate being horizontal (e.g., parallel) to the display panel.

According to some embodiments of the present disclosure, the second supporting member may further include a 2-2$^{th}$ plate at the rear surface of the first supporting member, the 2-2$^{th}$ plate extending from the 2-1$^{th}$ plate.

According to some embodiments of the present disclosure, the second supporting member may further include a 2-3$^{th}$ plate extending in a center direction of the first supporting member along the rear surface of the first supporting member from the 2-2$^{th}$ plate.

According to some embodiments of the present disclosure, the display apparatus may further include a 3-1$^{th}$ supporting member at a rear surface of the 2-1$^{th}$ plate, the printed circuit board may be disposed at the 3-1$^{th}$ supporting member.

According to some embodiments of the present disclosure, the display apparatus may further include a 3-1$^{th}$ supporting member disposed at a rear surface of the 2-1$^{th}$ plate, and a 3-2$^{th}$ supporting member extending along a portion of the 2-2$^{th}$ plate from the 3-1$^{th}$ supporting member, the flexible circuit film may extend through the hole, and the flexible circuit film may be disposed at the 3-2$^{th}$ supporting member.

According to some embodiments of the present disclosure, the display apparatus may further include a 3-3$^{th}$ supporting member between the rear surface of the first supporting member and the 2-2$^{th}$ plate.

According to some embodiments of the present disclosure, the display apparatus may further include a 3-1$^{th}$ supporting member at a rear surface of the 2-1$^{th}$ plate, a 3-2$^{th}$ supporting member extending along a portion of the 2-2$^{th}$ plate from the 3-1$^{th}$ supporting member, and a 3-4$^{th}$ supporting member between the rear surface of the first supporting member and the 2-3$^{th}$ plate.

According to some embodiments of the present disclosure, the display apparatus may further include a heat dissipation member between the rear surface of the display panel and the first vibration apparatus.

According to some embodiments of the present disclosure, the display apparatus may further include a heat dissipation member between the rear surface of the display panel and the first vibration apparatus. According to some embodiments of the present disclosure, the display apparatus may further include a connection member between the display panel and the first supporting member, the connection member may be disposed between the first vibration apparatus and the hole, and the connection member may be disposed at a periphery of the first supporting member.

According to some embodiments of the present disclosure, the connection member may be adjacent to a periphery of the supporting frame, and each of both sides of the connection member in a lengthwise direction thereof may contact the periphery of the supporting frame.

According to some embodiments of the present disclosure, the display apparatus may further include a supporting device between the first supporting member and a rear surface of the first vibration apparatus, the supporting member supporting the first vibration apparatus.

According to some embodiments of the present disclosure, the supporting device may include a supporting portion supporting the first vibration apparatus, an accommodation portion into which a portion of the rear surface of the first vibration apparatus is accommodated, and a connection portion configured to connect the first supporting member with the first vibration apparatus.

According to some embodiments of the present disclosure, the connection portion may include a protrusion portion which protrudes from the periphery of the supporting portion and has a hook shape.

According to some embodiments of the present disclosure, supporting device may further comprise a connection hole which is provided by the supporting portion and the connection portion.

According to some embodiments of the present disclosure, the display apparatus may further include a rear cover at the rear surface of the first supporting member, the rear cover may include a first cover covering rear surface of the first supporting member, and a second cover disposed along a periphery of the first cover, the second cover covering a side surface of the display panel.

According to some embodiments of the present disclosure, the display apparatus may further include a rear cover at the rear surface of the first supporting member, the rear cover may include a first cover covering the rear surface of the first supporting member, and a second cover disposed along a periphery of the first cover, the second cover covering a side surface of the supporting frame.

According to some embodiments of the present disclosure, the display apparatus may further include a rear cover at the rear surface of the first supporting member, the rear cover may include a first cover configured to cover the rear surface of the first supporting member, a second cover disposed along a periphery of the first cover, the second cover being configured to cover a side surface of the display panel, and a third cover at the other periphery being opposite to the one periphery of the first cover, the third cover being configured to cover a side surface, exposed at the rear surface of the first supporting member, of the vibration apparatus.

According to some embodiments of the present disclosure, the first cover may be covering a rear surface, exposed at the rear surface of the first supporting member, of the first vibration apparatus and the printed circuit board disposed at the rear surface of the first supporting member.

According to some embodiments of the present disclosure, the first cover may be covering a rear surface, exposed at the rear surface of the first supporting member, of the first vibration apparatus, and the printed circuit board disposed at the rear surface of the first supporting member.

According to some embodiments of the present disclosure, the display apparatus may further include a supporting structure between the first supporting member and the rear cover.

According to some embodiments of the present disclosure, the display apparatus may further include a supporting structure between the first supporting member and the rear cover.

According to some embodiments of the present disclosure, the vibration apparatus may further include a second vibration apparatus disposed at the rear surface of the display panel, the second vibration apparatus being configured to vibrate the display panel.

According to some embodiments of the present disclosure, the first vibration apparatus may include at least one coil type vibration device, and the second vibration apparatus may include at least one film type vibration device.

According to some embodiments of the present disclosure, the first vibration apparatus may be at a center portion of the rear surface of the display panel, and the second vibration apparatus may be at a periphery portion of the rear surface of the display panel, the first vibration apparatus may be configured to vibrate the center portion of the rear surface of the display panel to generate at least one of sound and a haptic feedback, and the second vibration apparatus may be configured to vibrate the periphery portion of the rear surface of the display panel to generate sound.

According to some embodiments of the present disclosure, the first vibration apparatus may be configured to vibrate the center portion of the rear surface of the display panel to generate at least one of sound of a first pitched sound band and a haptic feedback of a third pitched sound band, and the second vibration apparatus may be configured to vibrate the periphery portion of the rear surface of the display panel to generate sound of a second pitched sound band.

According to some embodiments of the present disclosure, the first vibration apparatus may include 2*m vibration devices, where m is a natural number, a first m vibration devices, among 2*m vibration devices may be disposed at one or more of a left center portion and a right center portion of the rear surface of the display panel, and a second m vibration devices, among 2*m vibration devices may be disposed at another center portion of the rear surface of the display panel, and either the first m vibration devices may generate the sound, the second m vibration devices may simultaneously generate the haptic feedback, or the first m vibration devices may generate the haptic feedback, the second m vibration devices may simultaneously generate the sound.

According to some embodiments of the present disclosure, the second vibration apparatus may comprise 2*n vibration devices, where n is a natural number, a first n vibration devices of the 2*n of vibration devices are disposed at a first periphery portion of the display panel, and a second n vibration devices of the 2*n vibration devices are disposed at a second periphery portion of the display panel.

According to some embodiments of the present disclosure, the driving circuit may include a vibration driving circuit configured to equalize a signal having a frequency of the first pitched sound band included in a driving signal provided thereto and drive the first vibration apparatus based on the equalized signal to generate the sound.

According to some embodiments of the present disclosure, the third pitched sound band may be included in the first pitched sound band, and when the vibration driving circuit drives the first vibration apparatus to simultaneously generate the sound and the haptic feedback, the vibration driving circuit may be further configured to drive the first vibration apparatus based on a signal having a frequency of the other pitched sound band, which does not correspond to a frequency of the third pitched sound band, of a frequency of the first pitched sound band to generate sound of a fourth pitched sound band.

A display apparatus according to some embodiments of the present disclosure may include a display panel configured to display an image, a driving circuit including a flexible circuit film connected to the display panel and a printed circuit board connected to the flexible circuit film, a supporting member at a rear surface of the display panel, the supporting member including an open region, and a vibration apparatus supported by the supporting member, the vibration apparatus including a first vibration apparatus at the rear surface of the display panel, the flexible circuit film extends through the open region, and the printed circuit board may be disposed at a rear surface of the supporting member.

According to some embodiments of the present disclosure, the display apparatus may further include a supporting frame at the supporting member, the supporting frame including a hole therein, a portion of a rear surface of the first vibration apparatus is accommodated in the hole.

According to some embodiments of the present disclosure, a peripheral region of the hole may be between the supporting member and the rear surface of the vibration apparatus.

According to some embodiments of the present disclosure, the display apparatus may further include a guide connection member between the supporting member and the supporting frame, the guide connection member may be configured to include an accommodation hole formed to correspond to the hole.

According to some embodiments of the present disclosure, the display apparatus may further include a front member at a front surface of the display panel, the supporting member may include a lower plate at the rear surface of the display panel, the lower plate supporting the vibration apparatus, and a side portion disposed along a periphery of the lower plate and at a rear surface of the front member.

According to some embodiments of the present disclosure, the side portion may include the open region, and the side portion may be supporting three peripheries of the front member at the rear surface of the front member.

According to some embodiments of the present disclosure, the supporting frame may include a first surface at the supporting member, the first surface including the hole, and a second surface disposed along a periphery of the first surface and at the rear surface of the display panel.

According to some embodiments of the present disclosure, another portion, other than a portion corresponding to one side where the open region of the supporting member is formed, of the second surface may be covered by the supporting member.

According to some embodiments of the present disclosure, the supporting frame further may include a reinforcement structure at the first surface.

According to some embodiments of the present disclosure, the reinforcement structure may include a first reinforcement member configured to connect two different second surfaces, and a second reinforcement member configured to connect the first reinforcement member to the second surface.

According to some embodiments of the present disclosure, the reinforcement structure may include at least one of a third reinforcement member, a fourth reinforcement member, and a fifth reinforcement member, the third reinforcement member may be configured to connect two different first reinforcement members, the fourth reinforcement member may be configured to connect two different second reinforcement members; and the fifth reinforcement member may be configured to connect the first reinforcement member to the second reinforcement member.

According to some embodiments of the present disclosure, the display apparatus may further include a first connection member between the rear surface of the supporting member and the printed circuit board.

According to some embodiments of the present disclosure, the display apparatus may further include a second connection member disposed along the open region of the supporting member to extend from the first connection member.

According to some embodiments of the present disclosure, the display apparatus may further include a second connection member disposed along the open region of the supporting member to extend from the first connection member.

According to some embodiments of the present disclosure, the display apparatus may further include a heat dissipation member between the rear surface of the display panel and the first vibration apparatus.

According to some embodiments of the present disclosure, the display apparatus may further include a supporting device between the supporting frame and the rear surface of the first vibration apparatus, the supporting device supporting the first vibration apparatus.

According to some embodiments of the present disclosure, the display apparatus may further include a rear cover disposed at the rear surface of the supporting member, the rear cover may include a first cover covering the rear surface of the supporting member, and a second cover disposed along a periphery of the first cover, the second cover covering the open region of the supporting member, and the second cover may be covering a side surface of the display panel exposed through the open region and the flexible circuit film disposed along the open region.

According to some embodiments of the present disclosure, the display apparatus may further include a rear cover disposed at the rear surface of the supporting member, the rear cover may include a first cover covering the rear surface of the supporting member, and a second cover disposed at one periphery of the first cover, the second cover covering the open region of the supporting member, and the second cover may cover a side surface of the display panel exposed through the open region and the flexible circuit film disposed along the open region.

According to some embodiments of the present disclosure, the first cover may cover a rear surface of the first vibration apparatus exposed at the rear surface of the supporting member and the printed circuit board disposed at the rear surface of the first supporting member.

According to some embodiments of the present disclosure, the first cover may be covering a rear surface of the first vibration apparatus exposed at the rear surface of the supporting member and the printed circuit board disposed at the rear surface of the supporting member.

According to some embodiments of the present disclosure, the display apparatus may further include a supporting structure between the supporting member and the rear cover.

According to some embodiments of the present disclosure, the display apparatus may further include a supporting structure between the supporting member and the rear cover.

According to some embodiments of the present disclosure, the vibration apparatus may further include a second vibration apparatus at the rear surface of the display panel, the second vibration apparatus being configured to vibrate the display panel.

According to some embodiments of the present disclosure, the first vibration apparatus may include at least one coil type vibration module, and the second vibration apparatus may include at least one film type vibration module.

According to some embodiments of the present disclosure, the first vibration apparatus may be at a center portion of the rear surface of the display panel, and the second vibration apparatus may be at a periphery portion of the rear surface of the display panel, the first vibration apparatus may be configured to vibrate the center portion of the rear surface of the display panel to generate at least one of sound and a haptic feedback, and the second vibration apparatus may be configured to vibrate the periphery portion of the rear surface of the display panel to generate sound.

According to some embodiments of the present disclosure, the first vibration apparatus may be further configured to vibrate the center portion of the rear surface of the display panel to generate at least one of sound of a first pitched sound band and a haptic feedback of a third pitched sound band, and the second vibration apparatus may be configured to vibrate the periphery portion of the rear surface of the display panel to generate sound of a second pitched sound band.

According to some embodiments of the present disclosure, the first vibration apparatus may include $2*m$ vibration devices, where m is a natural number, a first m vibration devices may be disposed at one or more of a left center portion and a right center portion of the rear surface of the display panel, and a second m vibration devices may be disposed at another center portion of the rear surface of the display panel, either the first m vibration devices may generate the sound, the second m vibration modules may simultaneously generate the haptic feedback, or the first m vibration modules may generate the haptic feedback, the second m vibration modules may simultaneously generate the sound.

According to some embodiments of the present disclosure, the second vibration apparatus may comprise 2n vibration devices, where n is a natural number, a first n vibration devices of the 2n vibration devices are disposed at a first periphery portion of the display panel, and a second n vibration devices of the 2n vibration devices are disposed at a second periphery portion of the display panel.

According to some embodiments of the present disclosure, the driving circuit may include a vibration driving circuit, the vibration driving circuit may be configured to equalize a signal having a frequency of the first pitched sound band included in a driving signal provided thereto and drive the first vibration apparatus based on the equalized signal to generate the sound.

According to some embodiments of the present disclosure, the third pitched sound band may be comprised in the first pitched sound band, and the vibration driving circuit may be further configured to drive the first vibration apparatus to simultaneously generate the sound and the haptic feedback, and drive the first vibration apparatus based on a signal having a frequency of the other pitched sound band, which does not correspond to a frequency of the third pitched sound band, of a frequency of the first pitched sound band to generate sound of a fourth pitched sound band.

A vehicle according to some embodiments of the present disclosure may include a dashboard including a first region facing a driver seat, a second region facing a passenger seat, and a third region between the first region and the second region; a dashboard device (e.g., an instrument panel device) including a first display at the first region of the dashboard; and an infotainment device including one or more of a second display at the third region of the dashboard, a third display at the second region of the dashboard, a fourth display at a rear surface of the driver seat, and a fifth display at a rear surface of the passenger seat, one or more of the first to fifth displays may be configured to include the display apparatus, the display apparatus may comprise a display panel configured to display an image, a driving circuit including a flexible circuit film connected to the display panel and a printed circuit board connected to the flexible circuit film, a first supporting member at a rear surface of the display panel, the first supporting member including a hole, and a vibration apparatus supported by the first supporting member, the vibration apparatus including a first vibration apparatus at the rear surface of the display panel, the flexible circuit film may extend through the hole, and the printed circuit board may be disposed at a rear surface of the first supporting member.

A vehicle according to some embodiments of the present disclosure may include a dashboard including a first region facing a driver seat, a second region facing a passenger seat, and a third region between the first region and the second region; a dashboard device (e.g., an instrument panel device) including a first display disposed at the first region of the dashboard; and an infotainment device including one or more of a second display at the third region of the dashboard, a third display at the second region of the dashboard, a fourth display at a rear surface of the driver seat, and a fifth display at a rear surface of the passenger seat, one or more of the first to fifth displays may include a display apparatus, the display apparatus may comprise a display panel configured to display an image, a driving circuit including a flexible circuit film connected to the display panel and a printed circuit board connected to the flexible circuit film, a supporting member at a rear surface of the display panel, the supporting member including an open region, and a vibration apparatus supported by the supporting member, the vibration apparatus including a first vibration apparatus at the rear surface of the display panel, the flexible circuit film may extend through the open region, and the printed circuit board may be disposed at a rear surface of the supporting member.

According to some embodiments of the present disclosure, one or more of the first to fifth displays may be configured to output sound based on a vibration of the display panel by a vibration of the vibration apparatus.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A display apparatus, comprising:
a display panel configured to display an image;
a driving circuit part configured to include a flexible circuit film connected to the display panel and a printed circuit board connected to the flexible circuit film;
a first supporting member configured at a rear surface side of the display panel;
a vibration apparatus supported by the first supporting member and configured to include a first vibration apparatus disposed at the rear surface side of the display panel; and
a second supporting member disposed at a periphery of a rear surface of the first supporting member,
wherein the flexible circuit film passes through the first supporting member and extends to a rear surface of the second supporting member, and
wherein the printed circuit board is disposed at the rear surface of the second supporting member and connected to the flexible circuit film.

2. The display apparatus of claim 1, wherein:
the first supporting member includes a hole through which the flexible circuit film passes; and
the flexible circuit film passes through the hole and surrounds a side surface of the second supporting member.

3. The display apparatus of claim 2, further comprising a connection member disposed between the display panel and the first supporting member,
wherein the connection member is disposed between the first vibration apparatus and the hole and is disposed at a periphery of the first supporting member.

4. The display apparatus of claim 3, wherein the connection member has a length corresponding to a length of the hole.

5. The display apparatus of claim 4, wherein the connection member includes an adhesive resin, a double-sided tape having an adhesive layer, or a double-sided foam pad having an adhesive layer.

6. The display apparatus of claim 2, wherein the first supporting member comprises:
a $1\text{-}1^{th}$ plate disposed at the rear surface side of the display panel and configured to support the first vibration apparatus;
a forming portion extending in an outside direction of the $1\text{-}1^{th}$ plate from the $1\text{-}1^{th}$ plate; and
a $1\text{-}2^{th}$ plate extending in the outside direction of the $1\text{-}1^{th}$ plate from the forming portion.

7. The display apparatus of claim 6, further comprising a connection member disposed between the display panel and the $1\text{-}2^{th}$ plate,
wherein the connection member is disposed between the first vibration apparatus and the hole and has a length corresponding to a length of the hole.

8. The display apparatus of claim 6, wherein:
the first supporting member includes a hole configured at the $1\text{-}1^{th}$ plate; and
a portion of the vibration apparatus is accommodated into the hole.

9. The display apparatus of claim 6, wherein the forming portion comprises a first sub-forming portion extending to the outside direction of the $1\text{-}1^{th}$ plate toward a rear surface of the display panel to have an inclined surface.

10. The display apparatus of claim 6, wherein the forming portion comprises:
a first sub-forming portion extending to the outside direction of the 1-1$^{th}$ plate toward the rear surface of the display panel;
a second sub-forming portion extending to the outside direction of the 1-1$^{th}$ plate from the first sub-forming portion to be horizontal to the display panel; and
a third sub-forming portion extending to the outside direction of the 1-1$^{th}$ plate toward the rear surface of the display panel from the second sub-forming portion.

11. The display apparatus of claim 6, wherein the second supporting member is connected to each of the 1-1$^{th}$ plate and the 1-2$^{th}$ plate.

12. The display apparatus of claim 11, further comprising:
a first coupling member disposed between the second supporting member and the 1-1$^{th}$ plate; and
a second coupling member disposed between the second supporting member and the 1-2$^{th}$ plate.

13. The display apparatus of claim 12, wherein each of the first coupling member and the second coupling member includes a screw, a bolt, an adhesive resin, a double-sided tape having an adhesive layer, or a double-sided foam pad having an adhesive layer.

14. The display apparatus of claim 1, wherein the second supporting member comprises a 2-1$^{th}$ plate disposed at a rear surface side of the first supporting member and disposed to be horizontal to the display panel.

15. The display apparatus of claim 14, wherein the second supporting member further comprises a 2-2$^{th}$ plate disposed at the rear surface side of the first supporting member and bent from the 2-1th plate.

16. The display apparatus of claim 15, wherein the second supporting member further comprises a 2-3$^{th}$ plate extending in a center direction of the first supporting member along the rear surface of the first supporting member from the 2-2$^{th}$ plate.

17. The display apparatus of claim 16, further comprising:
a 3-1$^{th}$ supporting member disposed at a rear surface side of the 2-1$^{th}$ plate;
a 3-2$^{th}$ supporting member extending along a portion of the 2-2$^{th}$ plate from the 3-1$^{th}$ supporting member; and
a 3-4$^{th}$ supporting member disposed between the rear surface of the first supporting member and the 2-3$^{th}$ plate.

18. The display apparatus of claim 15, further comprising a 3-1$^{th}$ supporting member disposed at a rear surface side of the 2-1$^{th}$ plate,
wherein the printed circuit board is disposed at the 3-1$^{th}$ supporting member.

19. The display apparatus of claim 18, further comprising:
a 3-1$^{th}$ supporting member disposed at the rear surface side of the 2-1$^{th}$ plate; and
a 3-2$^{th}$ supporting member extending along a portion of the 2-2$^{th}$ plate from the 3-1$^{th}$ supporting member,
wherein:
the first supporting member includes a hole through which the flexible circuit film passes; and
the flexible circuit film passes through the hole and is disposed at the 3-2$^{th}$ supporting member.

20. The display apparatus of claim 15, further comprising a 3-3$^{th}$ supporting portion disposed between the rear surface side of the first supporting member and the 2-2$^{th}$ plate.

21. The display apparatus of claim 1, further comprising:
a front member disposed at a front surface side of the display panel; and
a supporting frame disposed at a rear surface side of the front member to surround side surfaces of the display panel,
wherein the first supporting member is disposed at a rear surface side of the supporting frame.

22. The display apparatus of claim 21, wherein:
the supporting frame is configured to support four peripheries of an upper, a lower, a left, and a right of the front member, and
the four peripheries of the front member are supported by the supporting frame.

23. The display apparatus of claim 21, further comprising a connection member disposed between the display panel and the first supporting member,
wherein:
the first supporting member includes a hole through which the flexible circuit film passes; and
the hole is disposed between the connection member and the supporting frame.

24. The display apparatus of claim 21, further comprising a rear cover disposed at the rear surface of the first supporting member,
wherein the rear cover comprises:
a first cover configured to cover the rear surface of the first supporting member and the printed circuit board disposed at the rear surface of the first supporting member; and
a second cover disposed along a periphery of the first cover and configured to cover a side surface of the supporting frame.

25. The display apparatus of claim 1, further comprising a third supporting member disposed between the second supporting member and the printed circuit board.

26. The display apparatus of claim 1, further comprising a heat dissipation member disposed between a rear surface of the display panel and the first vibration apparatus.

27. The display apparatus of claim 1, further comprising a supporting device disposed between the first supporting member and a rear surface of the first vibration apparatus and implemented to support the first vibration apparatus.

28. The display apparatus of claim 27, wherein the supporting device comprises:
a supporting portion configured to support the first vibration apparatus;
an accommodation portion into which a portion of the rear surface of the first vibration apparatus is accommodated; and
a connection portion configured to connect the first vibration apparatus and the first support member.

29. The display apparatus of claim 1, further comprising a rear cover disposed at the rear surface of the first supporting member,
wherein the rear cover comprises:
a first cover configured to cover the rear surface of the first supporting member; and
a second cover disposed along a periphery of the first cover and configured to cover a side surface of the display panel.

30. The display apparatus of claim 29, further comprising a supporting structure disposed between the first supporting member and the rear cover.

31. The display apparatus of claim 1, wherein the vibration apparatus further comprises a second vibration apparatus disposed at the rear surface side of the display panel and configured to vibrate the display panel.

32. The display apparatus of claim 31, wherein:
the first vibration apparatus comprises at least one or more coil type vibration devices; and
the second vibration apparatus comprises at least one or more film type vibration devices.

33. The display apparatus of claim 31, wherein:
the first vibration apparatus is disposed at a center portion of a rear surface of the display panel, and the second vibration apparatus is disposed at a periphery portion of the rear surface of the display panel;
the first vibration apparatus is configured to vibrate the center portion of the rear surface of the display panel to generate at least one or more of a sound and a haptic feedback; and
the second vibration apparatus is configured to vibrate the periphery portion of the rear surface of the display panel to generate a sound.

34. The display apparatus of claim 33, wherein:
the first vibration apparatus is configured to vibrate the center portion of the rear surface of the display panel to generate at least one or more of a sound of a first pitched sound band and a haptic feedback of a third pitched sound band; and
the second vibration apparatus is configured to vibrate the periphery portion of the rear surface of the display panel to generate a sound of a second pitched sound band.

35. The display apparatus of claim 34, wherein:
the first vibration apparatus comprises 2m (where m is a natural number) number of vibration devices; and
m number of vibration devices of the 2m number of vibration devices are disposed at one or more of a left center portion and a right center portion of the rear surface of the display panel, and the other m vibration devices of the 2m number of vibration devices are disposed at another center portion of the rear surface of the display panel.

36. The display apparatus of claim 35, wherein:
the driving circuit part comprises a vibration driving circuit; and
the vibration driving circuit equalizes a signal having a frequency of the first pitched sound band included in a driving signal provided thereto and drives the first vibration apparatus based on the equalized signal to generate the sound.

37. The display apparatus of claim 36, wherein:
the third pitched sound band is included in the first pitched sound band; and
when the vibration driving circuit drives the first vibration apparatus to simultaneously generate the sound and the haptic feedback, the vibration driving circuit is configured to drive the first vibration apparatus based on a signal having a frequency of the other pitched sound band, which does not correspond to a frequency of the third pitched sound band, of a frequency of the first pitched sound band to generate a sound of a fourth pitched sound band.

38. A vehicle, comprising:
a dashboard configured to include a first region facing a driver seat, a second region facing a passenger seat, and a third region between the first region and the second region;
a dashboard device including a first display disposed at the first region of the dashboard; and
an infotainment device configured to include at least one of a second display disposed at the third region of the dashboard, a third display disposed at the second region of the dashboard, a fourth display disposed at a rear surface of the driver seat, and a fifth display disposed at a rear surface of the passenger seat,
wherein one or more of the first to fifth displays comprise the display apparatus of claim 1.

39. The vehicle of claim 38, wherein one or more of the first to fifth displays configured to output a sound based on a vibration of the display panel based on a vibration of the vibration apparatus.

40. The vehicle of claim 38, wherein:
the first supporting member includes a hole through which the flexible circuit film passes; and
the flexible circuit film passes through the hole and surrounds a side surface of the second supporting member.

41. The vehicle of claim 40, further comprising a connection member disposed between the display panel and the first supporting member,
wherein the connection member is disposed between the first vibration apparatus and the hole and is disposed at a periphery of the first supporting member.

42. The vehicle of claim 41, wherein the connection member has a length corresponding to a length of the hole.

43. The vehicle of claim 38, further comprising:
a front member disposed at a front surface side of the display panel; and
a supporting frame disposed at a rear surface side of the front member to surround side surfaces of the display panel,
wherein the first supporting member is disposed at a rear surface side of the supporting frame.

44. The vehicle of claim 38, further comprising a third supporting member disposed between the second supporting member and the printed circuit board.

45. The vehicle of claim 38, further comprising a heat dissipation member disposed between a rear surface of the display panel and the first vibration apparatus.

46. The vehicle of claim 38, further comprising a supporting device disposed between the first supporting member and a rear surface of the first vibration apparatus and implemented to support the first vibration apparatus.

47. The vehicle of claim 38, further comprising a rear cover disposed at the rear surface of the first supporting member,
wherein the rear cover comprises:
a first cover configured to cover the rear surface of the first supporting member; and
a second cover disposed along a periphery of the first cover and configured to cover a side surface of the display panel.

48. The vehicle of claim 38, wherein the vibration apparatus further comprises a second vibration apparatus disposed at the rear surface side of the display panel and configured to vibrate the display panel.

* * * * *